(12) United States Patent
Abe et al.

(10) Patent No.: US 7,437,770 B2
(45) Date of Patent: *Oct. 14, 2008

(54) DATA TRANSFER SYSTEM, DATA TRANSFER APPARATUS, DATA RECORDING APPARATUS, DATA TRANSFER METHOD

(75) Inventors: Miki Abe, Kanagawa (JP); Takafumi Hosoi, Tokyo (JP); Hiromi Matsuda, Kanagawa (JP); Masao Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 624 days.

This patent is subject to a terminal disclaimer.

(21) Appl. No.: 10/344,867

(22) PCT Filed: Jun. 18, 2002

(86) PCT No.: PCT/JP02/06062

§ 371 (c)(1),
(2), (4) Date: Aug. 8, 2003

(87) PCT Pub. No.: WO02/103530

PCT Pub. Date: Dec. 27, 2002

(65) Prior Publication Data

US 2004/0010468 A1 Jan. 15, 2004

(30) Foreign Application Priority Data

Jun. 18, 2001 (JP) .............................. 2001-183217

(51) Int. Cl.
*G06F 21/22* (2006.01)
*H04L 9/00* (2006.01)
(52) U.S. Cl. ............................ 726/29; 713/193; 705/58
(58) Field of Classification Search ........................ None
See application file for complete search history.

(56) References Cited

U.S. PATENT DOCUMENTS 5,857,021 A * 1/1999 Kataoka et al. ............... 705/54

(Continued)

FOREIGN PATENT DOCUMENTS

EP 1 037 460 A 9/2000

(Continued)

OTHER PUBLICATIONS

"WS_FTP Limited Edition v5.08", [online], Impress Corporation, Mar. 11, 2000.

(Continued)

*Primary Examiner*—Christopher A Revak
(74) *Attorney, Agent, or Firm*—Finnegan, Henderson, Farabow, Garrett & Dunner, L.L.P.

(57) ABSTRACT

A data transfer apparatus referred to as a primary-recording-medium apparatus implements proper system operations by acquisition of information on a secondary recording medium mounted on a secondary-recording-medium apparatus to serve as a destination of a transfer (or a check-out) of a content. If a medium adopting its own unique management technique as is the case with a mini disc is used as the secondary recording medium serving as a destination of a check-out, the primary-recording-medium apparatus acquires information on the secondary recording medium from the secondary-recording-medium apparatus, which is typically a data-recording apparatus. The information includes an indicator as to whether or not the secondary recording medium has been mounted on the data-recording apparatus, the name of the secondary recording medium, the name of each content stored in the secondary recording medium, the number of contents stored in the secondary recording medium and attributes of each content stored in the secondary recording medium.

25 Claims, 45 Drawing Sheets

U.S. PATENT DOCUMENTS

| | | | |
|---|---|---|---|
| 6,141,702 A | 10/2000 | Ludtke et al. | |
| 6,496,802 B1 * | 12/2002 | van Zoest et al. | 705/14 |
| 6,539,468 B1 * | 3/2003 | Inoue et al. | 712/36 |
| 6,782,190 B1 * | 8/2004 | Morito | 386/94 |
| 6,832,319 B1 * | 12/2004 | Bell et al. | 713/193 |
| 6,834,348 B1 * | 12/2004 | Tagawa et al. | 713/193 |
| 6,847,950 B1 * | 1/2005 | Kamibayashi et al. | 705/57 |
| 6,865,552 B1 * | 3/2005 | Inoue et al. | 705/57 |
| 6,868,494 B1 | 3/2005 | Shitara et al. | |
| 6,959,366 B2 * | 10/2005 | Abe et al. | 711/154 |
| 7,134,145 B1 | 11/2006 | Epstein | |
| 7,159,244 B2 * | 1/2007 | Matsushima et al. | 726/30 |
| 7,191,346 B2 * | 3/2007 | Abe et al. | 713/194 |
| 7,209,642 B1 | 4/2007 | Utsumi | |
| 7,240,033 B2 * | 7/2007 | Kuriya et al. | 705/51 |
| 7,350,238 B2 * | 3/2008 | Abe et al. | 726/29 |
| 2001/0032088 A1 * | 10/2001 | Utsumi et al. | 705/1 |
| 2002/0078178 A1 * | 6/2002 | Senoh | 709/219 |
| 2002/0181355 A1 | 12/2002 | Shikunami et al. | |

FOREIGN PATENT DOCUMENTS

| | | |
|---|---|---|
| EP | 1 037 460 A2 | 9/2000 |
| EP | 1037460 * | 9/2000 |
| EP | 1 045 320 A2 | 10/2000 |
| EP | 1045320 * | 10/2000 |
| EP | 1 083 474 A | 3/2001 |
| EP | 1 083 474 A2 | 3/2001 |
| JP | 2000-149414 | 5/2000 |
| JP | 2000-315193 | 11/2000 |
| JP | 2000-322826 | 11/2000 |
| JP | 2000304854 A | 11/2000 |
| JP | 2000315193 A | 11/2000 |
| JP | 2000-357127 | 12/2000 |
| JP | 2000357201 A | 12/2000 |
| JP | 2001-60174 | 3/2001 |
| JP | 2001-84339 | 3/2001 |
| JP | 2001160054 A | 6/2001 |
| WO | WO 99/38093 | 7/1999 |
| WO | WO 01/67668 A1 * | 9/2001 |

OTHER PUBLICATIONS

"AV/C Disc Subunit General Specification," *1394 Trade Association*, Jan. 26, 1999.

European Search Report mailed by the European Patent Office on Jul. 16, 2007 for counterpart Application No. 02733508.2.

Yoshio, Taro, "Protecting Music Copyright with Small-size Memory Card," Nikkei Electronics, Mar. 22, 1999, pp. 49-53, No. 739.

* cited by examiner

Fig.2A

| VERSION：t | |
|---|---|
| INDEX | ENCRYPTION KEY |
| 0 | E (K (t) 0, K (t) R) |
| 0 0 | E (K (t) 0 0, K (t) 0) |
| 0 0 0 | E (K 0 0 0, K (t) 0 0) |
| 0 0 1 | E (K (t) 0 0 1, K (t) 0 0) |
| 0 0 1 0 | E (K 0 0 1 0, K (t) 0 0 1) |

Fig.2B

| VERSION：t | |
|---|---|
| INDEX | ENCRYPTION KEY |
| 0 0 0 | E (K 0 0 0, K (t) 0 0) |
| 0 0 1 | E (K (t) 0 0 1, K (t) 0 0) |
| 0 0 1 0 | E (K 0 0 1 0, K (t) 0 0 1) |

| OFFSET ADDRESS | CONTENTS | SIZE (BYTES) |
|---|---|---|
| 0 | NODE-KEY COUNT | 4 |
| 4 | NODE-KEY DEPTH | 4 |
| 8 | EKB VERSION | 4 |
| 12 | RESERVED | 4 |
| 16 | ENCRYPTED NODE KEYS | 16×M |
| 16+16×M | RESERVED | 16 |
| 32+16×M | ENCRYPTED EKB VERSION | 8 |
| 40+16×M | ELECTRONIC SIGNATURE | 5 |

Fig.3

|  | ←──16bit──→ | ←──16bit──→ | | |
|---|---|---|---|---|
| | MSB　　　LSB | MSB　　　LSB | MSB　　　LSB | MSB　　　LSB | |
| HEADER { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (00h) | MODE (02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| | Disc | ID | P-DFA | P-EMPTY | 11 |
| | P-FRA | P-TNO1 | P-TNO2 | P-TNO3 | 12 |
| POINTER PORTION { | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | 00000000 | 00000000 | 00000000 | 00000000 | 76 |
| | 00000000 | 00000000 | 00000000 | 00000000 | 77 |
| (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| TABLE PORTION (255 PART TABLE) (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

Fig.10

(1) USE LEAF KEY K000 IN DECRYPTION TO GIVE NODE K0
 D[ K000, E(K000, K0) ] = K0

(2) USE NODE KEY K0 IN DECRYPTION TO GIVE ROOT KEY KR'
 D[ K0, E(K0, KR') ] = KR'

(3) USE ROOT KEY KR' IN DECRYPTION TO GIVE CONTENT KEY CK
 D[ KR', E(KR', CK) ] = CK (4) USE CONTENT KEY CK IN DECRYPTION TO CONTENT DATA A3D
 D[ CK, E(CK, A3D) ] = A3D

| OFFSET (BYTES) | MSB 7 \| 6 \| 5 \| 4 | 3 \| 2 \| 1 \| 0 LSB |
|---|---|---|
| 00h | CTS | c type : CONTROL |
| ⋮ | ⋮ | |
| 0Ah | OPERATION CODE:RECORD OBJECT ||
| 0Bh | COMMUNICATION RESULT ||
| 0Ch | Reserved ||
| 0Dh | ||
| 0Eh | ||
| 0Fh | IDENTIFICATION CODE OF COMMUNICATION OBJECT APPARATUS ||
| 10h | ||
| 11h | TRACK NUMBER FOR CHECK-OUT CONTENT ON SECONDARY RECORDING MEDIUM ||
| 12h | ||
| 13h | CONTENT-DATA TYPE ||
| 14h | FORMAT OF CONTENT DATA IN PRIMARY RECORDING MEDIUM ||
| 15h | ATTRIBUTES OF CONTENT IN SECONDARY RECORDING MEDIUM ||
| 16h | CONTENT-DATA LENGTH ||
| 17h | ||
| 18h | ||
| 19h | ||
| 1Ah | BULK DATA LENGTH OF CONTENT DATA ||
| 1Bh | ||
| 1Ch | ||
| 1Dh | ||

Fig.19

| OFFSET (BYTES) | MSB 7 \| 6 \| 5 \| 4 \| 3 \| 2 \| 1 \| 0 LSB |
|---|---|
| 00h | CTS \| response : ACCEPTED |
| ⋮ | ⋮ |
| 0Ah | OPETATION CODE : RECORD OBJECT |
| 0Bh | COMMUNICATION RESULT |
| 0Ch | Reserved |
| 0Dh | |
| 0Eh | |
| 0Fh | IDENTIFICATION CODE OF COMMUNICATION OBJECT APPARATUS |
| 10h | |
| 11h | TRACK NUMBER FOR CHECK-OUT CONTENT ON SECONDARY RECORDING MEDIUM |
| 12h | |
| 13h | CONTENT-DATA TYPE |
| 14h | FORMAT OF CONTENT DATA IN PRIMARY RECORDING MEDIUM |
| 15h | ATTRIBUTES OF CONTENT IN SECONDARY RECORDING MEDIUM |
| 16h | CONTENT-DATA LENGTH |
| 17h | |
| 18h | |
| 19h | |
| 1Ah | BULK DATA LENGTH OF CONTENT DATA |
| 1Bh | |
| 1Ch | |
| 1Dh | |
| 1Eh ⋮ 3Dh | SESSION DATA (32 BYTES) (CONTENT ID) |

Fig.20

| OFFSET (BYTES) | MSB 7 | 6 | 5 | 4 | 3 | 2 | 1 | LSB 0 |
|---|---|---|---|---|---|---|---|---|
| 00h | CTS | | | | c type : CONTROL | | | |
| ⋮ | ⋮ | | | | | | | |
| 0Ah | OPERATION CODE : CHECK-OUT | | | | | | | |
| 0Bh | COMMUNICATION RESULT | | | | | | | |
| 0Ch | Reserved | | | | | | | |
| 0Dh | INDENTIFICATION CODE OF COMMUNICATION OBJECT APPARATUS | | | | | | | |
| 0Eh | | | | | | | | |
| 0Fh | TRACK NUMBER FOR CHECK-OUT CONTENT ON SECONDARY RECORDING MEDIUM | | | | | | | |
| 10h | | | | | | | | |
| 11h ⋮ 18h | DES CBC (ks,0) | | | | | | | |

Fig.21

| OFFSET (BYTES) | MSB 7 | 6 | 5 | 4 | 3 | 2 | 1 | LSB 0 |
|---|---|---|---|---|---|---|---|---|
| 00h | CTS | | | | response : ACCEPTED | | | |
| ⋮ | ⋮ | | | | | | | |
| 0Ah | OPERATION CODE : CHECK-OUT | | | | | | | |
| 0Bh | COMMUNICATION RESULT | | | | | | | |
| 0Ch | Reserved | | | | | | | |
| 0Dh | INDENTIFICATION CODE OF COMMUNICATION OBJECT APPARATUS | | | | | | | |
| 0Eh | | | | | | | | |
| 0Fh | TRACK NUMBER FOR CHECK-OUT CONTENT ON SECONDARY RECORDING MEDIUM | | | | | | | |
| 10h | | | | | | | | |

Fig.22

| OFFSET (BYTES) | MSB 7 | 6 | 5 | 4 | 3 | 2 | 1 | LSB 0 |
|---|---|---|---|---|---|---|---|---|
| 00h | \multicolumn{4}{c}{CTS} | \multicolumn{4}{c}{c type : CONTROL} |
| ⋮ | \multicolumn{8}{c}{⋮} |
| 0Ah | \multicolumn{8}{c}{OPERATION CODE : CHECK-IN} |
| 0Bh | \multicolumn{8}{c}{COMMUNICATION RESULT} |
| 0Ch | \multicolumn{8}{c}{SUB-FUNCTION} |
| 0Dh | \multicolumn{8}{c}{INDENTIFICATION CODE OF COMMUNICATION OBJECT APPARATUS} |
| 0Eh | | | | | | | | |
| 0Fh | \multicolumn{8}{c}{TRACK NUMBER FOR CHECK-IN CONTENT ON SECONDARY RECORDING MEDIUM} |
| 10h | | | | | | | | |

Fig.24

| VALUE | SUB-FUNCTION |
|---|---|
| 00h | CONTENT ID |
| 01h | reserved |
| OTHERS | PREPAID INFORMATION |

Fig.25

| OFFSET (BYTES) | MSB 7 \| 6 \| 5 \| 4 | 3 \| 2 \| 1 \| 0 LSB |
|---|---|---|
| 00h | CTS | response : ACCEPTED |
| ⋮ | ⋮ | |
| 0Ah | OPERATION CODE:CHECK-IN | |
| 0Bh | COMMUNICATION RESULT | |
| 0Ch | SUB-FUNCTION | |
| 0Dh | IDENTIFICATION CODE OF COMMUNICATION OBJECT APPARATUS | |
| 0Eh | | |
| 0Fh | TRACK NUMBER FOR CHECK-IN CONTENT ON SECONDARY RECORDING MEDIUM | |
| 10h | | |
| 11h | Hash MAC (CONTENT ID) | |
| 12h | | |
| 13h | | |
| 14h | | |
| 15h | | |
| 16h | | |
| 17h | | |
| 18h | | |

Fig.26

| OFFSET (BYTES) | MSB 7 | 6 | 5 | 4 | 3 | 2 | 1 | LSB 0 |
|---|---|---|---|---|---|---|---|---|
| 00h | CTS ||||c type : CONTROL ||||
| 01h | SUB-UNIT TYPE |||| SUB-UNIT ID ||||
| 02h | Reserved ||||||||
| 03h | PRIORITY ||||||||

Fig.31

| OFFSET (BYTES) | MSB 7 | 6 | 5 | 4 | 3 | 2 | 1 | LSB 0 |
|---|---|---|---|---|---|---|---|---|
| 00h | CTS ||||c type : CONTROL ||||
| 01h | SUB-UNIT TYPE |||| SUB-UNIT ID ||||
| 02h | Reserved ||||||||
| 03h | PRIORITY:00h ||||||||

Fig.32

| OFFSET (BYTES) | MSB 7 | 6 | 5 | 4 | 3 | 2 | 1 | LSB 0 |
|---|---|---|---|---|---|---|---|---|
| 00h | \multicolumn{4}{l|}{CTS} | \multicolumn{4}{l|}{ctype : CONTROL} |
| 01h | \multicolumn{4}{l|}{subunit type} | \multicolumn{4}{l|}{subunit ID} |
| 02h | \multicolumn{8}{l|}{<OpCode> READ DESCRIPTOR} |
| 03h | \multicolumn{8}{l|}{descriptor type : [Disc Subunit Status Descriptor]} |
| 04h | \multicolumn{8}{l|}{reference method : [info block reference]} |
| 05h | \multicolumn{8}{l|}{number of levels} |
| 06h | \multicolumn{8}{l|}{descriptor type : [info block,type&count]} |
| 07h | \multicolumn{8}{l|}{info block type :} |
| 08h | \multicolumn{8}{l|}{[General Disc Subunit Status Area Info Block]} |
| 09h | \multicolumn{8}{l|}{instance count : [0]} |
| 0Ah | \multicolumn{8}{l|}{descriptor type : [info block,type&count]} |
| 0Bh | \multicolumn{8}{l|}{info block type :} |
| 0Ch | \multicolumn{8}{l|}{[Media and Edit Status Info Block]} |
| 0Dh | \multicolumn{8}{l|}{instance count : [0]} |
| 0Eh | \multicolumn{8}{l|}{read result status} |
| 0Fh | \multicolumn{8}{l|}{Reserved} |
| 10h | \multicolumn{8}{l|}{data length : [entire]} |
| 11h | | | | | | | | |
| 12h | \multicolumn{8}{l|}{address : [ignored]} |
| 13h | | | | | | | | |

Fig.33

| OFFSET (BYTES) | MSB 7 | 6 | 5 | 4 | 3 | 2 | 1 | LSB 0 |
|---|---|---|---|---|---|---|---|---|
| 00h | CTS | | | | response : ACCEPTED | | | |
| 01h | subunit type | | | | | subunit ID | | |
| 02h | <OpCode> READ DESCRIPTOR | | | | | | | |
| 03h | descriptor type : [Disc Subunit Status Descriptor] | | | | | | | |
| 04h | reference method : [info block reference] | | | | | | | |
| 05h | number of levels | | | | | | | |
| 06h | descriptor type : [info block,type&count] | | | | | | | |
| 07h | info block type : [General Disc Subunit Status Area Info Block] | | | | | | | |
| 08h | | | | | | | | |
| 09h | instance count : [0] | | | | | | | |
| 0Ah | descriptor type : [info block,type&count] | | | | | | | |
| 0Bh | info block type : [Media and Edit Status Info Block] | | | | | | | |
| 0Ch | | | | | | | | |
| 0Dh | instance count : [0] | | | | | | | |
| 0Eh | read result status : [no problem] | | | | | | | |
| 0Fh | Reserved | | | | | | | |
| 10h | data length : [size of Media and Edit Status Info Block] | | | | | | | |
| 11h | | | | | | | | |
| 12h | address | | | | | | | |
| 13h | | | | | | | | |
| 14h | compound length | | | | | | | |
| 15h | | | | | | | | |
| 16h | info block type : [Media and Edit Status Info Block] | | | | | | | |
| 17h | | | | | | | | |
| 18h | primary fields length : | | | | | | | |
| 19h | | | | | | | | |
| 1Ah | *disc in drive* | | error condition | | Reserved | | | |
| 1Bh | undo status | | | | | | | |
| 1Ch | difference | auto-update | Reserved | | | | | |

Fig.34

| OFFSET (BYTES) | MSB 7 | 6 | 5 | 4 | 3 | 2 | 1 | LSB 0 |
|---|---|---|---|---|---|---|---|---|
| 00h | CTS ||||ctype : CONTROL ||||
| 01h | subunit type |||| subunit ID ||||
| 02h | <OpCode> READ INFO BLOCK ||||||||
| 03h | number of levels ||||||||
| 04h | descriptor type : [Object position] ||||||||
| 05h | List ID : [Text Database List Disc Title List] ||||||||
| 06h | ||||||||
| 07h | object position : [0 = UTOC1] ||||||||
| 08h | ||||||||
| 09h | descriptor type : [info block,type&count] ||||||||
| 0Ah | info block type : [raw text info block] ||||||||
| 0Bh | ||||||||
| 0Ch | instance count ||||||||
| 0Dh | read result ||||||||
| 0Eh | Reserved ||||||||
| 0Fh | data length : [entire] ||||||||
| 10h | ||||||||
| 11h | address : [ignored] ||||||||
| 12h | ||||||||

Fig.35

| OFFSET (BYTES) | MSB 7 \| 6 \| 5 \| 4 \| 3 \| 2 \| 1 \| 0 LSB | |
|---|---|---|
| 00h | CTS | response : ACCEPTED |
| 01h | subunit type | subunit ID |
| 02h | \<OpCode\> READ INFO BLOCK | |
| 03h | number of levels | |
| 04h | descriptor type : [Object position] | |
| 05h | List ID : [Text Database List Disc Title List] | |
| 06h | | |
| 07h | object position : [0 = UTOC1] | |
| 08h | | |
| 09h | descriptor type : [info block,type&count] | |
| 0Ah | info block type : [raw text info block] | |
| 0Bh | | |
| 0Ch | instance count | |
| 0Dh | read result status : [no problem] | |
| 0Eh | Reserved | |
| 0Fh | data length : [size of raw text info block] | |
| 10h | | |
| 11h | address : [offset = 0] | |
| 12h | | |
| 13h | compound length : [N+4 Bytes] | |
| 14h | | |
| 15h | info block type : [raw text info block] | |
| 16h | | |
| 17h | *primary field length : [N Bytes]* | |
| 18h | | |
| 19h ⋮ (18+N)h | *N-Bytes Disc Title Text* | |

Fig.36

| OFFSET (BYTES) | MSB 7 | 6 | 5 | 4 | 3 | 2 | 1 | LSB 0 |
|---|---|---|---|---|---|---|---|---|
| 00h | CTS | | | | ctype : CONTROL | | | |
| 01h | subunit type | | | | | subunit ID | | |
| 02h | <OpCode> READ INFO BLOCK | | | | | | | |
| 03h | number of levels | | | | | | | |
| 04h | descriptor type : [List ID] | | | | | | | |
| 05h | List ID : [Root Contents List] | | | | | | | |
| 06h | | | | | | | | |
| 07h | descriptor type : [info block,type&count] | | | | | | | |
| 08h | info block type : [AV object type specific capacity info block] | | | | | | | |
| 09h | | | | | | | | |
| 0Ah | instance count : [0 = Audio] | | | | | | | |
| 0Bh | read result status | | | | | | | |
| 0Ch | Reserved | | | | | | | |
| 0Dh | data length : [entire] | | | | | | | |
| 0Eh | | | | | | | | |
| 0Fh | address : [ignored] | | | | | | | |
| 10h | | | | | | | | |

Fig.37

| OFFSET (BYTES) | MSB 7 \| 6 \| 5 \| 4 \| 3 \| 2 \| 1 \| 0 LSB ||
|---|---|---|
| 00h | CTS | response : ACCEPTED |
| 01h | subunit type | subuni ID |
| 02h | <OpCode> READ INFO BLOCK ||
| 03h | number of levels ||
| 04h | descriptor type : [list ID] ||
| 05h | List ID : [Root Contents List] ||
| 06h | ||
| 07h | descriptor type : [info block,type&count] ||
| 08h | info block type : [AV object type specific capacity info block] ||
| 09h | ||
| 0Ah | instance count : [0 = Audio] ||
| 0Bh | read result status : [no problem] ||
| 0Ch | Reserved ||
| 0Dh | data length : [size of AV object type specific capacity info block] ||
| 0Eh | ||
| 0Fh | address ||
| 10h | ||
| 11h | compound length : 27 Bytes ||
| 12h | ||
| 13h | info block type : [AV object type specific capacity info block] ||
| 14h | ||
| ⋮ | ⋮ ||

(CONTINUED FROM Fig. 38)

| | |
|---|---|
| 15h | primary field length : 23 Bytes |
| 16h | |
| 17h | object type : [Audio Track] |
| 18h | capacity format indicator : [time] |
| 19h | total playback capacity length |
| 1Ah | |
| 1Bh | HOURS |
| 1Ch | |
| 1Dh | MINUTES |
| 1Eh | SECONDS |
| 1Fh | FRAMES |
| 20h | maximum recording capacity length |
| 21h | |
| 22h | HOURS |
| 23h | |
| 24h | MINUTES |
| 25h | SECONDS |
| 26h | FRAMES |
| 27h | remaining recording capacity length |
| 28h | |
| 29h | HOURS |
| 2Ah | |
| 2Bh | MINUTES |
| 2Ch | SECONDS |
| 2Dh | FRAMES |

Fig.39

| OFFSET (BYTES) | MSB 7 | 6 | 5 | 4 | 3 | 2 | 1 | LSB 0 |
|---|---|---|---|---|---|---|---|---|
| 00h | CTS ||||ctype : CONTROL||||
| 01h | subunit type |||| subunit ID ||||
| 02h | <OpCode> READ INFO BLOCK ||||||||
| 03h | number of levels ||||||||
| 04h | descriptor type : [List ID] ||||||||
| 05h | List ID : [Audio Child Contents List] ||||||||
| 06h | ||||||||
| 07h | descriptor type : [info block,type&count] ||||||||
| 08h | info block type : [number of items info block] ||||||||
| 09h | ||||||||
| 0Ah | instance count : [0] ||||||||
| 0Bh | read result status ||||||||
| 0Ch | Reserved ||||||||
| 0Dh | data length : [entire] ||||||||
| 0Eh | ||||||||
| 0Fh | address : [ignored] ||||||||
| 10h | ||||||||

Fig.40

| OFFSET (BYTES) | MSB 7 \| 6 \| 5 \| 4 \| 3 \| 2 \| 1 \| 0 LSB |
|---|---|
| 00h | CTS \| response : ACCEPTED |
| 01h | subunit type \| subunit ID |
| 02h | <OpCode> READ INFO BLOCK |
| 03h | number of levels |
| 04h | descriptor type : [list ID] |
| 05h | List ID : [Audio Child Contents List] |
| 06h | |
| 07h | descriptor type : [info block,type&count] |
| 08h | info block type : |
| 09h | [number of items info block] |
| 0Ah | instance count : [0] |
| 0Bh | read result status : [no problem] |
| 0Ch | Reserved |
| 0Dh | data length : |
| 0Eh | [size of number of items info block] |
| 0Fh | address |
| 10h | |
| 11h | compound length |
| 12h | |
| 13h | info block type : |
| 14h | [number of items info block] |
| 15h | primary length : |
| 16h | |
| 17h | *number of items : [Track Number]* |
| 18h | |

Fig.41

| OFFSET (BYTES) | MSB 7 | 6 | 5 | 4 | 3 | 2 | 1 | LSB 0 |
|---|---|---|---|---|---|---|---|---|
| 00h | CTS | | | | ctype : CONTROL | | | |
| 01h | subunit type | | | | | subunit ID | | |
| 02h | <OpCode> READ INFO BLOCK | | | | | | | |
| 03h | number of levels | | | | | | | |
| 04h | descriptor type : [Object position] | | | | | | | |
| 05h | List ID : [Text Database List Audio Title UTOC1] | | | | | | | |
| 06h | | | | | | | | |
| 07h | object position : [N-th Track] | | | | | | | |
| 08h | | | | | | | | |
| 09h | descriptor type : [info block,type&count] | | | | | | | |
| 0Ah | info block type : [raw text info block] | | | | | | | |
| 0Bh | | | | | | | | |
| 0Ch | instance count | | | | | | | |
| 0Dh | read result | | | | | | | |
| 0Eh | Reserved | | | | | | | |
| 0Fh | data length : [entire] | | | | | | | |
| 10h | | | | | | | | |
| 11h | address : [ignored] | | | | | | | |
| 12h | | | | | | | | |

Fig.42

| OFFSET (BYTES) | MSB 7 6 5 4 3 2 1 0 LSB |
|---|---|
| 00h | CTS \| response : ACCEPTED |
| 01h | subunit type \| subunit ID |
| 02h | <OpCode> READ INFO BLOCK |
| 03h | number of levels |
| 04h | descriptor type : [Object position] |
| 05h<br>06h | List ID : [Text Database List Audio Title UTOC1] |
| 07h<br>08h | *object position : [N-th Track]* |
| 09h | descriptor type : [info block,type&count] |
| 0Ah<br>0Bh | info block type : [raw text info block] |
| 0Ch | instance count |
| 0Dh | read result status : [no problem] |
| 0Eh | Reserved |
| 0Fh<br>10h | data length :<br>[size of raw text info block = N+6 Bytes] |
| 11h<br>12h | address |
| 13h<br>14h | compound length : [M+4 Bytes] |
| 15h<br>16h | info block type : [raw text info block] |
| 17h<br>18h | *primary field length : [M Bytes]* |
| 19h<br>⋮<br>(18+M)h | *M-Bytes Audio Track Title Text* |

Fig.43

| OFFSET (BYTES) | MSB 7 | 6 | 5 | 4 | 3 | 2 | 1 | LSB 0 |
|---|---|---|---|---|---|---|---|---|
| 00h | CTS ||||ctype : CONTROL||||
| 01h | subunit type |||| subunit ID ||||
| 02h | <OpCode> READ INFO BLOCK ||||||||
| 03h | number of levels ||||||||
| 04h | descriptor type : [Object position] ||||||||
| 05h | List ID : [Audio Child Contents List] ||||||||
| 06h | ||||||||
| 07h | object position : [N-th Track] ||||||||
| 08h | ||||||||
| 09h | read result ||||||||
| 0Ah | Reserved ||||||||
| 0Bh | data length : [1 Byte] ||||||||
| 0Ch | ||||||||
| 0Dh | address : [pointer of disc subunit object attributes] ||||||||
| 0Eh | ||||||||

Fig.44

| OFFSET (BYTES) | MSB 7 | 6 | 5 | 4 | 3 | 2 | 1 | LSB 0 |
|---|---|---|---|---|---|---|---|---|
| 00h | CTS | | | | response : ACCEPTED | | | |
| 01h | subunit type | | | | | subunit ID | | |
| 02h | <OpCode> READ INFO BLOCK | | | | | | | |
| 03h | number of levels | | | | | | | |
| 04h | descriptor type : [Object position] | | | | | | | |
| 05h | List ID : [Audio Child Contents List] | | | | | | | |
| 06h | | | | | | | | |
| 07h | *object position : [N-th Track]* | | | | | | | |
| 08h | | | | | | | | |
| 09h | read result status : [no problem] | | | | | | | |
| 0Ah | Reserved | | | | | | | |
| 0Bh | data length : [1 Byte] | | | | | | | |
| 0Ch | | | | | | | | |
| 0Dh | address : [pointer of disc subunit object attributes] | | | | | | | |
| 0Eh | | | | | | | | |
| 0Fh | *disc subunit object attributes : [content locked]* | | | | | | | |

Fig.45

| OFFSET (BYTES) | MSB 7 | 6 | 5 | 4 | 3 | 2 | 1 | LSB 0 |
|---|---|---|---|---|---|---|---|---|
| 00h | \multicolumn{4}{c}{CTS} | \multicolumn{4}{c}{ctype : CONTROL} |
| 01h | \multicolumn{4}{c}{subunit type} | \multicolumn{4}{c}{subunit ID} |
| 02h | \multicolumn{8}{c}{<OpCode> READ INFO BLOCK} |
| 03h | \multicolumn{8}{c}{number of levels} |
| 04h | \multicolumn{8}{c}{descriptor type : [Object position]} |
| 05h | \multicolumn{8}{c}{List ID : [Audio Child Contents List]} |
| 06h | | | | | | | | |
| 07h | \multicolumn{8}{c}{object position : [N-th Track]} |
| 08h | | | | | | | | |
| 09h | \multicolumn{8}{c}{descriptor type : [info block,type&count]} |
| 0Ah | \multicolumn{8}{c}{info block type :} |
| 0Bh | \multicolumn{8}{c}{[audio recording parameter info block]} |
| 0Ch | \multicolumn{8}{c}{instance count} |
| 0Dh | \multicolumn{8}{c}{read result} |
| 0Eh | \multicolumn{8}{c}{Reserved} |
| 0Fh | \multicolumn{8}{c}{data length : [entire]} |
| 10h | | | | | | | | |
| 11h | \multicolumn{8}{c}{address : [ignored]} |
| 12h | | | | | | | | |

Fig.46

| OFFSET (BYTES) | MSB 7 \| 6 \| 5 \| 4 \| 3 \| 2 \| 1 \| 0 LSB ||
|---|---|---|
| 00h | CTS | response : ACCEPTED |
| 01h | subunit type | subunit ID |
| 02h | <OpCode> READ INFO BLOCK ||
| 03h | number of levels ||
| 04h | descriptor type : [Object position] ||
| 05h | List ID : [Audio Child Contents List] ||
| 06h |  ||
| 07h | *object position : [N-th Track]* ||
| 08h |  ||
| 09h | descriptor type : [info block,type&count] ||
| 0Ah | info block type : [audio recording parameter info block] ||
| 0Bh |  ||
| 0Ch | instance count ||
| 0Dh | read result status : [no problem] ||
| 0Eh | Reserved ||
| 0Fh | data length : [size of raw text info block = 10 Bytes] ||
| 10h |  ||
| 11h | address : [offset = 0] ||
| 12h |  ||
| 13h | compound length : [8 Bytes] ||
| 14h |  ||
| 15h | info block type : [audio recording parameter info block] ||
| 16h |  ||
| 17h | primary field length : [4 Bytes] ||
| 18h |  ||
| 19h | *audio recording sample rate : [44.1 kHz]* ||
| 1Ah | *audio recording sample size : [16 bits]* ||
| 1Bh | *audio recording compression mode : [ATRAC]* ||
| 1Ch | *audio recording channel mode : [STEREO]* ||

Fig.47

| OFFSET (BYTES) | MSB 7 | 6 | 5 | 4 | 3 | 2 | 1 | LSB 0 |
|---|---|---|---|---|---|---|---|---|
| 00h | CTS |||| ctype : CONTROL ||||
| 01h | subunit type |||| subunit ID ||||
| 02h | <OpCode> READ INFO BLOCK ||||||||
| 03h | number of levels ||||||||
| 04h | descriptor type : [Object position] ||||||||
| 05h | List ID : [Audio Child Contents List] ||||||||
| 06h | ||||||||
| 07h | object position : [N-th Track] ||||||||
| 08h | ||||||||
| 09h | descriptor type : [info block,type&count] ||||||||
| 0Ah | info block type : [size indicator info block] ||||||||
| 0Bh | ||||||||
| 0Ch | instance count ||||||||
| 0Dh | read result ||||||||
| 0Eh | Reserved ||||||||
| 0Fh | data length : [entire] ||||||||
| 10h | ||||||||
| 11h | address : [ignored] ||||||||
| 12h | ||||||||

Fig.48

| OFFSET (BYTES) | MSB 7 | 6 | 5 | 4 | 3 | 2 | 1 | LSB 0 |
|---|---|---|---|---|---|---|---|---|
| 00h | CTS | | | | response : ACCEPTED | | | |
| 01h | subunit type | | | | | subunit ID | | |
| 02h | <OpCode> READ INFO BLOCK | | | | | | | |
| 03h | number of levels | | | | | | | |
| 04h | descriptor type : [Object position] | | | | | | | |
| 05h | List ID : [Audio Child Contents List] | | | | | | | |
| 06h | | | | | | | | |
| 07h | object position : [N-th Track] | | | | | | | |
| 08h | | | | | | | | |
| 09h | descriptor type : [info block,type&count] | | | | | | | |
| 0Ah | info block type : [size indicator info block] | | | | | | | |
| 0Bh | | | | | | | | |
| 0Ch | instance count | | | | | | | |
| 0Dh | read result status : [no problem] | | | | | | | |
| 0Eh | Reserved | | | | | | | |
| 0Fh | data length : [size of size indicator info block = 12 Bytes] | | | | | | | |
| 10h | | | | | | | | |
| 11h | address : [offset = 0] | | | | | | | |
| 12h | | | | | | | | |
| 13h | compound length : [10 Bytes] | | | | | | | |
| 14h | | | | | | | | |
| 15h | info block type : [size indicator info block] | | | | | | | |
| 16h | | | | | | | | |
| 17h | primary field length : [6 Bytes] | | | | | | | |
| 18h | | | | | | | | |
| 19h | size indicator type : [H M S F] | | | | | | | |
| 1Ah | hours | | | | | | | |
| 1Bh | | | | | | | | |
| 1Ch | minutes | | | | | | | |
| 1Dh | seconds | | | | | | | |
| 1Eh | frames | | | | | | | |

Fig.49

DATA TRANSFER SYSTEM, DATA TRANSFER APPARATUS, DATA RECORDING APPARATUS, DATA TRANSFER METHOD

TECHNICAL FIELD

The present invention relates to a data transfer system, a data transfer apparatus, a data-recording apparatus and a data transfer method that are well suitable for transferring and/or recording content data such as music.

BACKGROUND ART

In typical usage of content data such as music, the data stored in a primary recording medium such as an HDD (hard disk drive) of a personal computer is transferred to another recording medium used as a secondary recording medium so as to allow the data reproduced from the secondary recording medium to be enjoyed. It is to be noted that the content data includes musical data, video data, game data and computer software, which are provided mainly for distribution, transfer and utilization purposes.

In this case, the HDD employed in the personal computer is used for storing content data such as music reproduced from a package recording medium such as a CD-DA (Compact Disc Digital Audio) and a DVD (Digital Versatile Disc) or used for storing content data downloaded from an external musical server or the like by way of a communication network to the personal computer, which is connected to the network. Then, the user connects the personal computer to a recording apparatus for recording data onto the secondary recording medium, and copies or moves content data from the HDD to the secondary recording medium. In order to enjoy the content data, a reproduction apparatus is used to reproduce the data from the secondary recording medium.

Conceivable examples of the secondary recording medium are a memory card employing a semiconductor memory such as a flash memory, a mini disc used as a magneto-optical disc, a CD-R (CD-Recordable), a CD-RW (CD-Rewritable), a DVD-RAM, a DVD-R and a DVD-RW.

As a recording apparatus and a reproduction apparatus for the secondary recording medium, respectively, a recorder and a player for these recording mediums including the semiconductor memory, the mini disc, the CD-R, the CD-RW, the DVD-RAM, the DVD-R and the DVD-RW have been becoming very popular. The recorder and the player are designed into a variety of implementations such as a stationary recording/reproduction apparatus and a portable recording/reproduction apparatus. The user can thus record and reproduce content data by using an implementation of the recorder and the player that is a favorite with the user or matches an apparatus already owned by the user.

It is to be noted that, when considering such usage of content data, for example, protection of copyrights of the content data must be taken into account. Assume for example that the user obtains content data by using a service to distribute the content data or by purchasing a package medium containing the content data and, after storing the content data into an HDD, the user is allowed to copy the content data to secondary recording mediums without any limitation. In this case, such usage of the content data results in a condition in which the owner of the copyright is not properly protected. In order to solve this problem, there have been proposed a variety of agreements and technologies for assuring protection of copyrights in handling content data as digital data. One of the agreements is a standard called an SDMI (Secure Digital Music Initiative).

A data path prescribed in the SDMI standard will be described later. At any rate, a content stored in an HDD employed in a personal computer as a primary recording medium can be properly transferred to or recorded onto a secondary recording medium after protection of a copyright and benefits of general users are taken into consideration. The benefits include a right to privately copy the content. Examples of the content stored in the HDD include a network content and a disc content. The network content is content data distributed by an external server to the personal computer by way of typically a network to be stored in the HDD. On the other hand, a disc content is read out from a package recording medium to be stored in the HDD. As described above, examples of the package recording medium are a CD-DA and a DVD. The package recording medium is mounted on a disc drive for reproducing the disc content. Typically, the disc drive is embedded in the personal computer or connected to the personal computer. Examples of the disc drive include a CD-ROM drive.

By the way, when content data is transferred in a copy operation from a primary recording medium such as an HDD to a secondary recording medium such as a mini disc or a memory card, measures are taken to satisfy protection of both a copyright and a private copying right.

In order to satisfy such protection, data is transferred from a secondary recording medium conforming to the SDMI standard as follows.

A secondary recording medium conforming to the SDMI standard is assumed to be a recording medium including a memory card employing a semiconductor memory such as a flash memory in conformity with the SDMI standard. Such a secondary recording medium is used for storing a content in an encrypted state. In a primary recording medium like an HDD, for example, a content conforming to the SDMI standard is stored in an encrypted state so that such a content will be copied to a secondary recording medium also in the encrypted state as it is.

It is needless to say that a reproduction apparatus provided for such a secondary recording medium has a decryption function allowing content data copied to the secondary recording medium in an encrypted state to be reproduced.

In a secondary recording medium conforming to the SDMI standard, a recording format includes an area for recording a content ID used as an identifier for identifying each piece of content data.

A content ID is generated for each piece of content data stored in the primary recording medium such as an HDD employed in an apparatus for the primary recording medium and is stored along with the piece of content data. When content data is copied to a secondary recording medium, a content ID identifying the content data is also stored in the secondary recording medium.

Content IDs are used for managing content rights in primary and secondary recording mediums. A content right of a content in a primary recording medium is a right to transfer the content from the primary recording medium to a secondary recording medium in an operation to copy the content to the secondary recording medium. On the other hand, a content right of a content in a secondary recording medium is a right to reproduce the content from the secondary recording medium.

It is to be noted that, in the following description, a transfer of content data (a transfer of a right) from a primary recording medium to a secondary recording medium is referred to as a check-out. On the other hand, a transfer of content data (in actuality, a transfer of a right only) from a secondary recording medium to a primary recording medium is referred to as a check-in.

In accordance with the SDMI standard, transfer usage rules are established for check-outs and check-ins.

For example, for a piece of content data, only up to three check-outs from a primary recording medium to a secondary recording medium are allowed. Thus, a transfer right allows the piece of content data to be transferred up to three times.

In a check-out, a right is also transferred from a primary recording medium to a secondary recording medium. Thus, the transfer right in the primary recording medium now allows the piece of data to be transferred only up to two times. On the other hand, a reproduction right is given to the secondary recording medium.

In a check-in, on the other hand, a right is returned from a secondary recording medium to a primary recording medium. Thus, the secondary recording medium loses a reproduction right while one transferred right is restored to the primary recording medium.

Such check-outs and such check-ins are managed for each piece of content data by using a content ID for identifying the piece of content data.

In addition, in a check-out, a piece of content data and a content ID for identifying the piece of content data are recorded onto a secondary recording medium. The secondary recording medium is given a reproduction right to reproduce the piece of content data. On the other hand, the primary recording medium is considered to have transferred one content ID and lost one transfer right in accordance with the usage rules.

In a check-in, on the other hand, no content data is actually returned. Instead, the content data is merely erased from the secondary recording medium, and the content ID is returned to the primary recording medium to increment the number of transfer rights prescribed by the usage rules by one. The secondary recording medium loses the reproduction right to reproduce the content data.

As described above, content data is copied to a secondary recording medium conforming to the SDMI standard in an encrypted state to be stored into the recording medium also in an encrypted state, and content rights are managed in the event of a check-out or a check-in in order to prevent content data to be copied an unlimited number of times and to protect copyrights as well as to assure the private-copy right of the user at the same time.

It is to be noted that content data downloaded from typically an external server to an HDD serving as a primary recording medium is stored in the HDD in a state of being encrypted by using a content key CK.

In this specification, content data stored in the HDD is assumed to have been obtained as a result of compressing original content data by adoption of an ATRAC3 technique or another compression technique and encrypting the compressed data A3D by using the content key CK. In this specification, notation E (x, y) denotes encrypted data obtained as a result of encrypting data y by using a key x.

On the other hand, notation D {x, E (x, y)} denoted decrypted data obtained as a result of decrypting encrypted data E (x, y) by using the key x.

Thus, the content data obtained as a result of compressing original content data and encrypting the compressed data A3D by using the content key CK can be expressed by notation:

E (CK, A3D)

On the other hand, decrypted data obtained as a result of the decrypting encrypted data E (CK, A3D) by using the key CK is expressed by notation:

D {CK, E (CK, A3D)}

In addition to the encrypted content data E (CK, A3D), the HDD serving as the primary recording medium is also used for storing E (KR, CK), which is the content key CK in a state of being encrypted by using a root key KR. Thus, in the case of encrypted content data E (CK, A3D) downloaded from an external server, for example, the encrypted content key E (KR, CK) is also downloaded from the server.

In this case, in a check-out of the encrypted content data E (CK, A3D) to a secondary recording medium, the encrypted content data E (CK, A3D) and the encrypted content key E (KR, CK) need to be transferred from the HDD serving as the primary recording medium to the secondary recording medium.

The apparatus for the secondary recording medium holds the root key KR for decrypting the encrypted content key E (KR, CK) to produce the original content key CK. The content CK is then used for decrypting the encrypted content data E (CK, A3D) to produce the original content data A3D.

In accordance to the will of the copyright owner or for a variety of reasons, however, the root key KR can be changed. That is to say, a root key KR can be set for each piece of content data. In addition, there is provided a function for imposing restrictions on targets of content distribution by processing of the root key KR. This function will be described later concretely.

Thus, in some cases, data called an EKB (Enabling Key Block) is distributed. In addition, in some cases, a regular terminal for receiving transferred content data adopts a technique for confirming a root key by using an EKB. That is to say, an EKB is distributed from a server to be stored in an HDD along with encrypted content data and an encrypted content key.

Consider a case in which a mini disc (or a magneto-optical disc), which has been becoming very popular, is used as a secondary recording medium in a mini-disc recording apparatus conforming to the SDMI standard. In this case, encrypted content data E (CK, A3D) transferred to the mini disc in a check-out is stored in the mini disc in an encrypted state as it is.

Then, in a reproduction operation, the mini-disc recording apparatus conforming to the SDMI standard decrypts the encrypted content data E (CK, A3D) to produce the content data-D {CK, E (CK, A3D)}=A3D, which is the content data compressed by adoption of the ATRAC3 compression technique. Then, the mini-disc recording apparatus carries out a predetermined decoding process on the compressed content data A3D to output reproduced data such as music.

In a mini disc used in an ordinary mini-disc system, which has been becoming popular too, on the other hand, data is stored not in an encrypted state. Thus, as a mini-disc reproduction apparatus, the mini-disc system naturally does not have a decryption function.

As a result, content data recorded in a mini disc by the mini-disc recording apparatus conforming to the SDMI standard cannot be reproduced by most of mini-disc players, which do not conform to the SDMI standard. That is to say, the content data recorded in a mini disc by the mini-disc recording apparatus conforming to the SDMI standard is not reproduction-compatible with the mini-disc players.

This means that correct use of an SDMI content purchased by the general user is limited and the value of the service to provide an SDMI content to the ordinary user as well as the level of user satisfaction with the service are hence reduced considerably.

In order to solve the problem described above, in a recording operation to copy an SDMI content to a secondary recording medium such as a mini disc mounted on a mini-disc recording apparatus not conforming to the SDMI standard, the SDMI content is decrypted so that the content can be stored in the mini disc in an unencrypted state as it is.

If such a copy operation can be carried out, however, it is possible to copy content data with ease. Such a copy operation also leaves room for possible illegal copies, resulting in a fear of impossibility to implement copyright protection, which is the original objective of the SDMI standard.

In order to solve the problem described above, as a method of transferring content data, the applicant of a patent for the present invention has proposed a content transfer technique described as follows.

In an operation to transfer content data, a data transfer apparatus serving as a primary-recording-medium apparatus authenticates a data-recording apparatus used as a secondary-recording-medium apparatus to serve as a transfer destination. If the result of the authentication is OK, the transfer of the content data is allowed on the condition that the content provider (such as the copyright owner) approves the transfer. Then, the content data is transmitted in an encrypted state through a transmission line and the encrypted content data is decrypted before being stored in a secondary recording medium. In addition, rights are managed for check-outs and check-ins.

In this way, since an operation to copy and record content data in an unencrypted state is permitted, more convenience is offered to the user without losing the function to protect a copyright.

By adoption of such a technique in a system including a personal computer used as the data transfer apparatus and a mini-disc recorder used as a data-recording apparatus, a transfer of a content from a primary recording medium implemented by an HDD employed in the personal computer to a secondary recording medium implemented by a mini disc mounted on the mini-disc recorder is actually well suitable for both the content provider and the user.

By using a medium such as a mini disc, which has been becoming popular in general, as the destination of a check-out described above, the usefulness of the mini disc in practical use is increased. However, there are cases in which the data transfer apparatus such as a personal computer may not be capable of recognizing the condition or other attributes of a medium adopting its own unique data management method. An example of the medium adopting its own unique data management method is a mini disc.

For instance, content data recorded in a memory card given as an example of a medium conforming to the SDMI standard is managed by using a FAT so that the memory card is well compatible with a personal computer. That is to say, the personal computer serving as a data transfer apparatus is capable of obtaining information on the state of the memory card connected as a removable medium used as a destination in a check-out by merely reading out a FAT from the card. The state of the memory card typically includes the storage capacity of the card and the number of contents recorded on the card.

Thus, when it is desired to transfer out certain content data to the memory card in a check-out, it is possible to form a judgment as to whether or not the content data can be transferred out to the memory card on the basis of the storage capacity of the card and other information.

In the case of a medium developed as a medium adopting its own unique data management method for typically audio-data applications as is the case with a mini disc, however, the personal computer is not capable of directly obtaining information on the state of the medium so that the judgment cannot be formed in a check-out or other operations.

Thus, when the use of a mini disc or another medium as a secondary recording medium at the destination of a check-out is assumed, the personal computer serving as a data transfer apparatus is required to have a method allowing the state of the mini disc or the other medium to be recognized.

DISCLOSURE OF INVENTION

It is thus an object of the present invention addressing the problems described above to provide a data transfer apparatus with a capability of properly recognizing a state of a secondary recording medium for recording content data in an unencrypted state prior to a transfer of content data in an unencrypted state between a primary recording medium employed in the data transfer apparatus and the secondary recording medium.

In order to achieve the object described above, present invention provides a data transfer system including the data transfer apparatus and a data-recording apparatus, on which the secondary recording medium is mounted.

The data transfer apparatus provided by the present invention includes primary-recording-medium drive means for recording and reproducing data onto and from a primary recording medium, storage control means for controlling the primary-recording-medium drive means to store content data onto the primary recording medium in an encrypted state, communication means for carrying out a variety of data communications including a transfer of content data between the data transfer apparatus and an external data-recording apparatus for recording and reproducing data onto and from a secondary recording medium command-transmission control means for controlling the communication means to transmit a command making a request for information on the secondary recording medium to the data-recording apparatus, and information acquisition means for obtaining the information on the secondary recording medium transmitted by the data-recording apparatus.

The data transfer apparatus forms a judgment as to whether or not content data stored in the primary recording medium is to be transferred to the data-recording apparatus on the basis of the information on the secondary recording medium obtained by the information acquisition means.

The data-recording apparatus provided by the present invention includes communication means for carrying out a variety of data communications with an external data transfer apparatus, which include reception of content data from the data transfer apparatus, secondary-recording-medium drive means for recording and reproducing data onto and from a secondary recording medium, decryption means for decrypting encrypted content data received from the data transfer apparatus into content data in an unencrypted state, recording control means for controlling the secondary-recording-medium drive means to store the encrypted content data decrypted by the decryption means onto the secondary recording medium in an unencrypted state, and command-transmission control means for controlling the communication means to transmit information on the secondary recording medium, which is information requested by the data transfer apparatus, to the data transfer apparatus in accordance with a command received from the data-recording apparatus making a request for the information.

In addition, the present invention provides a data transfer apparatus having a primary recording medium for storing encrypted content data with a data transfer method to be implemented when the data transfer apparatus is connected to a data-recording apparatus capable of recording and reproducing the content data onto and from a secondary recording medium in an unencrypted state to make the data transfer apparatus and the data-recording apparatus capable of communicating with each other in order to execute a confirmation procedure for confirming that the secondary recording medium has been mounted on the data-recording apparatus, an information acquisition procedure for acquiring information on the secondary recording medium mounted on the data-recording apparatus, an authentication procedure for authenticating validity of the data-recording apparatus as an apparatus to serve as a destination of a transfer of content data stored in the primary recording medium, a judgment procedure for forming a judgment as to whether or not processing is to be carried out to transfer the content data stored in the primary recording medium to the data-recording apparatus on the basis of the information acquired by the information acquisition procedure, and a transfer procedure for transferring the content data in accordance with a result of the judgment formed by the judgment procedure.

In the data transfer system, the data transfer apparatus, the data-recording apparatus and the data transfer method, the information on a secondary recording medium includes information indicating whether or not the secondary recording medium has been mounted on the data-recording apparatus, information on the name of the secondary recording medium mounted on the data-recording apparatus, information on the names of pieces of content data stored in the secondary recording medium mounted on the data-recording apparatus, information on the storage capacity of the secondary recording medium mounted on the data-recording apparatus, information on the number of pieces of content data stored in the secondary recording medium mounted on the data-recording apparatus and information on attributes of pieces of content data stored in the secondary recording medium mounted on the data-recording apparatus.

In accordance with the present invention described above, prior to a check-out of content data from the data transfer apparatus to the data-recording apparatus, the data transfer apparatus is capable of acquiring information on a secondary recording medium used as the destination of the check-out. To be more specific, the data transfer apparatus is capable of obtaining information on the secondary recording medium such as a mini disc, which is information on the secondary recording medium's name, storage capacity, track count (content count), track names and attributes. Thus, the data transfer apparatus is capable of forming a proper judgment as to whether or not the check-out is to be accomplished on the basis of the condition of the secondary recording medium.

BRIEF DESCRIPTION OF DRAWINGS

FIGS. 2A and 2B are each an explanatory diagram showing an EKB of the encryption technique adopted by the embodiment;

FIG. 3 is an explanatory diagram showing the structure of the EKB of the encryption technique adopted by the embodiment;

FIG. 10 is an explanatory diagram showing U-TOC (user table of contents) sector 0 of a mini-disc system;

FIG. 19 is an explanatory diagram showing a record-object control command used in the embodiment;

FIG. 20 is an explanatory diagram showing a record-object response command used in the embodiment;

FIG. 21 is an explanatory diagram showing a check-out control command used in the embodiment;

FIG. 22 is an explanatory diagram showing a check-out response command used in the embodiment;

FIG. 24 is an explanatory diagram showing a check-in control command used in the embodiment;

FIG. 25 is an explanatory diagram showing sub-functions of the check-in control command used in the embodiment;

FIG. 26 is an explanatory diagram showing a check-in response command used in the embodiment;

FIG. 31 is an explanatory diagram showing an inclusive log-in control command used in the embodiment;

FIG. 32 is an explanatory diagram showing an inclusive log-out control command used in the embodiment;

FIG. 33 is an explanatory diagram showing a get-disc-status control command used in the embodiment;

FIG. 34 is an explanatory diagram showing a get-disc-status response command used in the embodiment;

FIG. 35 is an explanatory diagram showing a get-disc-name control command used in the embodiment;

FIG. 36 is an explanatory diagram showing a get-disc-name response command used in the embodiment;

FIG. 37 is an explanatory diagram showing a get-disc-capacity information control command used in the embodiment;

FIG. 38 is an explanatory diagram showing a get-disc-capacity information response command used in the embodiment;

FIG. 39 is an explanatory diagram showing a get-disc-capacity information response command used in the embodiment;

FIG. 40 is an explanatory diagram showing a get-audio-track-count control command used in the embodiment;

FIG. 41 is an explanatory diagram showing a get-audio-track-count response command used in the embodiment;

FIG. 42 is an explanatory diagram showing a get-audio-track-names control command used in the embodiment;

FIG. 43 is an explanatory diagram showing a get-audio-track-names response command used in the embodiment;

FIG. 44 is an explanatory diagram showing a read-info-block-for-track-attributes control command;

FIG. 45 is an explanatory diagram showing a read-info-block-for-track-attributes response command;

FIG. 46 is an explanatory diagram showing a read-info-block-for-track-mode control command;

FIG. 47 is an explanatory diagram showing a read-info-block-for-track-mode response command;

FIG. 48 is an explanatory diagram showing a read-info-block-for-track-size control command; and FIG. 49 is an explanatory diagram showing a read-info-block-for-track-size response command.

BEST MODE FOR CARRYING OUT THE INVENTION

A preferred embodiment of the present invention is explained in paragraphs arranged in the following order.
1. Tree Structure of Encryption Keys and EKB
2. System Configuration
3. Data Paths of SDMI Contents
4. Typical Configuration of Data Transfer Apparatus (Primary-Recording-Medium Apparatus or PC)
5. Typical Configuration of Data-Recording Apparatus (Secondary-Recording-Medium Apparatus or Recording/Reproduction Apparatus)
6. Management Technique of Mini Disc
7. Authentication Process
8. Content Encryption Technique
9. Content Check-Outs/Check-Ins
10. Generation and Management Technique of Content IDs
11. Acquisition of Medium Information 1. Tree Structure of Encryption Keys and EKB First of all, before the transfer system implemented by an embodiment of the present invention is explained concretely, an organization of encryption keys used in distribution of contents is described.

To begin with, the following description explains an encryption-key ownership scheme for devices and a data distribution scheme, which are adopted when encrypted data is distributed from a content distributor to the devices each serving as a content recipient, by referring to FIGS. 1, 2A, 2B and 3.

Figure 1:
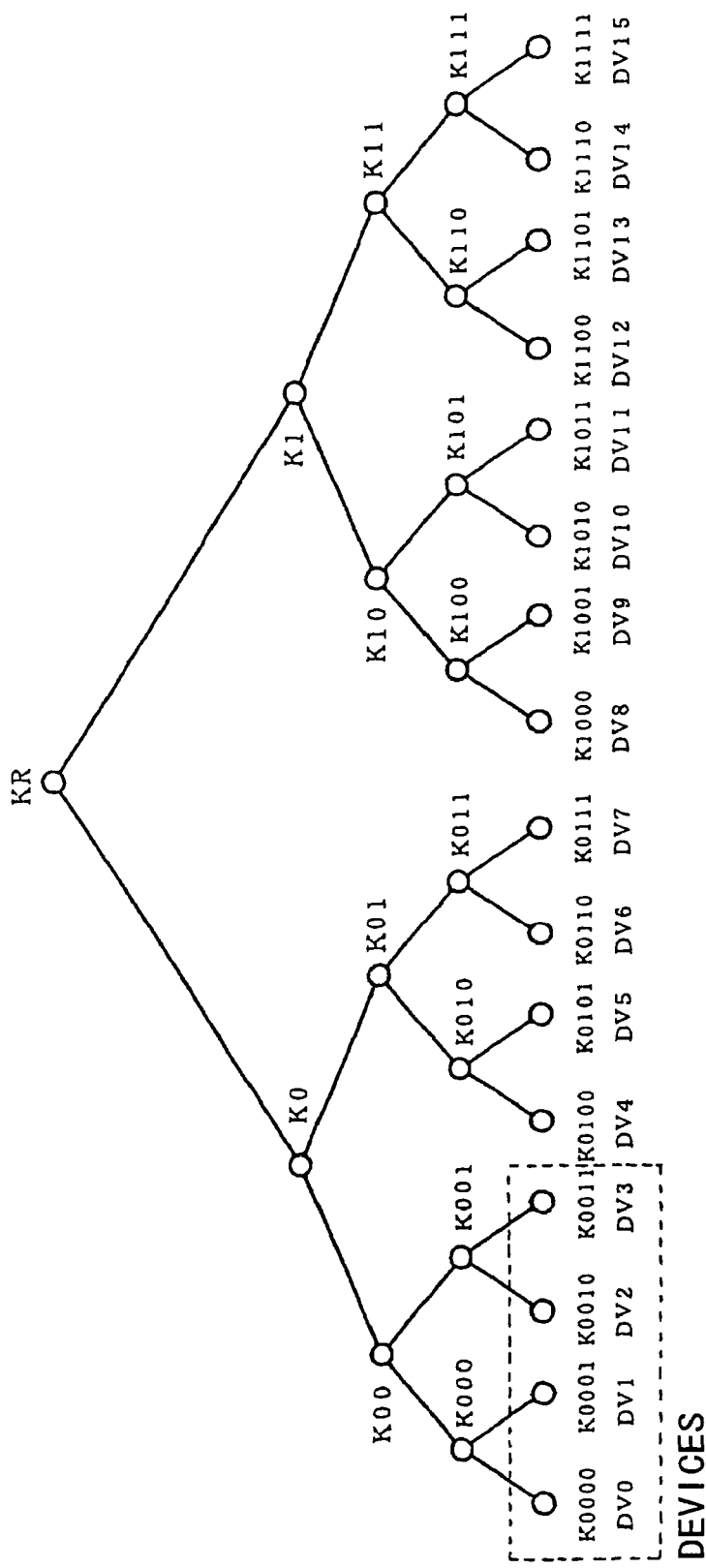
FIG. 1 is an explanatory diagram showing a tree structure of an encryption technique adopted by an embodiment of the present invention.

FIG. 1 is an explanatory diagram showing a tree structure of encryption keys. Reference notations DV0 to DV15 at the bottom layer of the hierarchical tree structure shown in FIG. 1 each denote a device on the content-recipient side. Thus, each leaf of the hierarchical tree structure corresponds to such a device.

Each of the devices DV0 to DV15 is given a set of keys at a manufacturing time, at a shipping time or thereafter. Stored in a memory employed in each of the devices, the set of keys given to a device includes a leaf key assigned to a leaf representing the device in the hierarchical tree structure shown in FIG. 1 and node keys each assigned to a node between the leaf and the root in the hierarchical tree structure. Keys included in this key set are referred to as DNKs (Device Node Keys), examples of which are explained as follows.

K0000 to K1111 at the bottom layer of the hierarchical tree structure shown in FIG. 1 are leaf keys given to the devices DV0 to DV15 respectively. KR is the root key assigned to the root on the top of the hierarchical tree structure. K000 to K111 are node keys assigned to nodes on a second hierarchical layer from the bottom layer. In the following description, the node keys may mean node keys including root key KR assigned to the root.

In the hierarchical tree structure shown in FIG. 1, DNKs given to device DV0 include a leaf key K0000, node keys K000, K00 and K0 as well as a root key KR. The node keys K000, K00 and K0 and the root key KR, which are included in the DNKs, are each held by device DV0 in a state of being encrypted by using the leaf key K0000.

By the same token, DNKs given to device DV5 include a leaf key K0101, node keys K010, K01 and K0 as well as the root key KR. In the same way, DNKs given to device DV15 include a leaf key K1111, node keys K111, K11 and K1 and the root key KR.

It is to be noted that, while only 16 devices DV0 to DV15 are shown in the tree structure shown in FIG. 1 and the tree structure is designed as a balanced right-left symmetrical structure having 4 hierarchical layers, the tree structure may include more devices and has a configuration with a layer count varying from portion to portion.

In addition, a variety of information-processing apparatus included in the tree structure shown in FIG. 1 have a variety of recording mediums. The information-processing apparatus are devices of a variety of types. The devices have recording mediums such as a DVD, a CD, an MD and a flash memory, which are either embedded in the devices or can be mounted on and dismounted from the devices with a high degree of freedom. In addition, a variety of application services may be rendered for the information-processing apparatus. The tree structure shown in FIG. 1 is used for distributing contents and keys to the devices carrying out a variety of applications.

In a system wherein these various information-processing apparatus (or devices) and application exist, let a group be set to include devices DV0, DV1, DV2 and DV3 using the same recording medium. In the tree structure shown in FIG. 1, the device group is enclosed by a dashed line. Assume for example that, for all the devices, a content provider encrypts a content to be transmitted to the devices pertaining to the group enclosed by the dashed line to be used as a content common to the devices. In this case, the content provider also transmits contents keys to the devices to be used by the devices as keys common to the devices. Other processing in the system includes transmission of encrypted payment data of content fees from the devices to the content provider, a financial settlement institution or another enterprise. The enterprise such as the content provider or the financial settlement institution carries out processing to transmit collectively data to the devices enclosed by the dashed line, namely, DV0, DV1, DV2 and DV3. The enterprise exchanges data with the devices, which form the aforementioned group. A plurality of such groups exists in the tree structure shown in FIG. 1. The enterprise such as the content provider or the financial settlement institution, which exchanges data with the devices, functions as message-data distribution means.

It is to be noted that that node keys and leaf keys can also be managed by a single key management center in an integrated manner. As an alternative, the keys can also be managed by the message-data distribution means, which exchanges various kinds of data with groups cited above, in group units. As mentioned above, the message-data distribution means is an enterprise such as a content provider or a financial settlement institution. A node key and/or a leaf key are renewed when one of them has been leaked. Processing to renew keys is carried out by a key management center, a provider, a financial settlement institution or another enterprise.

As is obvious from FIG. 1, in this tee structure, the 4 devices, namely, DV0, DV1, DV2 and DV3, which are included in the group, have common keys: node keys K00 and K0 and the root key KR. By assigning these node and root keys to the devices DV0, DV1, DV2 and DV3 in the group as keys common to the devices, a common content can be provided to only the devices.

By setting the shared node key K00 itself as a content key, for example, a content key common to the devices DV0, DV1, DV2 and DV3 can be set for only the devices without transmitting a new key. As an alternative, a new content key CK is encrypted by using the node key K00 to produce an encrypted key E (K00, CK), which is then distributed to the devices DV0, DV1, DV2 and DV3 by way of a network, or by using a recording medium for recording the encrypted key and supplying the medium to the devices. In this way, only the devices DV0, DV1, DV2 and DV3 are capable of decrypting the encrypted key E (K00, CK) by using the node key K00 shared thereby as a common key to produce the content key CK.

Assume that it is discovered at a time t that keys K0011, K001, K00, K0 and KR, which are owned by the device DV3, have been analyzed by a hacker and hence exposed to the hacker. In this case, it is necessary to detach the device DV3 from the system or, specifically, the group including the devices DV0, DV1, DV2 and DV3, in order to protect data exchanged with the system thereafter.

In addition, it is also necessary to renew the keys K001, K00, K0 and KR to keys K(t)001, K(t)00, K(t)0 and K(t)R respectively and to transmit the renewed keys K(t)001, K(t)00, K(t)0 and K(t)R to the devices DV0, DV1 and DV2. It is to be noted that notation K(t)aaa denotes a key Kaaa's renewed key of a t generation.

It is needless to say that, in a distribution of a content, node keys and the root key KR may also be renewed in some cases for a variety of reasons including a desire of the copyright owner and a state of transmission to the system.

Thus, when a key is renewed, it is necessary to transmit the renewed key to regular devices owning the pre-renew key.

Next, processing to distribute renewed keys is explained. Updated keys are organized and transmitted by using a table like one shown in FIG. 2A. The table is transmitted to a device by way of a network, or by storing the table in a recording medium and providing the medium to the device. The table contains a block data called an EKB (Enabling Key Block). If the device DV3 is detached from the system as described above, for example, the EKB is supplied to the devices DV0, DV1 and DV2.

It is to be noted that the EKB contains encrypted keys obtained as results of encrypting new keys to be distributed to some devices at leaves of a tree structure like the one shown in FIG. 1. The EKB is also referred to as a KRB (Key Renewal Block).

The block data of the EKB shown in FIG. 2A includes encrypted renewed node keys that can be decrypted by devices needing the renewed node keys. The typical EKBs shown in FIGS. 2A and 2B are each block data created for the purpose of distributing renewed node keys of the t generation to the devices DV0, DV1 and DV2 in the tree structure shown in FIG. 1.

Assume that the keys K001, K001, K00, K0 and KR have been illegally exposed to unauthorized person. In this case, the devices DV0 and DV1 require renewed keys K(t)00, K(t)0 and K(t)R whereas the device DV2 requires renewed keys K(t)001, KT00, K(t)0 and K(t)R.

As shown in FIG. 2A, the EKB includes a plurality of encrypted renewed keys. An encrypted renewed key at the bottom of the EKB is E (K0010, K(t)001), which is a result of encrypting a renewed key K(t)001 by using the leaf key K0010 owned by the device DV2. Thus, the device DV2 is capable of decrypting the encrypted renewed key E (K0010, K(t)01) by using the leaf key owned by the device itself to get the renewed node key K(t)001.

In addition, an encrypted renewed key E (K(t)001, K(t)00) on the second line from the bottom of the EKB shown in FIG. 2A can be decrypted by using the renewed node key K(t)001 to get a renewed node key K(t)00. Then, an encrypted renewed key E (K(t)00, K(t)0) on the second line from the top of the EKB can be decrypted by using the renewed node key K(t)00 to get a renewed node key K(t)0. Finally, an encrypted renewed key E (K(t)0, K(t)R) on the top line of the EKB can be decrypted by using the renewed node key K(t)0 to get a renewed root key K(t)R.

As for the devices DV0 and DV1, the leaf keys K0000 and K0001 as well as the node key K000 are not renewed. Thus, only the renewed keys K(t)00, K(t)0 and K(t)R are needed.

Therefore, in the case of the devices DV0 and DV1, an encrypted renewed key E (K(t)000, K(t)00) on the third line from the top of the EKB shown in FIG. 2A can be decrypted by using the renewed node key K(t)000 to get a renewed node key K(t)00. Then, an encrypted renewed key E (K(t)00, K(t)0) on the second line from the top of the EKB can be decrypted by using the renewed node key K(t)00 to get a renewed node key K(t)0. Finally, an encrypted renewed key E (K(t)0, K(t)R) on the top line of the EKB can be decrypted by using the renewed node key K(t)0 to get a renewed root key K(t)R.

As described above, the devices DV0, DV1 and DV2 are capable of obtaining the renewed root key K(t)R. It is to be noted that indexes included in the EKB shown in FIG. 2A are each an absolute address of a leaf or node key used as a decryption key for decrypting an encrypted key on the same line as the index.

As another example, assume that the renewed root key K(t)R and the renewed node key K(t)0 on the high hierarchical layer of the tree structure shown in FIG. 1 are not required, and only the node key K00 needs to be renewed. In this case, the EKB shown in FIG. 2B can be used for distributing a renewed node key K(t)00 to the devices DV0, DV1 and DV2.

The EKB shown in FIG. 2B can be used typically for distributing a new content key common to devices pertaining to a specific group.

To put it concretely, the devices DV0, DV1, DV2 and DV3 pertaining to the group enclosed by the dashed line in FIG. 1 share a recording medium and need a new common content key CK (t). In this case, encrypted data E (K (t)00, CK (t)) and the EKB shown in FIG. 2B are transmitted to the devices DV0, DV1, DV2 and DV3. The encrypted data E (K (t)00, CK (t)) is a result of encrypting the new common content key CK (t) by using a renewed node key K(t)00, which is a result of renewing the node key K00 common to the devices DV0, DV1, DV2 and DV3.

By distributing only the encrypted data E (K (t)00, CK (t)) and the EKB, no data can be decrypted by other devices such as the device DV4 pertaining to other groups.

The devices DV0, DV1 and DV2 process the EKB shown in FIG. 2B in the same way as the processing of the EKB shown in FIG. 2A to get the renewed node key K (t)00 which is used for decrypting the encrypted data E (K (t)00, CK (t)) to obtain the new common content key CK (t) of the t generation.

As described above, keys are organized to form a tree structure, and keys are renewed to be distributed to devices by using EKBs like the ones described above.

By using such a key organization, the root key KR and node keys can be renewed with ease for a variety of reasons and a content in a normal state can be distributed in a flexible manner.

FIG. 3 is a diagram showing a typical format of an EKB. The number of node keys has a length of 4 bytes. A node-key depth also has a size of 4 bytes. The node-key depth is the number of hierarchical layers in the hierarchical tree for a device serving as a destination of the distribution of the EKB.

An EKB version also has a size of 4 bytes. It is to be noted that an EKB version has a function identifying a most recent EKB and a function indicating a relation with a content. A reserved field is an available area.

A field starting from an offset of 16 bytes is a field for storing the EKB's actual data having a size of 16 Mbyte. The actual data is an encrypted node key or a plurality of encrypted node keys. These encrypted node keys are the encrypted keys explained earlier by referring to FIGS. 2A and 2B.

In addition, the format includes an encrypted EKB version and an electronic signature. The electronic signature is put by an EKB-issuing office issuing the EKB. Examples of the EKB-issuing office are a key management center, a content provider and a financial settlement institution. A device receiving an EKB verifies that the EKB-issuing office issuing the EKB is valid by authentication of the signature.

2. System Configuration

The following description explains an embodiment according to the present invention adopting the key organization described above.

Figure 4:
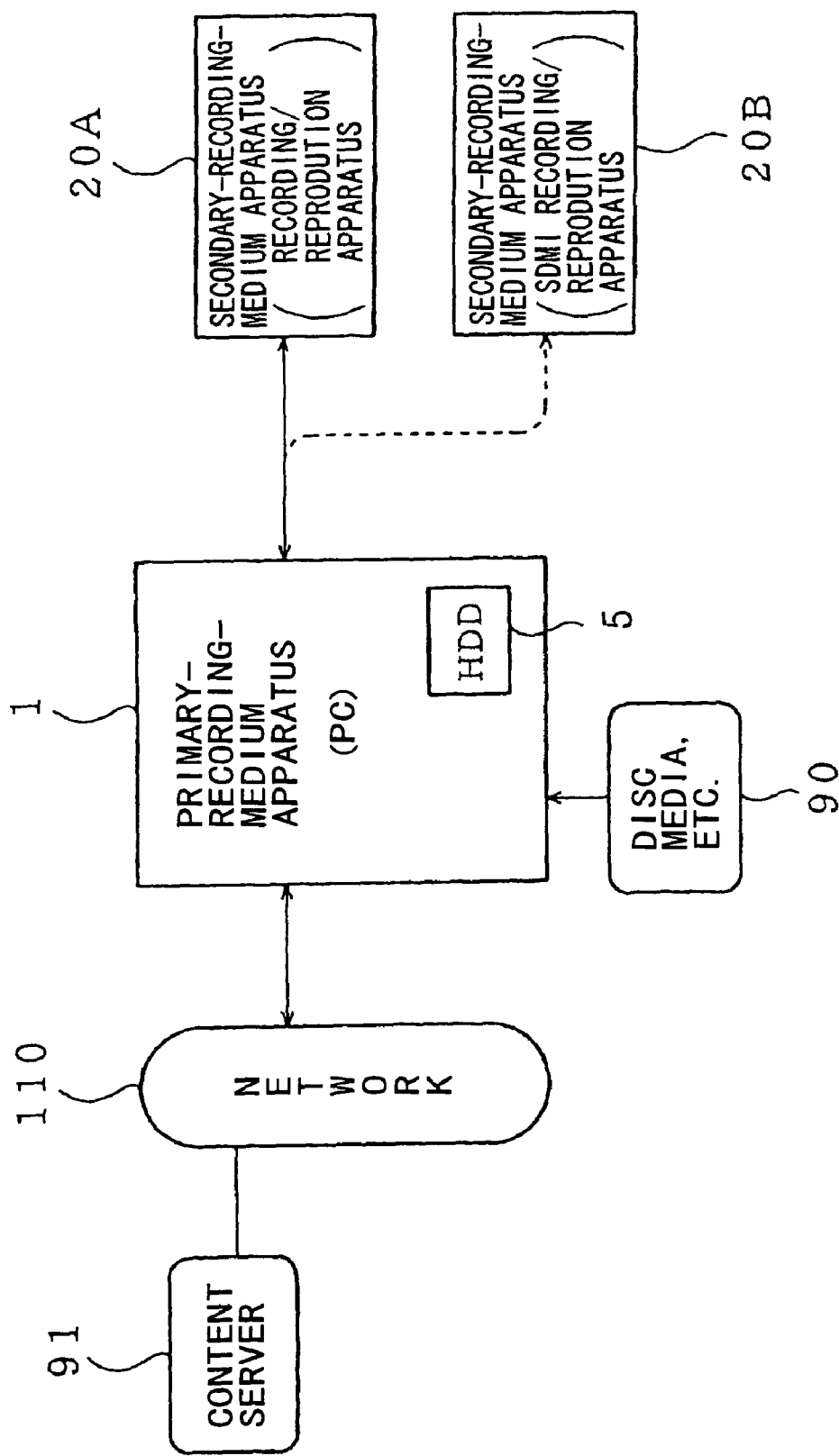
FIG. 4 is a block diagram showing the structure of a data transfer system implemented by the embodiment.

FIG. 4 is a diagram showing a typical system configuration. A primary-recording-medium apparatus 1 corresponds to the data transfer apparatus provided by the present invention. On the other hand, a secondary-recording-medium apparatus 20A corresponds to the data-recording apparatus provided by the present invention. The primary-recording-medium apparatus 1 and the secondary-recording-medium apparatus 20A form a data transfer system.

The primary-recording-medium apparatus 1 is implemented by typically a personal computer. For the sake of convenience, in the following explanation, by a personal computer, the primary-recording-medium apparatus 1 is meant. However, the primary-recording-medium apparatus 1 is not necessarily a personal computer.

In order to carry out operations of the data transfer apparatus provided by the present invention, the personal computer functioning as the primary-recording-medium apparatus 1 executes software for implementing accumulation and transfers of SDMI content data, which are initiated in the personal computer 1.

An HDD 5 embedded in or externally added to the personal computer 1 serves as the primary recording medium (and primary-recording-medium drive means). It is to be noted that, while the HDD 5 is used as the primary recording medium in the explanation of the embodiment, a recording medium functioning as the primary recording medium is not necessarily an HDD. The primary recording medium can be one of a variety of conceivable recording mediums such as an optical disc, a magneto-optical disc, a semiconductor memory embedded in the primary-recording-medium apparatus 1 and a portable semiconductor memory such as a memory card.

The primary-recording-medium apparatus 1 is capable of communicating with a content server 91 through a communication network 110. Content data such as music can be downloaded from the content server 91 to the primary-recording-medium apparatus 1. It is needless to say that a plurality of content servers 91 may be connected to the communication network 110. The user of the primary-recording-medium apparatus 1 can receive a service to download various kinds of data from any arbitrary one of the content servers 91.

Content data downloaded from the content server 91 to the personal computer 1 can be content data conforming to the SDMI standard or content data not conforming to the SDMI standard.

A transmission line forming the communication network 110 is a wire or radio public communication line. As an alternative, a transmission line forming the communication network 110 can be a dedicated line connecting the personal computer 1 to the content server 91. To put it concretely, the communication network 110 can be the Internet, a satellite communication network, an optical fiber network or any other communication line.

The HDD 5 of the personal computer 1 can be an embedded or externally connected disc drive for driving a package medium 90 such as a CD-DA or a DVD, from which content data such as music is reproduced. In the following description, the package medium 90 is also referred to as a disc 90 or a removable recording medium 90.

The personal computer 1 is connected to a secondary-recording-medium apparatus 20A or 20B, to which content data stored in the HDD 5 can be transferred. The secondary-recording-medium apparatus 20A or 20B is a recording apparatus or a recording/reproduction apparatus for recording data onto a secondary recording medium. Thus, content data received from the personal computer 1 can be recorded onto the secondary recording medium in a copy operation.

There are a variety of conceivable examples of the secondary-recording-medium apparatus 20A or 20B. In the following description, however, the secondary-recording-medium apparatus 20B is a recording apparatus conforming to the SDMI standard.

In the secondary-recording-medium apparatus 20B conforming to the SDMI standard, the secondary recording medium is assumed to be a memory card conforming to the SDMI standard. Such a memory card employs a semiconductor memory such as a flash memory. Thus, the secondary-recording-medium apparatus 20B is a recording/reproduction apparatus for recording and reproducing data onto and from a memory card conforming to the SDMI standard. In this case, an SDMI content is recorded on the secondary recording medium in an encrypted state.

There is created an information management format including a content ID stored in the secondary recording medium conforming to the SDMI standard. The content ID is used as an identifier for identifying an SDMI content. When content data is stored in the HDD 5 of the personal computer 1, a content ID is generated by an application for the content data and stored in the HDD 5 along with the content data. In addition, check-outs and check-ins are managed by using content IDs. It is assumed that, when content data is recorded onto the secondary recording medium conforming to the SDMI standard, the content ID of the content data can also be recorded onto the secondary recording medium along with the content data.

On the other hand, the secondary-recording-medium apparatus 20A is a data-recording apparatus not conforming to the SDMI standard. Details of the secondary-recording-medium apparatus 20A will be described later. The secondary recording medium of the secondary-recording-medium apparatus 20A is used for storing an SDMI content, which requires protection of its copyright, in an unencrypted state. An example of this secondary-recording-medium apparatus is a mini disc. Thus, an example of the secondary-recording-medium apparatus 20A is a mini-disc recording/reproduction apparatus. In the following description, the secondary-recording-medium apparatus 20A is also referred to simply as a recording/reproduction apparatus 20A in some cases.

In this case, in order not to lose a function to protect a copyright even if an SDMI content is recorded in an unencrypted state, successful authentication to be described later is taken as a condition for an operation to copy the SDMI content.

A secondary recording medium of the secondary-recording-medium apparatus 20A is a conventional medium, which has been becoming popular. An example of the secondary recording medium is a mini disc. However, the secondary recording medium of the secondary-recording-medium apparatus 20A does not include an area for storing a content ID. For this reason, a special management technique is adopted for content IDs as will be described later.

It is to be noted that a medium, which data is recorded onto and reproduced from by the secondary-recording-medium apparatus 20A, is not limited to a mini disc. Other secondary recording mediums of the secondary-recording-medium apparatus 20A conceivably include a memory card employing a semiconductor memory such as a flash memory, a mini disc functioning as a magneto-optical disc, a CD-R (CD Recordable), a CD-RW (CD Rewritable), a DVD-RAM, a DVD-R and a DVD-RW. Thus, the secondary-recording-medium apparatus 20A can be any recording apparatus as long as the recording apparatus is capable of recording data onto any one of these recording mediums.

The personal computer 1 is connected to the secondary-recording-medium apparatus 20A or 20B by line conforming to a transmission standard such as the USB (Universal Serial Bus) or IEEE-1394 standard. It is needless to say that another kind of transmission line can also be used as long as the other transmission line is capable of transmitting content data or the like. Examples of the other transmission line are a wire transmission line and a radio transmission line.

3. Data Paths of SDMI Contents

Assume for example a system like one shown in FIG. 4. In this case, data paths prescribed by the SDMI standard are shown in FIG. 5.

It is to be noted that a musical content goes through the data path in processing carried out by the personal computer 1, which is provided with the HDD 5 as the primary recording medium, to store the musical content onto the HDD 5 or to transfer the content to an external apparatus such as the secondary-recording-medium apparatus 20A or 20B. In other words, the data paths are implemented by software executed by the personal computer 1 to carry out processing to store the musical content onto the HDD 5 or to transfer the content to the external apparatus.

Figure 5:
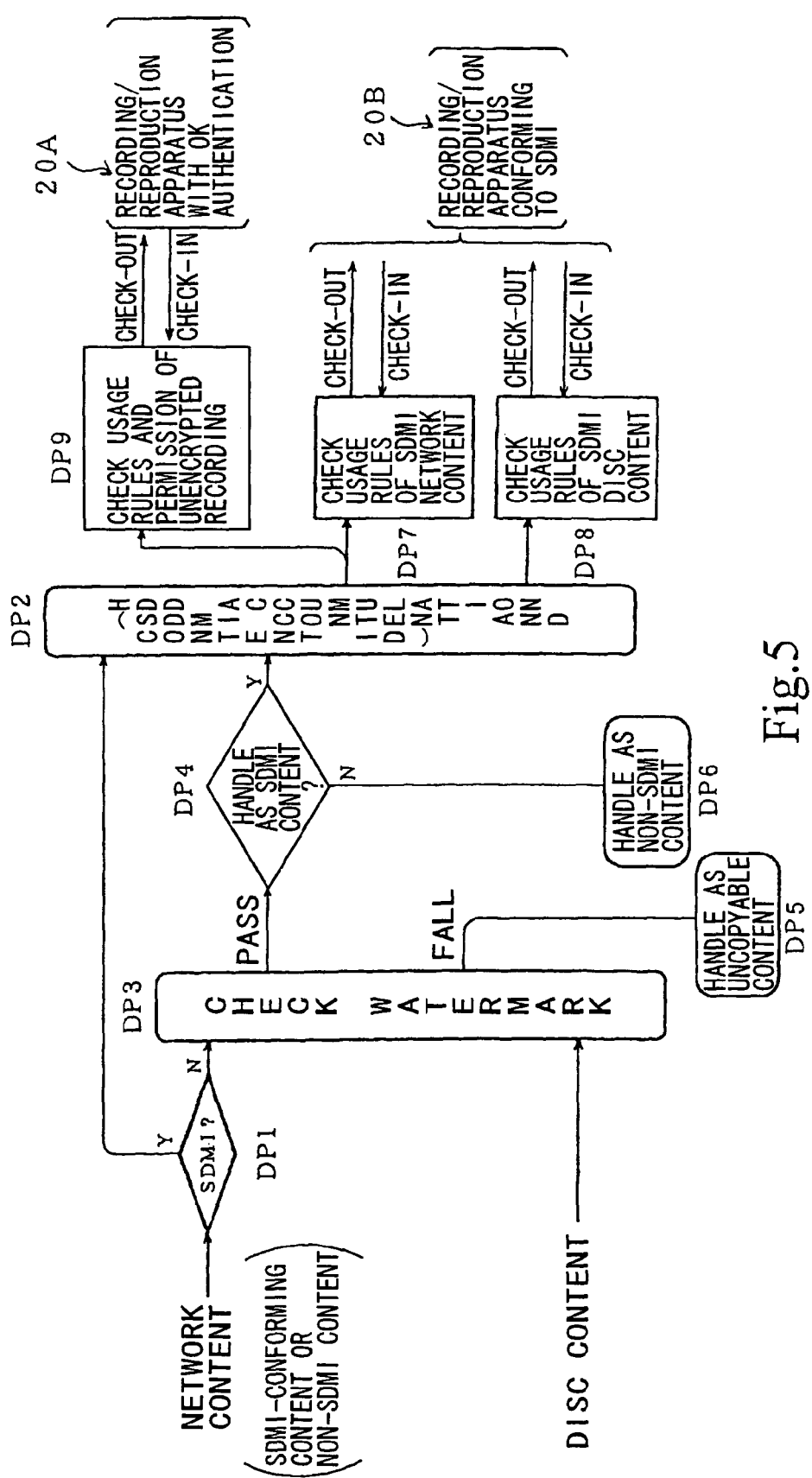
FIG. 5 is an explanatory diagram showing typical data paths of an SDMI content according to the embodiment.

Procedures and processing to store a musical content onto the HDD 5 or to transfer the content to an external apparatus through the data paths shown in FIG. 5 are denoted by reference notations DP1 to DP9. In the following description, reference notations DP1 to DP9 are used to refer to their respective procedures.

In a procedure DP1, content data distributed by the external content server 91 to the personal computer 1 by way of the communication network 110 shown in FIG. 4 is examined to form a judgment as to whether or not the data is a content requiring protection of its copyright in conformity with the SDMI standard. Content data distributed by the external content server 91 to the personal computer 1 by way of the communication network 110 is referred to as a network content.

A network content distributed by the external content server 91 to the secondary-recording-medium apparatus 20A or 20B can be a content conforming to the SDMI standard or a content having nothing to do with the SDMI standard. A content conforming to the SDMI standard and a content having nothing to do with the SDMI standard are referred to as an SDMI-conforming content and a non-SDMI content respectively.

An SDMI-conforming content has been encrypted by using a content key CK in a key encryption process such as a DES process. Typically, the pre-encryption data of an SDMI-conforming content is encoded data A3D compressed by using a compression technique such as ATRAC3. In this case, the encrypted SDMI-conforming content is expressed by reference notation E (CK, A3D).

If the distributed network content is an SDMI-conforming content, the data path continues from the procedure DP1 to a procedure DP2, in which the network content is stored as an SDMI content in the HDD 5 serving as the primary recording device.

In this case, the content data is written into the HDD 5 in the distributed state E (CK, A3D) as it is. As an alternative, the content data is once decrypted before being encrypted again by using another content key CK' to generate encrypted data E (CK', A3D) to be stored onto the HDD 5. That is to say, the content key is changed from CK to CK'.

If the distributed network content is a non-SDMI content, on the other hand, the data path continues from the procedure DP1 to a procedure DP3, in which a watermark-check process is carried out. The watermark-check process is a screening process based on a watermark.

Also in the procedure DP3, a watermark-check process is carried out on a disc content without executing the procedure DP1. A disc content is a content read out from a package medium mounted on a drive embedded in the personal computer 1 or mounted on a disc drive connected to the personal computer 1. An example of the embedded drive is a ROM drive. Examples of the package medium include a CD-DA and a DVD.

That is to say, for a disc content, which is content data not conforming to the SDMI standard, a watermark-check process is carried out.

If the disc content does not pass the watermark-check process, the data path continues from the procedure DP3 to a procedure DP5 in which the disc content is determined to be a content that cannot be copied in the data paths. A variety of conceivable concrete handlings can be implemented through the design of software. For example, such a disc content is stored into the HDD 5 but treated like content data that cannot be transferred for the purpose of copying or moving the data to another medium. As an alternative conceivable handling, such a disc content is not stored in the HDD 5 in the content processing conforming to the SDMI standard.

If the content passes the watermark-check process, that is, if an electronic watermark exists and a copy control bit is confirmed to indicate that a copy operation is permitted, on the other hand, the content is determined to be content data that can be copied legally. In this case, the data path continues to a procedure DP4 to form a judgment as to whether or not the content is to be handled in conformity with the SDMI standard. Whether or not a content is to be handled as data conforming to the SDMI standard is dependent on the software design, a user setting or the like.

If the content is not to be handled in conformity with the SDMI standard, the data path continues to a procedure DP6 in which the content is treated as a non-SDMI content and excluded from the content-data path conforming to the SDMI standard. For example, a transfer of the content to a recording apparatus not conforming to the SDMI standard is enabled.

If the content is to be handled in conformity with the SDMI standard, on the other hand, the data path continues from the procedure DP4 to the procedure DP2 in which the content data is encrypted and stored into the HDD 5 as an SDMI content. To be more specific, the content data is stored into the HDD 5 typically in an E (CK, A3D) or E (CK', A3D) state.

In accordance with the data paths described above, an SDMI network content or an SDMI disc content is stored into the HDD 5, which is used as a primary recording medium. An SDMI network content is a content, which is received from the communication network 110 and to be handled in conformity with the SDMI standard. On the other hand, an SDMI disc content is a content, which is read out from a disc such as a CD-DA or another medium and to be handled in conformity with the SDMI standard.

In addition, for an SDMI content, a content ID unique to the SDMI content is generated and stored into the HDD 5 along with the SDMI content. The content ID is used in management of usage rules, which is executed for each SDMI content as will be described later.

In accordance with a predetermined rule, an SDMI content stored in the HDD 5 is transferred to the recording/reproduction apparatus 20B conforming to the SDMI standard so that the content can be copied to a secondary recording medium also conforming to the SDMI standard. As described above, an SDMI content can be an SDMI network content or an SDMI disc content. In addition, in the case of this embodiment, besides the recording/reproduction apparatus 20B conforming to the SDMI standard, the SDMI content stored in the HDD 5 can also be transferred to the recording/reproduction apparatus 20A not conforming to the SDMI standard under a predetermined condition.

First of all, assume that the personal computer 1 employing the HDD 5 is connected to the recording/reproduction apparatus 20B conforming to the SDMI standard. In this case, an SDMI content stored in the HDD 5 is transferred to the recording/reproduction apparatus 20B as follows.

In the case of an SDMI disc content, a usage rule for transferring the content is determined in advance. In a procedure DP8, the transfer of the SDMI disc content according to the usage rule to the recording/reproduction apparatus 20B conforming to the SDMI standard for the purpose of copying the content to the recording/reproduction apparatus 20B is recognized.

It is to be noted that these data paths are paths of a check-out or an operation to transfer a content from the HDD 5 serving as a primary recording medium to a secondary recording medium such as a memory card mounted on the recording/reproduction apparatus 20B conforming to the SDMI standard or the recording/reproduction apparatus 20A conforming to the SDMI standard to copy the content to be reproduced by the recording/reproduction apparatus 20B or 20A. An operation opposite to a check-out is a check-in, which is an operation to transfer or move a content from the secondary recording medium back to the primary recording medium. It is worth noting that, in such a move operation to transfer a content from the secondary recording medium back to the primary recording medium, the content data is erased from the secondary recording medium.

As a usage rule of a transfer of an SDMI disc content, an upper limit is imposed on the number of allowable check-outs. For example, up to three check-outs are permitted for a piece of content data. Thus, a content can be copied to up to three secondary recording mediums conforming to the SDMI standard in check-out operations. When a content is moved back from a secondary recording medium to the primary recording medium in a check-in, the number of check-outs carried out so far for the content data is decremented by 1. Thus, even after a content has been copied to three secondary recording mediums conforming to the SDMI standard, the content can be copied again to a secondary recording medium conforming to the SDMI standard provided that the content has been moved from one of the three secondary recording mediums in a check-in back to the primary recording medium. That is to say, content data is permitted to exist in up to three secondary recording mediums conforming to the SDMI standard.

Also in the case of an SDMI network content, a usage rule for transferring the content is determined in advance. In a procedure DP7, the transfer of the SDMI network content according to the usage rule to the recording/reproduction apparatus 20B conforming to the SDMI standard for the purpose of copying the content to the recording/reproduction apparatus 20B is recognized.

As a usage rule of a transfer of an SDMI network content, an upper limit is imposed on the number of allowable check-outs as is the case with an SDMI disc content. The upper limit can be the same as or different from the upper limit set for an SDMI disc content. For example, an upper limit of 1 imposed on the number of allowable check-outs is conceivable. In this case, each piece of content data can be copied only to one secondary recording medium conforming to the SDMI standard. If the content data is moved back from the secondary recording medium to the primary recording medium in a check-in, the content data can be copied again to a secondary recording medium conforming to the SDMI standard.

An SDMI content copied in accordance with these usage rules from a primary recording medium to a secondary recording medium conforming to the SDMI standard in a check-out is transferred through a transmission line in an encrypted state. To be more specific, the SDMI content is transferred through a transmission line in an E (CK, A3D) or E (CK', A3D) state.

Then, the SDMI content transferred in an encrypted state is received by the recording/reproduction apparatus 20B conforming to the SDMI standard to be copied to the secondary recording medium in the encrypted state as it is.

In an operation carried out by the recording/reproduction apparatus 20B conforming to the SDMI standard to reproduce the SDMI content copied and recorded to the secondary recording medium, the content is read out from the secondary recording medium and decrypted to reproduce the content. To put it in detail, the content data recorded in the secondary recording medium in the E (CK, A3D) or E (CK', A3D) state is decrypted by using the content key CK or CK' to generate respectively a content D {.CK, E (CK, A3D)}=A3D or D {CK', E (CK', A3D)}=A3D, which is the original unencrypted content data compressed by using the ATRAC3 compression technique. The original unencrypted compressed content A3D is subjected to processing such as a decompression process opposite to the ATRAC3 compression process to carry out demodulation processing to produce output audio data such as music.

As described above, a copyright for content data conforming to the SDMI standard can be properly protected by the encrypted state of the content data along the data paths for a check-out of the content data to the recording/reproduction apparatus 20B conforming to the SDMI standard and the encrypted state of the content data in the secondary recording medium as well as properly protected by copy management executed by checking the usage rules set for content transfers.

If the recording/reproduction apparatus 20A is connected to the personal computer 1, on the other hand, the following processing is carried out.

It is to be noted that, as described above, unlike the recording/reproduction apparatus 20B conforming to the SDMI standard, the recording/reproduction apparatus 20A records a content onto a secondary recording medium such as a mini disc in an unencrypted state. Since a content is recorded onto a mini disc in an unencrypted state, the content data copied to and recorded on the mini disc can be can be reproduced by an ordinary mini-disc reproduction apparatus, which has been becoming popular in general so that more convenience can be offered to the user.

Since a content is recorded onto a mini disc in an unencrypted state, however, a problem is raised in the protection of the copyright for the content. In order to solve this problem, it is necessary to satisfy predetermined conditions for transferring content data to the recording/reproduction apparatus 20A.

In order to transfer an SDMI network content to the recording/reproduction apparatus 20A and record the content onto a secondary recording medium in an unencrypted state in a copy operation, it is necessary to satisfy the following three transfer conditions for the copy operation:

(1) The recording/reproduction apparatus 20A shall pass an authentication process, giving an OK authentication result.
(2) The copyright owner shall recognize the copy operation to transfer the content data to the recording/reproduction apparatus 20A and record the data onto the secondary recording medium.
(3) The transfer of the content data shall abide by usage rules set for check-outs and check-ins.

It is not possible to carry out a copy operation to transfer the content data to an apparatus other than the recording/reproduction apparatus 20B conforming to the SDMI standard in an unrestricted manner even if above transfer conditions (1), (2) and (3) are satisfied. In this way, the function to protect a copyright is preserved. In addition, the function to protect a copyright function due to the fact that content data is transferred through a transmission line in an encrypted state and it is not until the content data is received by the recording/reproduction apparatus 20A that the data is decrypted by the recording/reproduction apparatus 20A.

In a procedure DP9, above transfer conditions (1), (2) and (3) are checked before an SDMI network content is transferred to the recording/reproduction apparatus 20A.

To put it in detail, the recording/reproduction apparatus 20A is subjected to a predetermined authentication process. In addition, flag information or the like included in the content data is examined to verify the copyright owner's intention as to whether or not the copy operation is allowed. Furthermore, the check-out and check-in usage rules are implemented.

An SDMI network content copied to the recording/reproduction apparatus 20A under the conditions described above is transmitted through a transmission line in an encrypted state as it is. To be more specific, the SDMI network content is transmitted through the transmission line in an E (CK, A3D) or E (CK', A3D) state.

Figure 7:
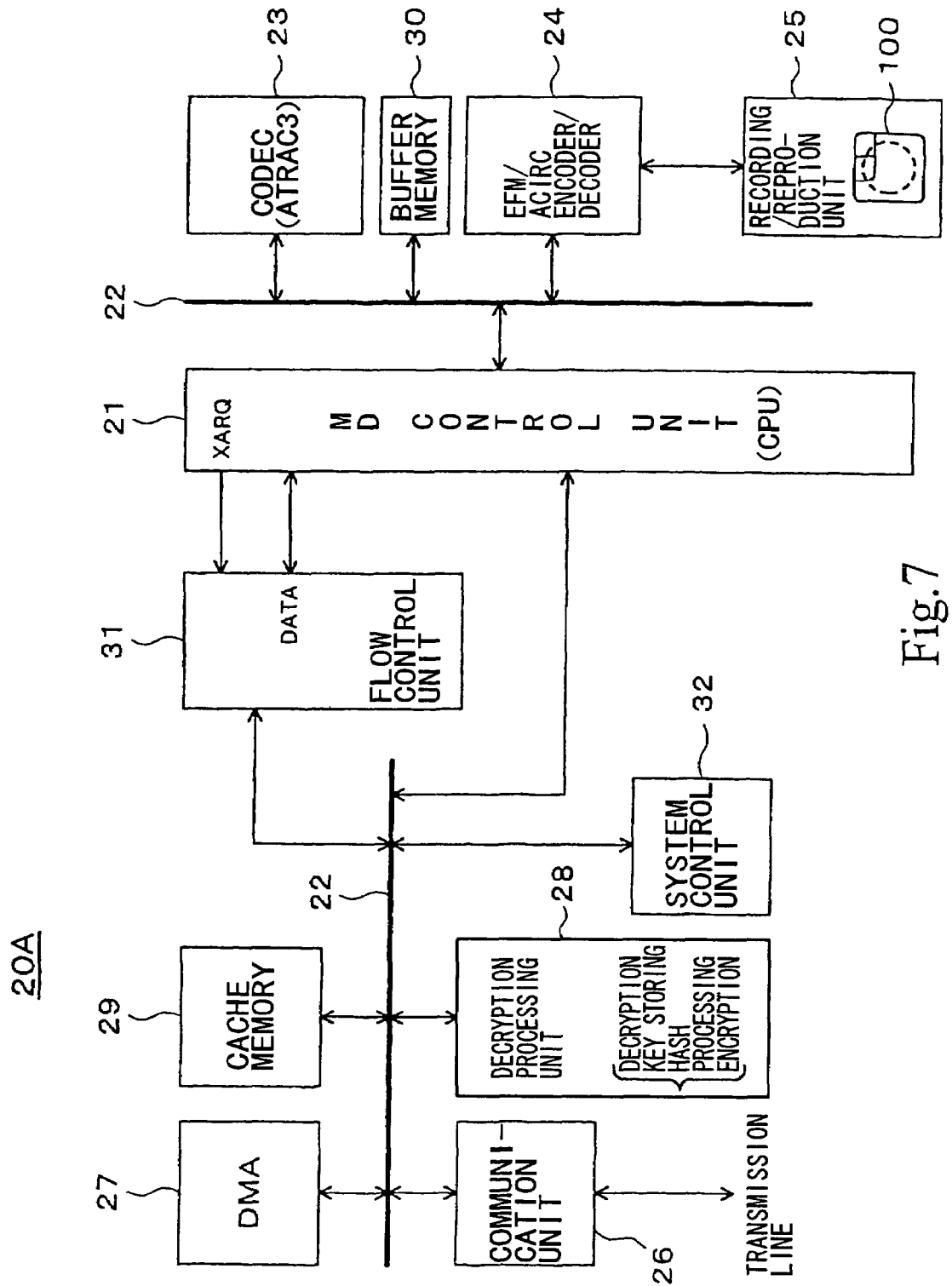
FIG. 7 is a block diagram showing a secondary-recording-medium apparatus provided by the embodiment.

The encrypted SDMI network content is received by the recording/reproduction apparatus 20A having a configuration shown in FIG. 7 and then decrypted by a decryption processing unit 28 to generate the original data A3D compressed by using the ATRAC3 compression technique. Then, the encrypted content data A3D is subjected to an encoding process carried out by an EFM/ACIRC encoder/decoder 24 included in the configuration shown in FIG. 7 before being supplied to a recording/reproduction unit 25 for recording the data onto a mini disc 100.

Thus, in an operation to reproduce the SDMI content copied to and recorded on the mini disc 100, the recording/reproduction apparatus 20A needs to carry out the same decoding processes as an ordinary mini-disc system on data read out from the mini disc 100. The decoding processes include an EFM demodulation process, an ACIRC error correction process and a decompression process adopting a decompression technique as a counterpart of the ATRAC compression technique.

It means that the copied content data recorded on the mini disc 100 can be reproduced normally by an ordinary mini-disc reproduction apparatus when the mini disc 100 is mounted on the apparatus. That is to say, the user can enjoy the SDMI network content copied to and recorded on the mini disc 100 by reproduction of the content by means of an ordinary mini-disc reproduction apparatus not conforming to the SDMI standard.

It is to be noted that, if the transfer of a content is not permitted in accordance with results of checking usage rules in the procedures DP7, DP8 and DP9 in the data paths shown in FIG. 5, the content is of course not transferred to the recording/reproduction apparatus 20A or 20B.

4. Typical Configuration of Data Transfer Apparatus (Primary-Recording-Medium Apparatus or PC)

Figure 6:
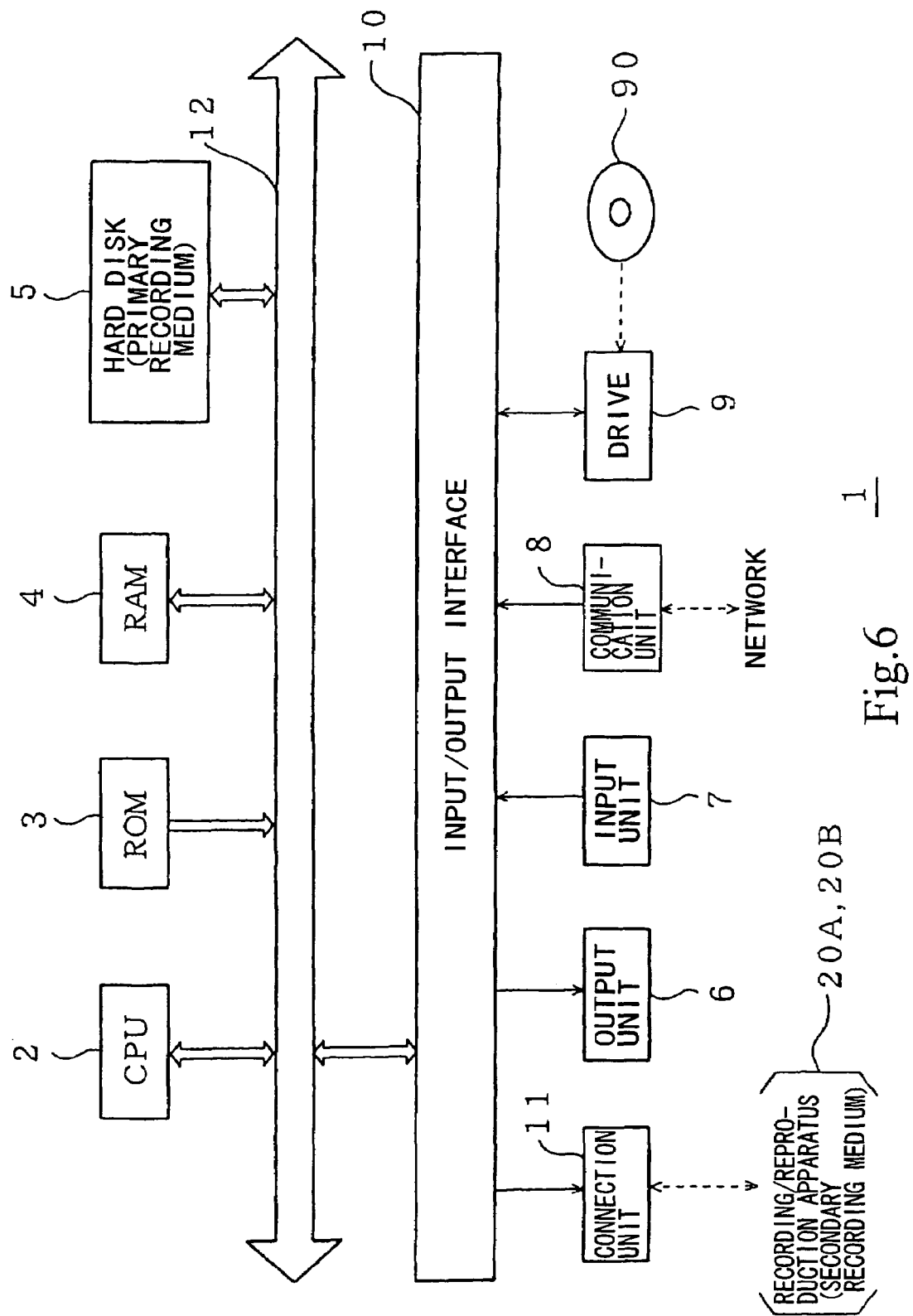
FIG. 6 is a block diagram showing a primary-recording-medium apparatus provided by the embodiment.

FIG. 6 is a block diagram showing the configuration of a primary-recording-medium apparatus 1 functioning as a data transfer apparatus. The following description explains a personal computer used as the primary-recording-medium apparatus 1. By building special-purpose hardware with a configuration for executing the same functions as the primary-recording-medium apparatus 1, however, it is also possible to create an apparatus specially used for data transfers.

In this embodiment, software programs to be executed for carrying out functions of the data transfer apparatus are installed on the personal computer 1 to implement a primary-recording-medium apparatus as the data transfer apparatus. It is to be noted that, in this specification, a personal computer or a computer has a broad meaning of the so-called general-purpose computer.

A software program can be stored in advance in a recording medium embedded in the computer. Examples of the embedded recording medium are the hard disk drive (HDD) 5 and a ROM 3.

As an alternative, a software program can be stored (or recorded) temporarily or permanently in a removable recording medium 90 such as a floppy disc, a CD-ROM (Compact Disc Read-Only Memory), an MO (Magneto Optical) disc, a DVD (Digital Versatile Disc), a magnetic disc and a semiconductor memory. A program stored in the removable recording medium 90 is presented to the user as the so-called package software.

It is to be noted that, in addition to the installation of a program from the removable recording medium 90 into the computer, a program can also be downloaded into the computer from a download site by way of an artificial satellite for digital satellite broadcasting by radio communication or by way of a network such as a LAN (Local Area Network) or the Internet by wire communication. In the computer, the downloaded program is received by a communication unit 8 to be installed in the embedded HDD 5.

The computer 1 shown in FIG. 6 includes an embedded CPU (Central Processing Unit) 2. The CPU 2 is connected to an input/output interface 10 by a bus 12. The CPU 2 executes a program stored in a ROM (Read-Only Memory) 3 in advance in accordance with a command entered to the CPU 2 by way of the input/output interface 10 by the user by operating an input unit 7 such as a keyboard, a mouse or a microphone. As an alternative, the CPU 2 loads a program from the HDD 5 into the RAM (Random-Access Memory) 4 for execution. The program is stored in the HDD 5 from the beginning, received by a communication unit 8 from a satellite or a network and installed in the HDD 5 or read out from the removable recording medium 90 such as an optical disc mounted on a drive 9 and installed in the HDD 5. By executing such a program, the CPU 2 carries out processing of a data transfer apparatus for an SDMI content.

The CPU 2 outputs a result of the processing to an output unit 6 or the communication unit 8 for transmission by way of the input/output interface 10 for example, or records the result into the HDD 5 as required.

In this case, the communication unit 8 is capable of communicating with a variety of servers through the communication network 110 shown in FIG. 4. To be more specific, the computer 1 is capable of downloading a network content such as a musical content from an external content server 91. The downloaded network content is subjected to processing for a content conforming to the SDMI standard or processing not conforming to the SDMI standard along the data paths described above. The downloaded network content completing the processing for a content conforming to the SDMI standard is at least stored as an SDMI content into the HDD 5. The SDMI content stored in the HDD 5 is a content to be transferred to the recording/reproduction apparatus 20B conforming to the SDMI standard or the recording/reproduction apparatus (recording/reproduction apparatus) 20A passing an authentication test.

A connection unit 11 is a member connected between the recording/reproduction apparatus 20A and the recording/reproduction apparatus 20B so that data can be communicated between the primary-recording apparatus 1 and the recording/reproduction apparatus 20A or the recording/reproduction apparatus 20B. Conceivable examples of the connection unit 11 are a USB interface and an IEEE-1394 interface. It is needless to say that a wire interface conforming to other standards and a radio interface using an infrared ray or a wave can be used as the connection unit 11.

It is to be noted that the various kinds of processing for implementing the data paths described earlier by referring to FIG. 5 do not have to be sequential processing along the time axis, but the processing for implementing the data paths may include pieces of processing to be carried out concurrently or individually (Examples of the processing to be carried out concurrently or individually are concurrent processing and object oriented processing).

A program can be carried out by a single computer or a plurality of computers in the distributed processing. In addition, a program can be transferred to a remote computer to be executed thereby.

5. Typical Configuration of Data-Recording Apparatus (Secondary-Recording-Medium Apparatus or Recording/Reproduction Apparatus)

FIG. 7 is a block diagram showing a typical configuration of the recording/reproduction apparatus 20A.

In this case, the recording/reproduction apparatus 20A is configured by a mini disc recorder, for example. A secondary recording medium 100 is a mini disc (or a magneto-optical disc). The secondary recording medium 100 is also referred to hereafter as the mini disc 100.

It is to be noted that FIG. 7 shows the configuration of the recording/reproduction apparatus 20A including only a system for processing data to be recorded onto or reproduced from the mini disc used as the secondary recording medium 100 and a system for processing data transferred from the primary-recording-medium apparatus 1. Since other systems such as the driving system, the servo system and the reproduction output system are similar to their respective counterparts employed in the ordinary mini-disc recording/reproduction apparatus, their detailed diagrams are omitted.

In the recording/reproduction apparatus 20A, an MD control unit (CPU) 21 serves as a controller for controlling operations to record and reproduce data onto and from the mini disc 100. To put it concretely, the MD control unit 21 controls a rotation driving mechanism, a spindle servo, a focus servo, a tracking servo, a thread servo, operations to apply a laser beam and a magnetic field to an optical head and a magnetic head respectively and processing to encode data to be recorded and decode reproduced data.

A recording/reproduction unit 25 includes an optical head, a magnetic head, a disc-rotation-driving system and a servo system. In actuality, the recording/reproduction unit 25 serves as a member for recording and reproducing data onto and from the mini disc 100.

An EFM/ACIRC encoder/decoder 24 encodes data to be recorded onto the mini disc 100 and decodes data reproduced from the mini disc 100. As is generally known, in the case of a mini-disc system, data to be recorded is subjected to an encoding process for ACIRC error correction codes and an EFM modulation process. The EFM/ACIRC encoder/decoder 24 carries out an ACIRC encoding process and an EFM encoding process on data to be recorded before supplying the data to the recording/reproduction unit 25.

In a reproduction operation, the EFM/ACIRC encoder/decoder 24 carries out decoding processes on data (RF signal) read out from the mini disc 100 and supplied to the EFM/ACIRC encoder/decoder 24 by the recording/reproduction unit 25. The decoding processes include binary conversion processing, EFM demodulation processing and error correction processing adopting the ACIRC technique.

A buffer memory 30 buffers data to be recorded onto the mini disc 100 and data reproduced from the mini disc 100. That is to say, the buffer memory 30 has a buffering function commonly known as a shock-proof function.

In an operation to record data, data compressed and encoded by using the ATRAC/ATRAC3 technique is stored temporarily in the buffer memory 30. The data is then read out in predetermined data units intermittently from the buffer memory 30 and supplied to the EFM/ACIRC encoder/decoder 24 to be recorded onto the mini disc 100.

In an operation to reproduce data, data is read out from the mini disc 100 and decoded by the EFM/ACIRC encoder/ decoder 24. The decoded data is stored temporarily in the buffer memory 30. The stored data is then read out continuously from the buffer memory 30 and supplied to a codec 23 for carrying out a decompression/decoding process.

The codec 23 is a member for carrying out compression processing and decompression processing based on respectively encoding and decoding processes adopting the ATRAC/ATRAC3 technique.

Data to be recorded onto the mini disc 100 is compressed by using the ATRAC/ATRAC3 technique before being subjected to the encoding process. Thus, when the recording/reproduction apparatus 20A receives data, PCM audio data for instance, not completing compression and encoding processes, the codec 23 carries out the compression and encoding processes by adopting the ATRAC or ATRAC3 technique on the data to be recorded, and supplies the compressed data to the EFM/ACIRC encoder/decoder 24.

Data read out from the mini disc 100 by the recording/reproduction unit 25 and decoded by the EFM/ACIRC encoder/decoder 24 in a reproduction operation is a data in a state of being compressed and encoded by adoption of the ATRAC/ATRAC3 technique. The data is supplied to the codec 23 by way of the buffer memory 30. The codec 23 decompresses the data by using a decompression technique as a counterpart of the ATRAC/ATRAC3 technique to generate 16-bit quantized digital audio data having a frequency of 44.1 KHz. The digital audio data is subjected to processing including a D/A conversion process, an analog signal process and an amplification process in an output circuit not shown in the figure to generate a speaker output signal representing reproduced music or the like.

As an alternative, the reproduced signal is output to another apparatus as digital audio data.

The configuration described above includes components of a recording/reproduction apparatus of the ordinary mini-disc system. However, the recording/reproduction apparatus 20A implemented by the embodiment has additional members employed in a personal computer to serve as the primary-recording-medium apparatus 1. To be more specific, used for carrying out processing such as processes to receive transmitted content data and decode the data, the members include a communication unit 26, a DMA 27, a decryption processing unit 28, a cache memory 29, a flow control unit 31 and a system control unit 32.

The system control unit 32 (CPU) is a member for controlling the whole recording/reproduction apparatus 20A.

Typically, the system control unit 32 controls processing such as issuance of a request for generation of data and a communication for authentication between the personal computer 1 and the recording/reproduction apparatus 20A, processing to exchange a variety of commands with the personal computer 1 and processing of content data received from the personal computer 1. In addition, in accordance with the various kinds of control, a command is given to the MD control unit 21 and operations to record and reproduce content data onto and from the mini disc 100 as well as operations to read out and update management information are controlled.

Not shown in the figure, an operation unit and a display unit are provided as a user interface. The system control unit 32 controls processing to monitor operations carried out by the user on the operation unit, processing carried out in accordance with the operations and display processing of the display unit.

Connected to the connection unit 11 of the personal computer 1 shown in FIG. 6, the communication unit 26 is a member for exchanging data with the personal computer 1.

The communication unit 26 processes signals conforming to a communication technique as the USB or IEEE-1394 technique.

Data received by the communication unit 26 from the personal computer 1 includes a variety of commands and an SDMI content.

The SDMI content received by the communication unit 26 is stored in the cache memory 29 by control executed by a DMA (Direct Memory Access) 27. It is to be noted that such a content can of course be stored in the cache memory 29 under control executed by the CPU in place of the DMA 27.

The decryption processing unit 28 is a member for carrying out counterpart processing of the process to encrypt an SDMI content. That is to say, the decryption processing unit 28 decrypts content data stored in the cache memory 29. The unencrypted content data is then stored in another area of the cache memory 29.

Since the SDMI content data has been encrypted by using a content key CK or CK', information usable for recognizing at least the content key CK or CK' is stored. As will be described later concretely, the DNKs (Device Node Keys) explained earlier by referring to FIG. 1 are stored. The recording/reproduction unit 25 corresponds to a device (DVx) shown in FIG. 1. DNKs stored in the DVx include a leaf key as well as node keys and a root key, which have been encrypted by using the leaf key. The content key CK can be recognized by using such DNKs or, in some cases, an EKB received as described earlier.

Thus, DNKs are stored information that can be used for recognizing a content key CK for an SDMI content. By using the content key CK, the decryption processing unit 28 is capable of decrypting an encrypted SDMI content received in an encrypted state. The encrypted SDMI content is E (CK, A3D), for example. The result of the decryption is D {CK, E (CK, A3D)}=A3D, which is decrypted data compressed by using the ATRAC3 technique. The decrypted data compressed by using the ATRAC3 technique is encoded by the EFM/ACIRC encoder/decoder 24 before being stored by the recording/reproduction unit 25 onto the mini disc 100.

It is to be noted that the SDMI content is not always data compressed by using the ATRAC3 technique. For example, linear PCM data encrypted by a content key is conceivable. Thus, there is also a method of inputting transferred content in the E (CK, PCM). In this case, as a matter of course, the decryption processing unit decrypts the encrypted content in the E (CK, PCM) to generate D {CK, E (CK, PCM)}=PCM, which is decrypted linear PCM data. In this case, the PCM data is compressed by the codec 23 by using the ATRAC3 technique before being encoded by the EFM/ACIRC encoder/decoder 24 and recorded onto the mini disc 100 by the recording/reproduction unit 25.

A key may be stored in the decryption processing unit 28 in some cases to be used in an authentication process. In a typical authentication process to be described later, the recording/reproduction apparatus 20A uses a stored public key P and a stored secret key S. In this case, the public key P and the secret key S are both stored in the decryption processing unit 28. The secret key S is also used in an encryption process.

In addition, the decryption processing unit 28 includes an embedded hash engine for carrying out the so-called hash-function processing in order to generate a content ID.

It is to be noted that generation of the content ID will be described later.

The decrypted encrypted SDMI content such as data compressed by the ATRAC3 technique or PCM data is transferred from the cache memory 29 to the flow control unit 31.

The flow control unit 31 is a member for transferring the decrypted encrypted SDMI content to an MD control unit 21 serving as a recording process system for recording the data onto the mini disc 100 (The recording process system includes the codec 23, the EFM/ACIRC encoder/decoder 24, the recording/reproduction unit 25 and the buffer memory 30).

The flow control unit 31 transfers the decrypted encrypted SDMI content upon a request (XARQ) made by the MD control unit 21. The flow control unit 31 adjusts timings of reception of content data, decryption processing and processing to record data onto the mini disc 100.

A bus line 22 is a communication line allowing various kinds of data to be exchanged among the MD control unit (CPU) 21, the codec 23, the buffer memory 30, the EFM/ACIRC encoder/decoder 24, the flow control unit 31, the DMA 27, the cache memory 29, the communication unit 26, the decryption processing unit 28 and the system control unit 32.

In the above configuration, as SDMI content data transmitted by the personal computer 1, data in the E (CK, A3D) state or data in the E (CK, PCM) state is decrypted and encoded by the EFM/ACIRC encoder/decoder 24 by using the ATRAC3 compression technique before being recorded by the recording/reproduction unit 25 onto the mini disc 100.

By the way, in a check-in and a check-out of content data between the personal computer 1 and the recording/reproduction apparatus 20A and in other communication sessions, a variety of commands are also transmitted.

These commands are received by the communication unit 26 and passed on to the system control unit 32. The system control unit 32 carries out various kinds of processing in accordance with these commands, and transmits a response to each of the commands from the communication unit 26 to the personal computer 1.

6. Management Technique of Mini Disc

The following description explains data to be recorded onto the mini disc 100 and management information.

In a digital recording/reproduction system such as a mini-disc system, a TOC (Table of Contents) is recorded on a recording medium as management information for controlling operations to record and reproduce data onto and from the medium such as a disc. The recording/reproduction apparatus reads out the TOC information from the recording medium and saves the information in a memory in advance. In recording and reproduction operations, the TOC information is referred to to obtain a write or read position so as to allow an access operation for the recording or reproduction operation to be carried out.

In the case of a mini disc, the TOC information includes a P-TOC (pre-mastered TOC) and a U-TOC (a user TOC). The P-TOC is unchangeable information recorded as pits. The U-TOC is information recorded by adopting a magneto-optical technique. The U-TOC is changed to accompany operations such as processing to record and delete musical data. To put it in detail, when musical data is recorded or deleted, the U-TOC stored in a memory is first of all updated and the updated U-TOC copy is then stored in a U-TOC area on a disc with a predetermined timing.

It is to be noted that, by using the U-TOC, content data such as audio data recorded onto the disc is managed in units each called a track. Typically, 1 track corresponds to a piece of music.

First of all, a data unit called a cluster is explained as data stored in the mini disc 100. In the mini-disc system, as recorded data, a data stream is created for each unit called the cluster. The format of the cluster used as the unit of a recording operation is shown in FIG. 8.

Figure 8:
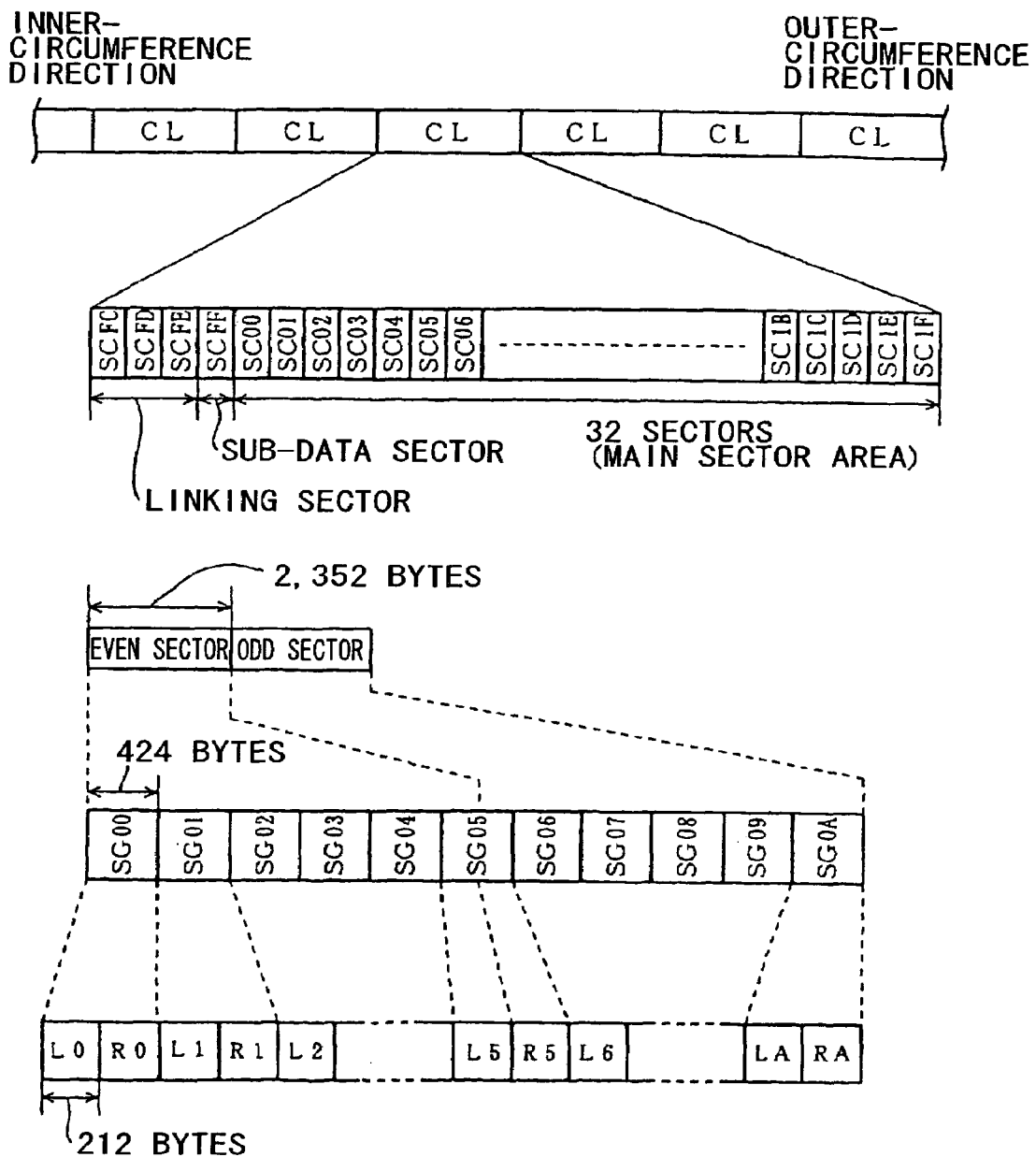
FIG. 8 is an explanatory diagram showing a cluster format of a mini-disc system.

A recorded track in the mini-disc system is a continuous sequence of clusters CL shown in FIG. 8. A cluster is a minimum unit used in a recording operation.

A cluster includes three sector-linking sectors SCFC to SCFE, a sub-data sector SCFF and 32 main sectors SC00 to SC1F. Thus, a cluster includes a total of 36 sectors.

A sector is a data unit having a size of 2,352 bytes.

The sector-linking sectors SCFC to SCFE are used as a buffer area, a break between two consecutive recording operations, and an adjustment area for a variety of operations. The sub-data sector SCFF is used for recording information set as sub-data.

The 32 main sectors SC00 to SC1F are used for recording various kinds of data such as the TOC data and audio data.

A sector is further divided finely into units called sound groups. To be more specific, two sectors are divided into 11 sound groups.

That is to say, as shown in the figure, two consecutive sectors, namely, an even-numbered sector such as a sector SC00 and an odd-numbered sector such as a sector SC01, include sound groups SG00 to SG0A. Each sound group has a size of 424 bytes for storing audio data with an amount corresponding to 11.61 msec.

Data is recorded in one sound group SG, being split into L and R channels. For example, data recorded in the sound group SG00 includes data L0 and data R0. On the other hand, data recorded in the sound group SG01 includes data L1 for the L channel and data R1 for the R channel.

It is to be noted that 212 bytes used as a data area for the L or R channel are referred to as a sound frame.

Figure 9:
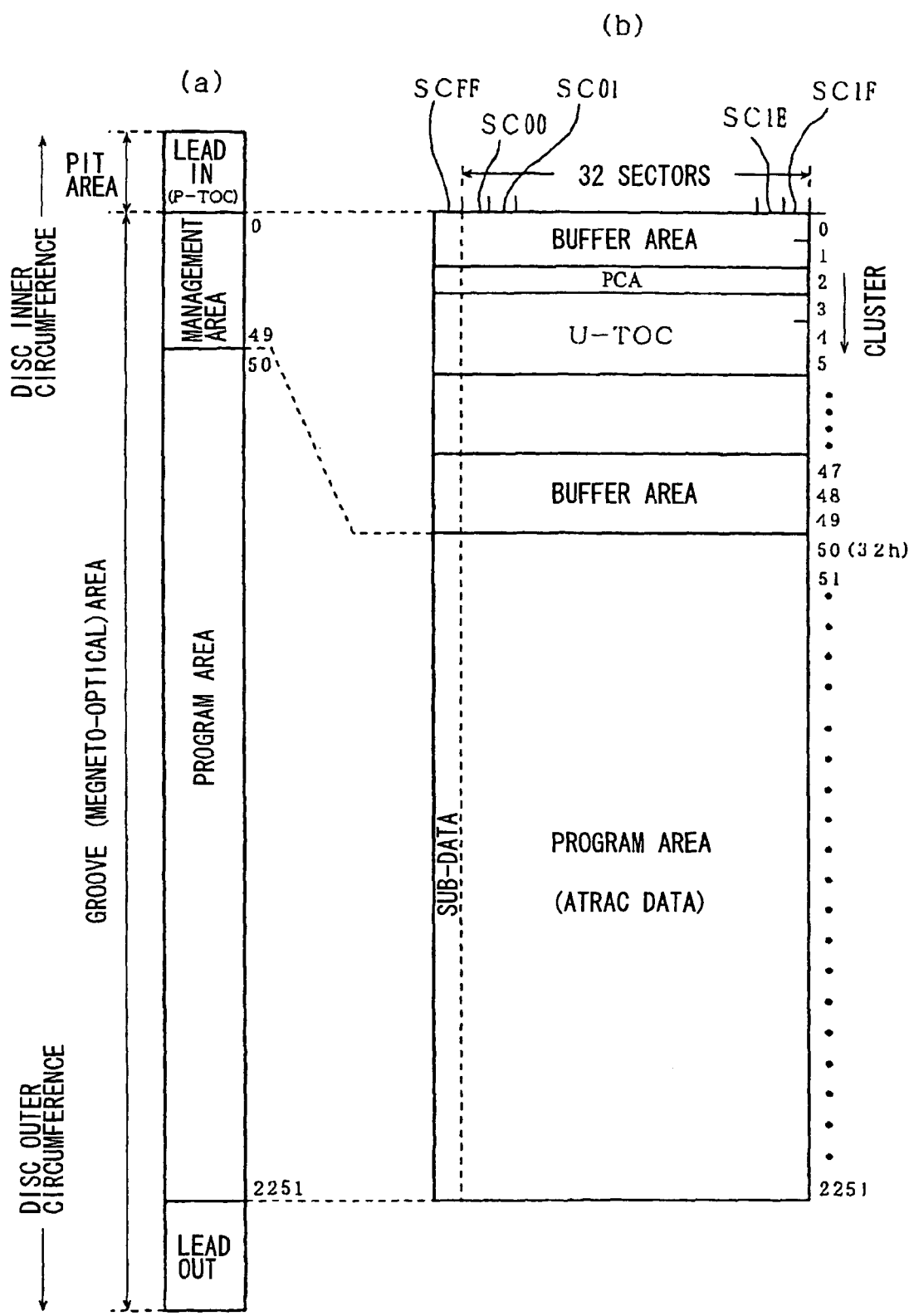
FIG. 9 is an explanatory diagram showing an area structure of a mini disc.

FIG. 9 is diagrams showing the area structure of the mini disc 100.

To be more specific, FIG. 9(*a*) is a diagram showing areas stretched from the disc innermost circumference side to the disc outermost circumference side. The mini disc 100 used as a magneto-optical disc has a pit area on the innermost circumference side. The pit area is a reproduction-only area used for creating data as emboss pits. In this pit area, the P-TOC is recorded.

Circumferences on the outer side of the pit area are a magneto-optical recording/reproduction area. In this area, grooves are created as guide grooves of recording tracks.

A segment from cluster 0 to cluster 49 on the innermost circumference side of the magneto-optical area is used as a management area. Cluster 50 to cluster 2,251 are a program area used for storing each piece of musical data as a track. An area on the outer side of the program area is used as a lead-out area.

On the other hand, FIG. 9(*b*) is a diagram showing details of the management area. In the management area, a horizontal line represents sectors and lines arranged vertically each represent a cluster.

In the management area, clusters 0 and 1 serve as a buffer area with the pit area. Cluster 2 is used as a power calibration area (PCA) for adjusting the output power of a laser beam.

Clusters 3, 4 and 5 are used for recording a U-TOC, the contents of which will be described later in detail. A data format is prescribed in each of the 32 main sectors (SC00 to SC1F) in one cluster, and management information is included in each of the sectors. That is to say, sectors of the U-TOC are prescribed so that the address of each track recorded in the program area and the address of a free area as well as information such as the name of each track and recording times can be recorded in the U-TOC. Three identical clusters 3, 4 and 5, each including sectors used as the U-TOC sectors, are consecutively recorded.

Clusters 47, 48 and 49 are a buffer area with the program area.

It is to be noted that a hatched portion PD is an area in which pre-paid information to be described later is set.

In the program area starting at cluster 50 (or cluster 32$h$ if expressed in the hexadecimal format), 32 main sectors (SC00 to SC1F) in each cluster are used for storing audio data such as music in a compressed form known as the ATRAC form. Each recorded track (or content data) and free areas are managed by using the U-TOC. It is to be noted that the sector SCFF in each cluster in the program area can be used for recording information serving as sub-data as described earlier.

The sectors of the U-TOC are explained by referring to FIG. 10.

It is to be noted that, as explained earlier by referring to FIG. 9, the P-TOC is read-only information created in a pit area on the innermost circumference side of the disc 90. The P-TOC is used for managing locations in areas such as a recordable area of the disc (recordable user area), a lead-out area and a U-TOC area. It is worth noting that, in a reproduction-only optical disc where all data has been recorded in a pit form, the P-TOC can also be used for managing pieces of music recorded in a manner like a ROM. In this case, the U-TOC is not created. No detailed description of the P-TOC is given.

FIG. 10 is an explanatory diagram showing the format of U-TOC sector 0.

Sectors 0 to 32 can be used as U-TOC sectors. In a cluster described above, U-TOC sectors are main sectors SC00 to SC1F.

U-TOC sector 0 is a data area for recording management information for managing free areas in which content data (or tracks) such as recorded pieces of music and new content data can be recorded.

In an operation to record a piece of music onto the mini disc 100, for example, the MD control unit 21 searches U-TOC sector 0 for a free area on the disc, and writes the piece of music into the area. In a reproduction operation, on the other hand, the MD control unit 21 searches U-TOC sector 0 for an area for recording a piece of music to be reproduced, and makes an access to the area to read out the piece of music.

At the start positions of a data area (2,352 bytes=4 bytes× 588) in U-TOC sector 0 shown in FIG. 10, a string of pieces of 1-byte data is recorded as a synchronization pattern. Each piece of 1-byte data includes a string of all 0s or all 1s.

The synchronization pattern is followed by an address with a length of 3 bytes. The first 2 bytes (namely Cluster H and Cluster L), are a cluster address and the third byte is a sector address (Sector). The 3 bytes are followed by a byte (MODE) for storing a mode. The synchronization pattern and the 4 bytes form the header. The 3-byte address is the address of the sector itself.

It is to be noted that the configuration of the header including the synchronization pattern and the address applies not only to U-TOC sector 0, but also to a P-TOC sector and sectors in the program area. The address of a sector itself and a synchronization pattern are recorded in the header to each sector.

Predetermined following byte positions are used for recording data such as a maker code, a model code, the number of the first track (First TNO), the number of the last track (Last TNO), a condition of the used sectors (Used sectors), the disc serial number and the disc ID.

An area following the disc ID is a pointer portion for storing a variety of pointers (namely, P-DFA, P-EMPTY, P-FRA and P-TNO1 to P-TNO255). These pointers each point to a part descriptor in a table to be described later. A part descriptor is a descriptor of an area for storing a track (music and the like) recorded by the user or a descriptor of a free area.

The table associated with the pointers (P-DFA to P-TNO255) is a 255-part-descriptor table including 255 part descriptors (01h to FFh). A part descriptor includes the start address of a part, the end address of the part and the mode of the part (track mode). If a specific part is continued to another part, the descriptor of the specific part also includes a link indicating the part descriptor of the other part. By the same token, the part descriptor of the other part includes the start address of the other part, the end address of the other part and the mode of the other part.

It is to be noted that a track is a portion in the track for recording the data, which is continuous along the time axis, in a physically continuous state.

The start and end addresses are the start and end addresses of a part or each of a plurality of parts composing a piece of music (or track).

Addresses are each recorded in a shortened form, indicating the location of a cluster, a sector or a sound group.

Even if data of a piece of music (track) is recorded in a physically discontinuous manner, that is, recorded over a plurality of parts, a recording/reproduction apparatus of this type is capable of reproducing the piece of music by making accesses to the parts sequentially, one part after another, without causing a reproduction problem. Thus, data such as a piece of music recorded by the user is stored by being split over a plurality of parts for the purpose of using a recordable area with a high degree of efficiency.

For the above reason, a part descriptor includes a link. As described above, if a specific part is continued to another part, the descriptor of the specific part also includes a link indicating the part descriptor of the other part. The link indicating the part descriptor is a number (in the range 01h to FFh) assigned to the part descriptor of the other part.

That is to say, in the table portion of U-TOC sector 0, each part descriptor describes a part. If a piece of music is recorded over three parts, for example, the part descriptor of the first part includes a link to the part descriptor of the second part and the part descriptor of the second part includes a link to the part descriptor of the third part. In this way, the locations of parts are managed.

It is to be noted that the actual byte location (in U-TOC sector 0) of a part descriptor pointed to by a link is expressed numerically by the following equation:

Actual location=304+link×8 (=the size of a part descriptor expressed in terms of bytes).

The contents of a part described by a part descriptor of the table portion in U-TOC sector 0 (with a number in the range 01h to FFh) are determined by which of the pointers (P-DFA, P-EMPTY, P-FRA and P-TNO01 to PTNO255) is associated with the part descriptor as follows.

The pointer P-DFA refers to a defective area on the magneto-optical disc 90. That is to say, the pointer PDFA points to a part descriptor describing a defective area (or a defective track part) caused by an injury or the like or points to the first one of a plurality of part descriptors describing such a defective area or such a defective track part. To be more specific, the pointer P-DFA has a value in the range 01h to FFh. This value is a number assigned to a part descriptor including the start and end addresses of the defective part. If another defective part exists, the part descriptor includes a link to another part descriptor describing the other defective part. If no more defective part exists, the link in the other part descriptor is set at 00h pointing to no part descriptor.

The pointer P-EMPTY points to an unused part descriptor or the first one of a plurality of unused part descriptors. To be more specific, the pointer P-EMPTY has a value in the range 01h to FFh. This value is a number assigned to an unused part descriptor or the first one of a plurality of unused part descriptors.

If a plurality of unused part descriptors exists, the first one pointed to by the pointer P-EMPTY includes a link pointing to the second one, which includes a link pointing to the third one and so on. In this way, all unused part descriptors are put on a linked list.

The pointer P-FRA refers to a free area on the magneto-optical disc 90. A free area is an area into which data can be recorded (including an area from which data has been deleted). That is to say, the pointer P-FRA points to a part descriptor describing a free area (or a free track part) or points to the first one of a plurality of part descriptors describing such a free area or such a free track part. To be more specific, the pointer P-FRA has a value in the range 01h to FFh. This value is a number assigned to a part descriptor including the start and end addresses of the free area. If another free area exists, the part descriptor includes a link to another part descriptor describing the other free area. If no more free area exists, the link in the other part descriptor is set at 00h pointing to no part descriptor.

Figure 11:
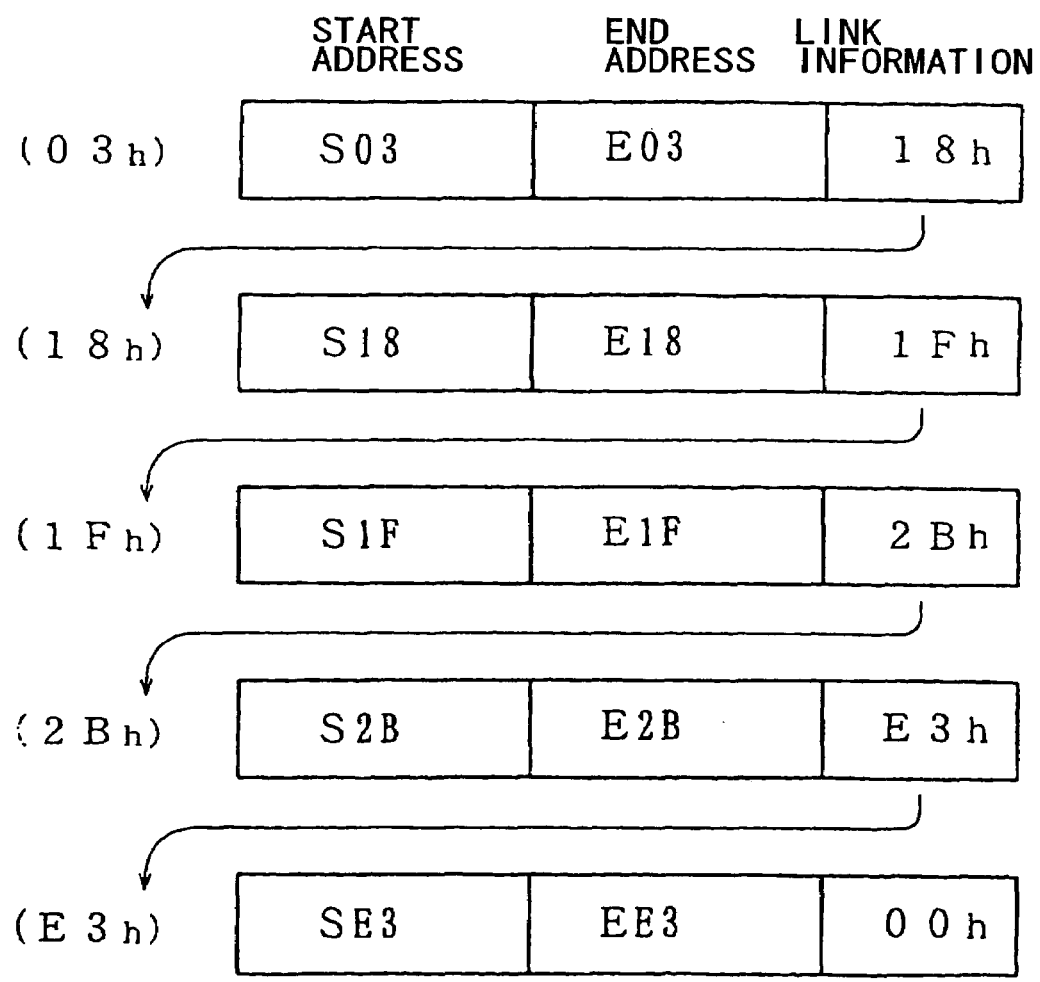
FIG. 11 is an explanatory diagram showing linking in U-TOC sector 0 of a mini-disc system.

FIG. 11 is an explanatory diagram showing a model of management of parts each available as a free area. Assume that part descriptors having numbers 03h, 18h, 1Fh, 2Bh and E3h are each designated as a part descriptor describing a free area. In this case, the pointer P-FRA is set at 03h pointing to the first part descriptor. The link in the first part descriptor is set at 18h pointing to the second descriptor whereas the link in the second part descriptor is set at 1Fh pointing to the third descriptor and so on. Finally, the link in the fifth part descriptor is set at 00h pointing to no part descriptor. It is to be noted that defective areas and unused parts descriptors can be managed in the same way.

The pointers P-TNO1 to P-TNO255 each refer to a track such as a piece of music recorded by the user on the magneto-optical disc 90. For example, the pointer P-TNO1 points to a part descriptor describing a first track or points to one of a plurality of part descriptors, which describes the first track's leading part on the time axis.

Assume for example that the first track is a piece of music not divided into a plurality of parts on the disc, that is, the track is recorded as a single part. In this case, the pointer P-TNO1 is set at a number pointing to a part descriptor describing the start and end addresses of an area for recording the first track.

As another example, assume that a second track is a piece of music divided into a plurality of parts on the disc, that is, the track is recorded as a plurality of discrete parts. In this case, the pointer P-TNO2 is set at a number pointing to the first one of part descriptors each describing the start and end addresses of an area for recording one of the parts of the second track. The part descriptors are put on a linked list described above in the chronological order of the parts. To put it concretely, the pointer P-TNO2 is set at a number pointing to the first part descriptor describing the first part on the time axis. The link in the first part descriptor is set at a number pointing to the second descriptor describing the second part on the time axis whereas the link in the second part descriptor is set at a number pointing to the third descriptor describing the third part on the time axis and so on. Finally, the link in the last part descriptor is set at 00h pointing to no part descriptor. As a result, the part descriptors are put on a linked list (similar to the one shown in FIG. 11).

As described above, data of the second piece of music is recorded on parts described by part descriptors arranged in the chronological order of the parts. In an operation to reproduce the second piece of music by using data of U-TOC sector 0, the number set in the pointer P-TNO2 is used to make an access to the first part descriptor including the start address of a first part. The recording/reproduction head is then brought to the start address. After the operation to read out data of the first part is completed, the link in the first part descriptor is used to make an access to the second part descriptor including the start address of a second part. The recording/reproduction head is then brought to the start address and so on. In this way, continuous musical data can be read out from the discrete parts. In addition, it is possible to carry out a recording operation by utilizing the recording area with a high degree of efficiency.

By the way, a track mode with a size of 1 byte is also recorded in each part descriptor. The track mode describes attributes of a track described by the part descriptor.

Figure 12:
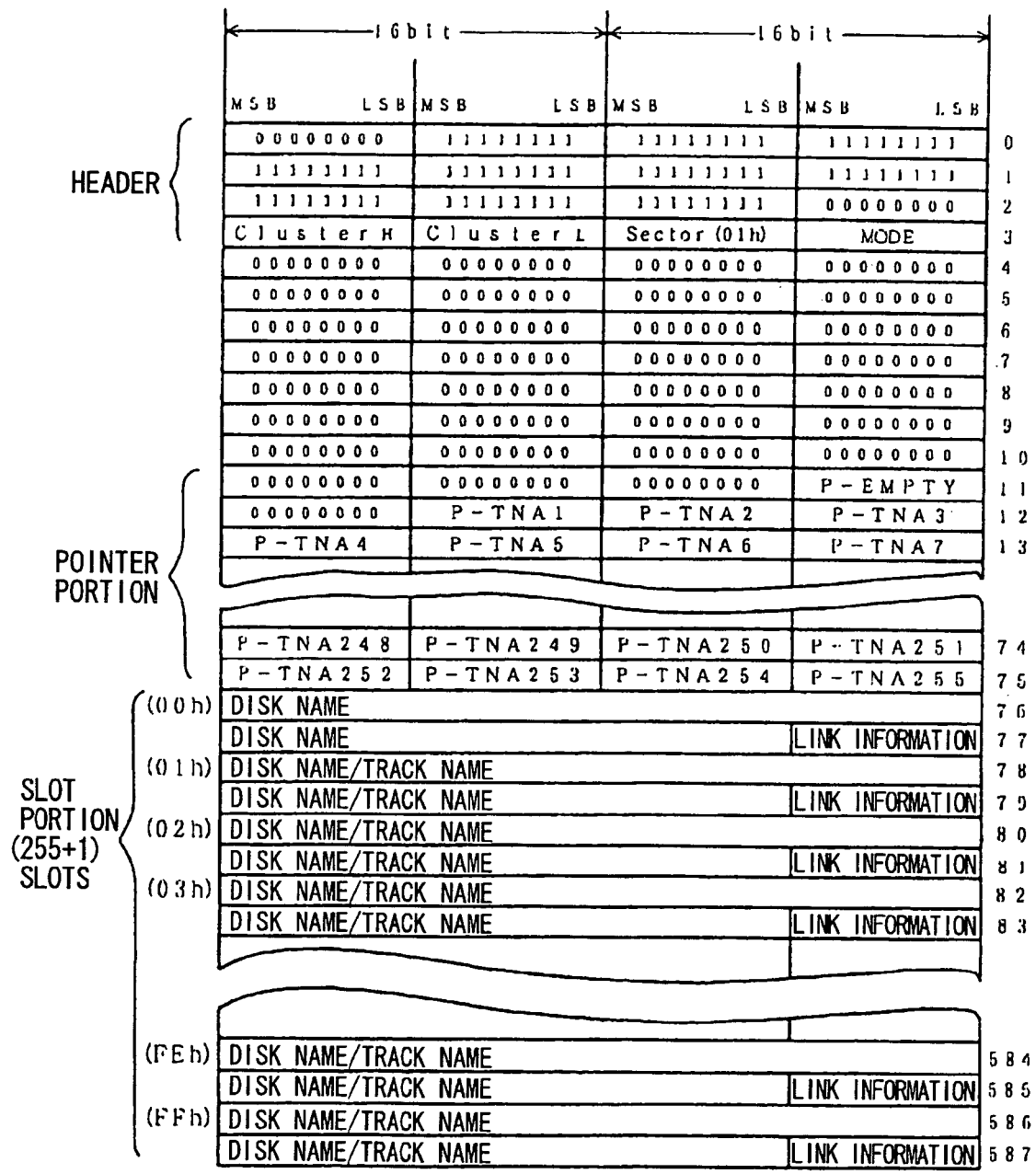
FIG. 12 is an explanatory diagram showing U-TOC sector 1 of a mini-disc system.

Let d1 (MSB) to d8 (LSB) be 8 bits composing the byte of the track mode. In this case, the track mode is defined as follows:

d1 . . . 0: Write permitted; 1: Write protected (Overwriting and editing are prohibited)

d2 . . . 0: A copyright exists; 1: No copyright exists.

d3 . . . 0: Original; 1: first or later generation d4 . . . 0: Audio data; 1: Undefined d5 and d6 . . . 01: Normal audio; Others: undefined d7 . . . 0: Monophonic; 1: Stereo d8 . . . 0: Emphasis off; 1: Emphasis on FIG. 12 is an explanatory diagram showing the format of U-TOC sector 1. U-TOC sector 1 is a data area for storing characters describing the name of each track managed by U-TOC sector 0 and the name of the disc itself.

A pointer portion of U-TOC sector 1 includes pointers P-TNA1 to P-TNA255 associated with the recorded tracks. The pointers P-TNA1 to P-TNA255 each point to an 8-byte slot in a slot portion. Thus, the slot portion includes 255 slots 01h to FFh. In addition, the slot portion also includes a slot 00h having a size of 8 bytes too. U-TOC sector 1 is used to manage character data in about the same way as U-TOC sector 0 described above.

Each of the slots 01h to FFh is used for recording a disc title and a track name as character information written in ASCII codes.

For example, a slot pointed to by the pointer P-TNA1 is used for recording a string of characters entered by the user for the first track. In addition, a slot may include a link pointing to another slot. Thus, if a string of characters entered by the user for a track exceeds 7 bytes (or seven characters), the string of characters is stored in a plurality of slots linked with each other by such links.

It is to be noted that the 8 bytes of the slot 00h are used as a special area for recording the name of the disc. This slot is pointed to by none of the pointers P-TNA (x).

The pointer P-EMPTY of U-TOC sector 1 is also used for managing unused slots.

It is worth noting that, much like U-TOC sector 1, U-TOC sector 4 is also used as a data area for storing character information entered by the user. The character information may be a name assigned to a piece of music recorded by the user or a disc title. Since U-TOC sector 4 has a format similar to that of U-TOC sector 1, U-TOC sector 4 is not shown in a figure.

However, U-TOC sector 4 is used for storing code data of Kanji characters or European characters. Thus, U-TOC sector 4 includes the attribute of character codes in addition to data stored in U-TOC sector 1 shown in FIG. 12. The attribute is recorded at a predetermined byte position.

Character information recorded in U-TOC sector 4 is managed by using a character-slot-indicating data portion in the same way as U-TOC sector 1. The character-slot-indicating data portion includes slot pointers P-TNA1 to P-TNA255 and 255 slots 01h to FFh pointed to by the slot pointers P-TNA1 to P-TNA255.

U-TOC sector 2 is used as a data area for storing mainly a recording date for each piece of music recorded by the user. The figure or the details of U-TOC sector 2 is omitted.

As described above, for the rewritable magneto-optical disc 90, disc areas are managed by using the P-TOC. On the other hand, other areas such as recordable user areas for storing pieces of music and free areas are managed by using U-TOC sector 0.

It is thus obvious that, by providing U-TOC sector 0 with such a configuration, for tracks recorded on the mini disc 100, division of a track into a plurality of parts, linking of a part to another part and track editing including deletion can be carried out by merely updating U-TOC sector 0.

In addition, by providing U-TOC sectors 1 and 4, it is possible to carry out an editing operation of cataloging a string of characters representing a disc title and a string of characters representing the name of each track.

In the recording/reproduction apparatus 20A, when the mini disc 100 is mounted on the recording/reproduction unit 25, first of all, the MD control unit 21 reads out TOC information from the mini disc 100 and stores the information in a specific area in the buffer memory 30. Thereafter, the TOC information in the buffer memory 30 is referred to in recording, reproduction and editing operations carried out on the mini disc 100.

It is to be noted that, in operations to record content data (or a track) onto the mini disc 100 and edit a track already recorded on the mini disc 100, the U-TOC sectors are updated by updating the U-TOC information already stored in the buffer memory 30.

Then, at a predetermined point of time, the (updated) U-TOC information stored in the buffer memory 30 is written back onto the mini disc 100 to update the U-TOC on the mini disc 100.

7. Authentication Process

As a condition for transfer/recording (check-out) of content data to the recording/reproduction apparatus 20A and into the mini disc 100 in an unencrypted state as described earlier in the explanation of the SDMI data paths, the result of an authentication process carried out by the personal computer 1 for the recording/reproduction apparatus 20A must be OK. The authentication process is processing to verify that the recording/reproduction apparatus 20A is a valid apparatus permitted to carry out an operation to record the content data in an unencrypted state.

The authentication process is carried out for a recording/reproduction apparatus connected to the connection unit 11 of the personal computer 1 besides the recording/reproduction apparatus 20B conforming to the SDMI standard. It is to be noted that the connected recording/reproduction apparatus 20B supposed to conform to the SDMI standard is also subjected to a process to confirm that the connected recording/reproduction apparatus 20B is a recording/reproduction apparatus 20B truly conforming to the SDMI standard. If the connected recording/reproduction apparatus 20B supposed to conform to the SDMI standard is not confirmed as a recording/reproduction apparatus 20B truly conforming to the SDMI standard, the authentication process described below is carried out to verify that the connected recording/reproduction apparatus 20B is a valid recording/reproduction apparatus 20A.

The authentication process provided by the embodiment is carried out by adoption of an authentication technique based on unsymmetrical encryption (or public-key encryption). In the unsymmetrical encryption process, an encryption key is different from a decryption key. Let reference notation Db denote data before the encryption process, reference notation Ke denote the encryption key, reference notation Kd denote the decryption key and reference notation C denote encrypted data obtained as a result of the encryption process. In this case, the encryption process is expressed by reference notation C=E (Ke, Db) and a decryption process of decrypting the encrypted data C to obtain the pre-encryption data Db is denoted by reference notation Db=D (Kd, C).

Here, the encryption key Ke and the decryption key Kd are referred to as a pair of keys. One of the keys is disclosed as a public key whereas the other key is kept in a predetermined member as a secret key.

In the authentication process described below, the public key, which is one of the encryption key Ke and the decryption key Kd, is denoted by reference notation P whereas the other decryption key used as the secret key is denoted by reference notation S. For the case described above, in the recording/reproduction apparatus 20A, the decryption processing unit 28 (or the system control unit 32) is holding the encryption key Ke and the decryption key Kd as a public key P and a secret key S.

Figure 13:
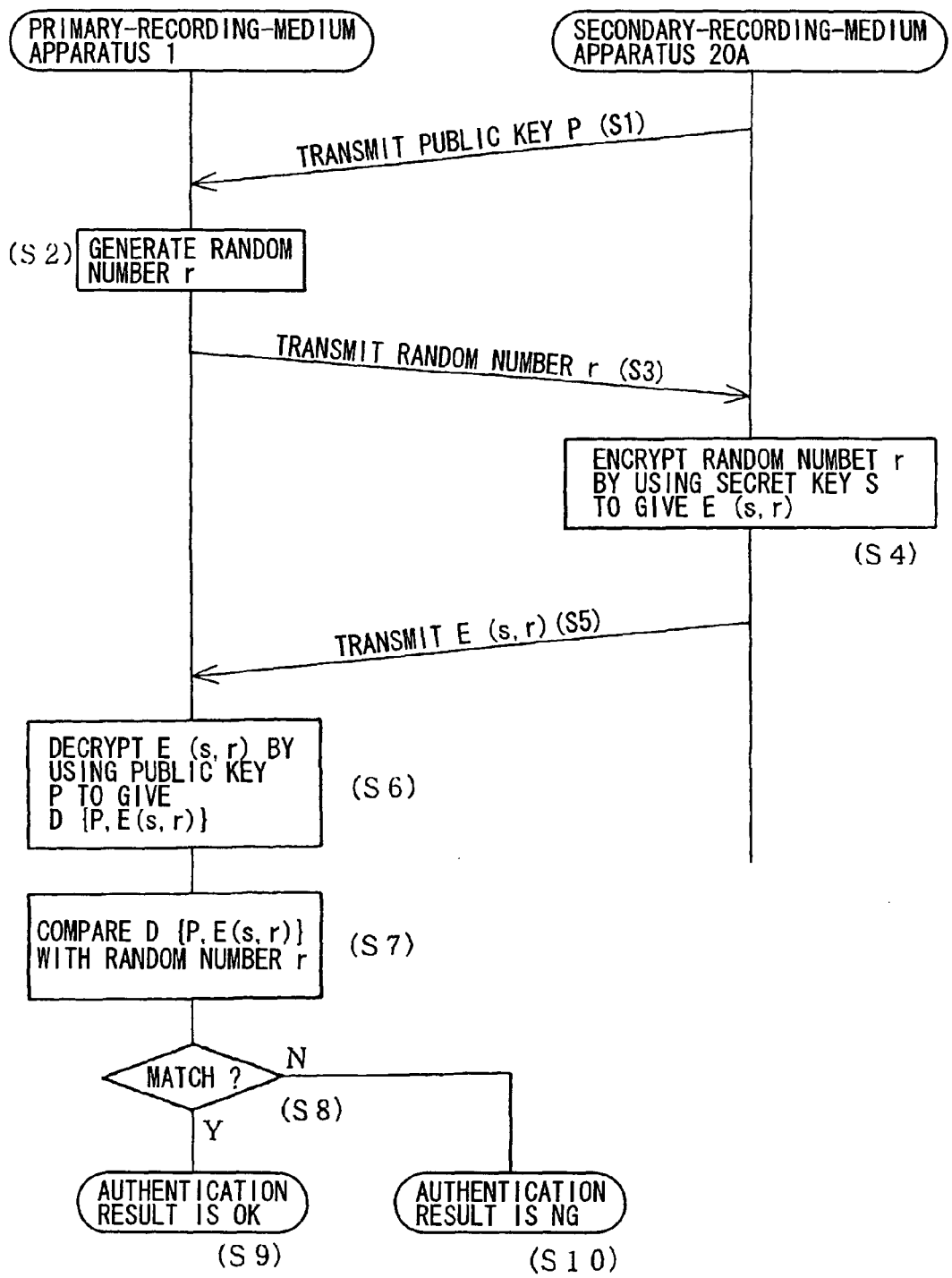
FIG. 13 shows a flowchart representing an authentication process according to the embodiment.

The authentication process is typically started by a command transmitted by the CPU 2 of the primary-recording-medium apparatus (personal computer) 1 to the system control unit 32 of the recording/reproduction apparatus 20A to make a request for an authentication process. Then, in accordance with the command, processing like one shown in FIG. 13 is carried out between the CPU 2 (primary-recording-medium apparatus (personal computer)) and the system control unit 32 (recording/reproduction apparatus 20A).

The authentication process is started with a processing S1 in which the system control unit 32 of the recording/reproduction apparatus 20A transmits the public key P held by the decryption processing unit 28 to the personal computer 1 by way of the communication unit 26. It is to be noted that the public key P is a key known by the primary-recording-medium apparatus 1. Thus, if the recording/reproduction apparatus 20A and the primary-recording-medium apparatus 1 recognize the same key as the public key P, the processing 1 does not have to be carried out.

When the CPU 2 of the primary-recording-medium apparatus 1 receives the public key, the authentication process is continued to processing S2 to generate a random number r. Then, in the next processing S3, the random number r is transmitted to the recording/reproduction apparatus 20A.

Then, in processing S4, the system control unit 32 of the recording/reproduction apparatus 20A encrypts the random number r by using the secret key S held by the decryption processing unit 28 to generate encrypted data E (S, r). Subsequently, in processing S5, the encrypted data E (S, r) is transmitted to the primary-recording-medium apparatus 1.

Then, in processing S6, by using the public key P, the CPU 2 of the primary-recording-medium apparatus 1 decrypts the encrypted data E (S, r) received from the recording/reproduction apparatus 20A. The processing S6 is thus a decryption process expressed by D {P, E (S, r)}.

Subsequently, in processing S7, the ransom number r generated in the processing S2 is compared with the decryption result D {P, E (S, r)} obtained in the processing S6.

If the public key P and the secret key S are a correct pair of keys, the result of the comparison should show that the decryption result D {P, E (S, r)} is equal to the random number r.

Thus, a comparison result indicating that the decryption result D {P, E (S, r)} matches the random number r confirms that the recording/reproduction apparatus 20A holds a correct secret key S for the public key P. In this case, the authentication process goes on from the processing S8 to processing S9 in which the recording/reproduction apparatus 20A is authenticated as a valid connection partner.

If the comparison result indicates that the decryption result D {P, E.(S, r)} does not match the random number r, on the other hand, the authentication process goes on from the processing S8 to processing S9 in which the secondary-recording-medium apparatus is determined to be not a valid connection partner (not an apparatus allowed to receive an SDMI content), generating an NG authentication result.

If the result of the authentication process described above indicates that the connected apparatus is a valid recording/reproduction apparatus 20A, on the other hand, the primary-recording-medium apparatus 1 recognizes that one of conditions for allowing a transfer of an SDMI content to the connected apparatus is satisfied.

8. Content Encryption Technique

The recording/reproduction apparatus 20A and the recording/reproduction apparatus 20B in the data transfer system provided by the embodiment each correspond to a device at the bottom of the tree structure shown in FIG. 1. The following description explains a typical implementation of the encryption structure like the one shown in FIG. 1 in the data transfer system.

Figure 14:
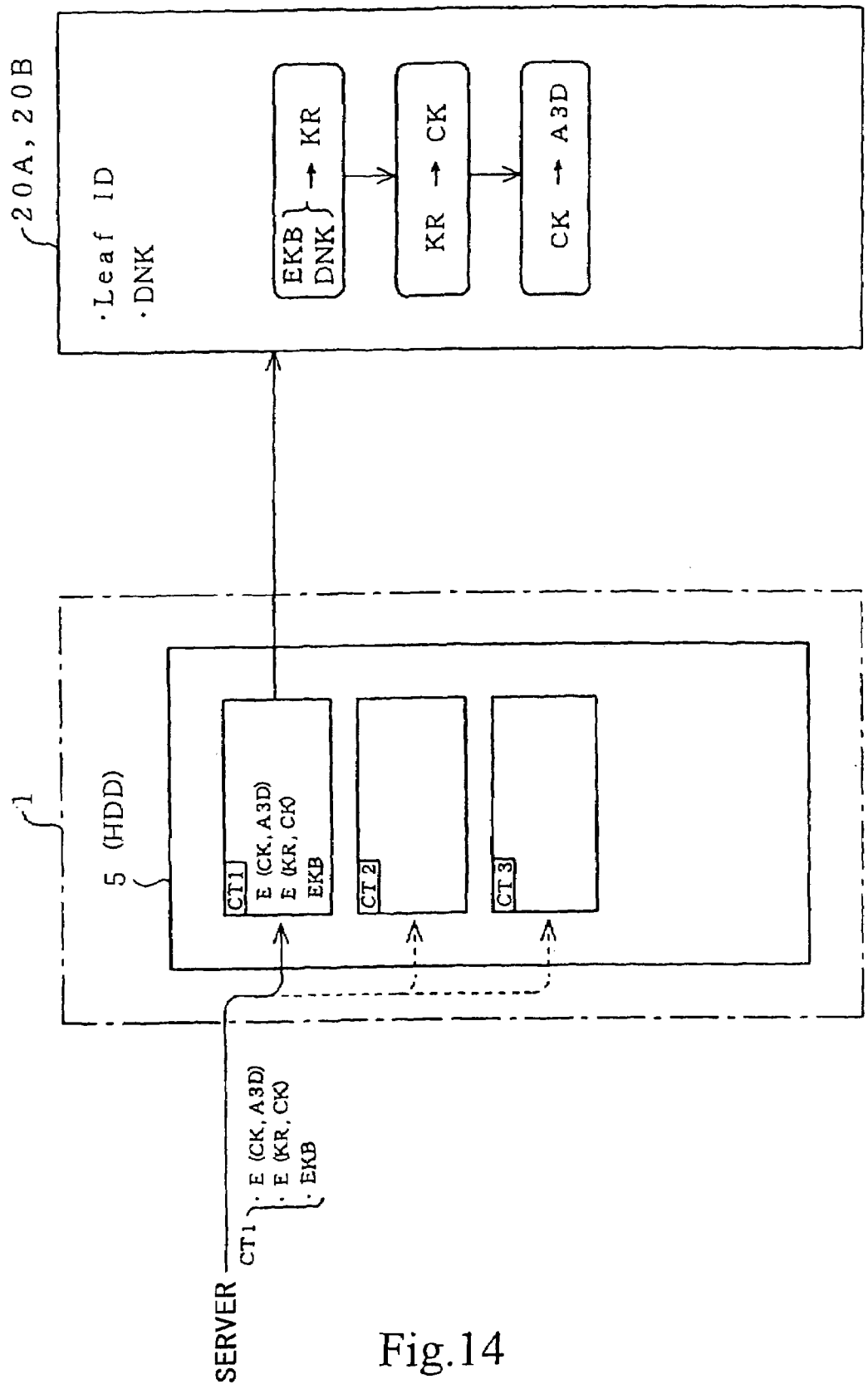
FIG. 14 is an explanatory diagram showing distributed content data to be transferred and a process to encrypt the data.

FIG. 14 is an explanatory diagram showing a flow of content data and keys.

When content data CT1 is distributed from the external content server 91 to the personal computer 1, in actuality, a transmission unit for the content data CT1 includes E (CK, A3D), E (KR, CK) and an EKB. The transmission unit is distributed to the personal computer 1 to be stored in the HDD 5.

E (CK, A3D) is a result of encryption of content data A3D by using a content key CK. The content data A3D is data compressed by the ATRAC3 technique. Thus, E (CK, A3D) is the piece of music to be actually distributed.

E (KR, CK) is a result of encryption of the content key CK for decrypting the encrypted content data by using the root key KR explained earlier by referring to FIG. 1.

The EKB is an enabling key block explained earlier by referring to FIGS. 1 to 3. As is obvious from the description of this embodiment, the EKB is information used for updating the root key KR.

Pieces of content data CT1, CT2 and so on are each distributed as a set including E (CK, A3D), E (KR, CK) and an EKB, and each stored in the HDD 5 also as a set as shown in FIG. 14.

Content data is transferred from the personal computer 1 to the recording/reproduction apparatus 20A or the recording/reproduction apparatus 20B also as a set including E (CK, A3D), E (KR, CK) and an EKB in accordance with a predetermined procedure.

As described above, the recording/reproduction apparatus 20A and the recording/reproduction apparatus 20B each correspond to a device (or a terminal) explained earlier by referring to FIG. 1. A leaf ID unique to the recording/reproduction apparatus 20A is assigned to the recording/reproduction apparatus 20A whereas a leaf ID unique to the recording/reproduction apparatus 20B is assigned to the recording/reproduction apparatus 20B. In each of the recording/reproduction apparatus 20A and the recording/reproduction apparatus 20B, DNKs (Device Node Keys) are stored.

When the recording/reproduction apparatus 20A or the recording/reproduction apparatus 20B receives a content-data set from the personal computer 1, the content data is decrypted before being stored in the secondary recording medium (or the content data is stored in the secondary recording medium in the unencrypted state). In the case of the recording/reproduction apparatus 20B conforming to the SDMI standard, the encrypted content data is decrypted when the content data is reproduced. In the case of the recording/reproduction apparatus 20A, the encrypted content data is decrypted when the content data is recorded onto the secondary recording medium.

As shown in the figure, in processing to decrypt the encrypted content data, first of all, a decryption process is carried out by using the stored DNKs and the received EKB to generate a root key KR.

Then, the root key KR obtained as a result of the decryption process is used to decrypt E (KR, CK) to generate the content key CK.

Then, the content key CK obtained as a result of the process to decrypt E (KR, CK) is used to decrypt E (CK, A3D) to generate the content data A3D.

Figure 15A:
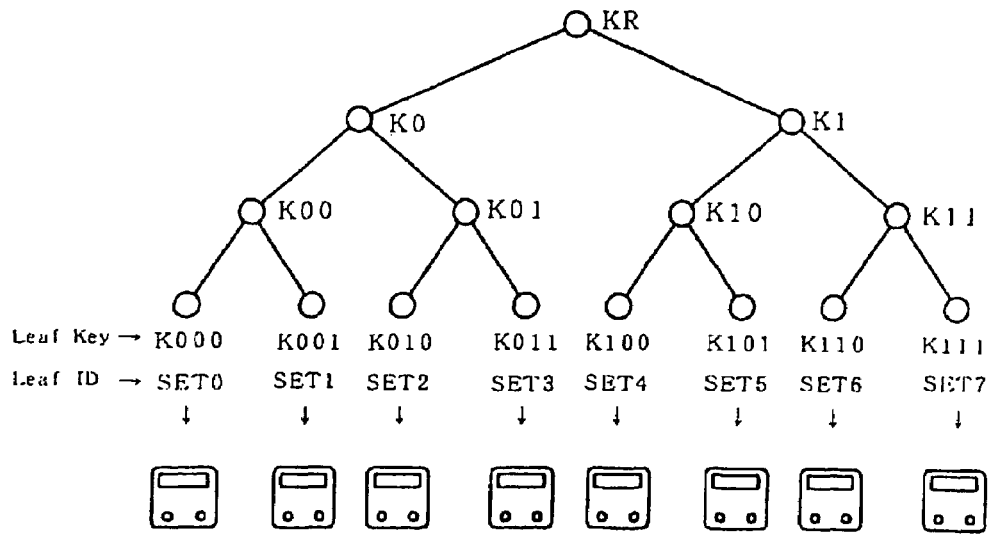
FIGS. 15A and 15B are explanatory diagrams showing a typical encryption technique adopted by the embodiment and DNKs (device node keys) used in the technique.
Figure 15B:
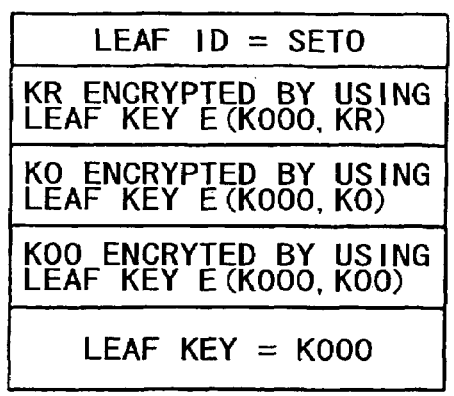
Figure 16:
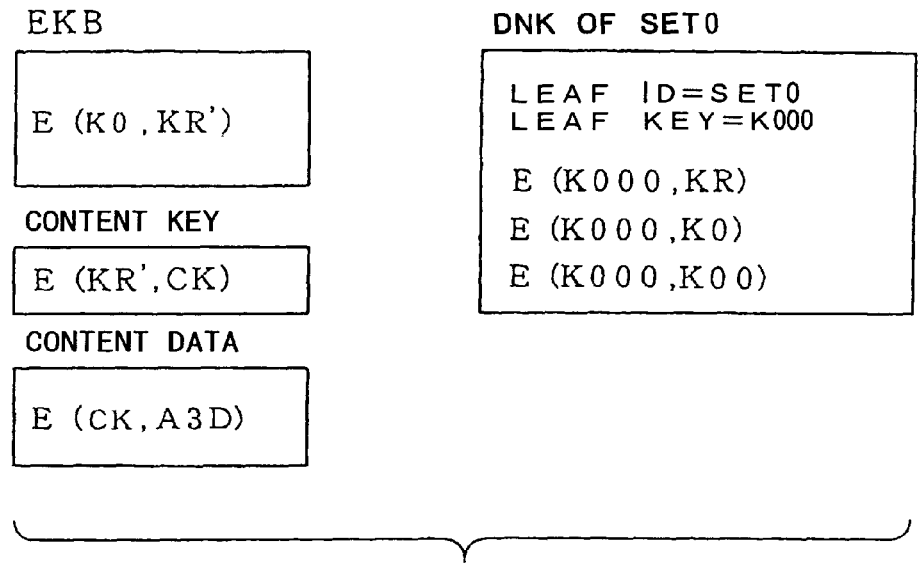
FIG. 16 is an explanatory diagram showing a procedure adopted by the embodiment to decrypt content data.

For the recording/reproduction apparatus 20A, the DNKs and a procedure for decrypting the encrypted content data are explained concretely by referring to FIGS. 15A and 15B as well as FIG. 16.

Assume a key tree structure shown in FIG. 15A. A leaf ID of SET0 and a leaf key of K000 are assigned to the recording/reproduction apparatus 20A.

In this case, the DNKs stored in the recording/reproduction apparatus 20A have pieces of information shown in FIG. 15B.

First of all, the DNKs include the leaf ID SET0.

The DNKs also include the leaf key K000.

The other pieces of information included in the DNKs are information on node keys on a path between the leaf key K000 and the root key KR as shown in FIG. 15A. That is to say, the other pieces of information are information on node keys K00 and K0 as well as the root key KR itself. To put it in detail, the node keys K00 and K0 as well as the root key KR have been encrypted by using the leaf key K000 before being stored. As shown in the figure, the encrypted node keys K00 and K0 as well as the encrypted root key KR are listed as follows:

E (K000,K00)

E (K000,K0) and

E (K000,KR)

By using the information included in the stored DNKs, the recording/reproduction apparatus 20A decrypts the encrypted content key E (KR, CK) and the encrypted content data E (CK, A3D), which are received from the personal computer 1.

To put it in detail, the recording/reproduction apparatus 20A first decrypts E (K000,KR) by using the leaf key K000 to produce D {K000,E (K000,KR)}, which is the root key KR.

Then, the root key KR is used to decrypt the encrypted content key E (KR, CK) to produce D {KR, E (KR, CK)}, which is the content key CK.

Finally, the content key CK is used to decrypt the encrypted content data E (CK, A3D) to produce D {CK, E (CK, A3D)}, which is the content data A3D.

As described earlier, however, the root key KR and the node keys are not fixed all the time. For a variety of reasons, they are changed. In the case of a data transfer system in which the content key CK is transmitted in a state of being encrypted by using the root key KR as described above, the root key may be changed for each content data.

For example, a music distribution enterprise changes the root key KR from content to content to strengthen protection of copyrights in some cases. Since the root key KR is variable, an EKB is also transmitted at the same time as described earlier so that an authorized device is capable of obtaining the changed root key KR.

Assume that, for encrypted content data E (CK, A3D), a content key E (KR', CK) encrypted by a changed root key KR' and an EKB are received as shown in FIG. 16. The EKB includes E (K0,KR'), which is the updated root key KR' encrypted by a node key K0.

It is to be noted that the updated root key KR' encrypted by a node key K0 can be decrypted only by devices owning the node key K0. As shown in FIGS. 15A and 15B, only devices with leaf IDs SET0 to SET3 are capable of obtaining the updated root key KR'. If only the devices having leaf IDs SET0 and SET1 need to know the updated root key KR', the EKB needs to include E (K00, KR'), which is the updated root key KR' encrypted by using a node key K00.

As explained earlier by referring to FIG. 15B, the DNKs stored in the recording/reproduction apparatus 20A include E (K000, K00) and E (K000, K0), which are respectively the node keys K00 and K0 encrypted by using the leaf key K000. The DNKs also include E (K000, KR), which is the root key KR encrypted by using the leaf key K000.

In the above-described state, the procedure to decrypt content data A3D is described in steps (1) to (4) which are shown in FIG. 16.

Step (1): Since the received EKB is the encrypted updated root key E (K0, KR'), the node key K0 is first obtained from the DNKs. That is to say, the encrypted node key E (K000, K0) is decrypted by using the leaf key K000 to produce D {E (K000, K0)}, which is the node key K0.

Step (2): Next, the node key K0 is used for decrypting the encrypted updated root key E (K0, KR') included in the EKB to produce D {E (K0, KR')}, which is the updated root key KR'.

Step (3): The updated root key KR' obtained as a result of the decryption process of the step (2) is used for decrypting the encrypted content key E (KR', CK) to produce D {E (KR', CK)}, which is the content key CK.

Step (4): The content key CK obtained as a result of the decryption process of the step (3) is used for decrypting the encrypted content data E (CK, A3D) to produce D {E (CK, A3D)}, which is the content data A3D.

In accordance with the procedure described above, the recording/reproduction apparatus 20A is capable of decrypting the encrypted content data and storing the content data onto the mini disc 100.

In the case of the recording/reproduction apparatus 20B, on the other hand, in an operation to reproduce content data recorded on the secondary recording medium in an encrypted state, the procedure described above is executed to decrypt the encrypted content data to generate reproduced music or the like.

9. Content Check-Outs/Check-Ins

The following description explains processing carried out by the personal computer 1 and the recording/reproduction apparatus 20A to transfer content data from the HDD 5 of the personal computer 1 to the recording/reproduction apparatus 20A in a check-out and to return the content data checked out to the recording/reproduction apparatus 20A back to the HDD 5 in a check-in.

In actuality, a plurality of check-outs and check-ins of content data is carried out in a communication session. It is to be noted, however, that only flows in one check-out of content data and one check-in of the content data are described for the sake of explanation simplicity.

Figure 17:
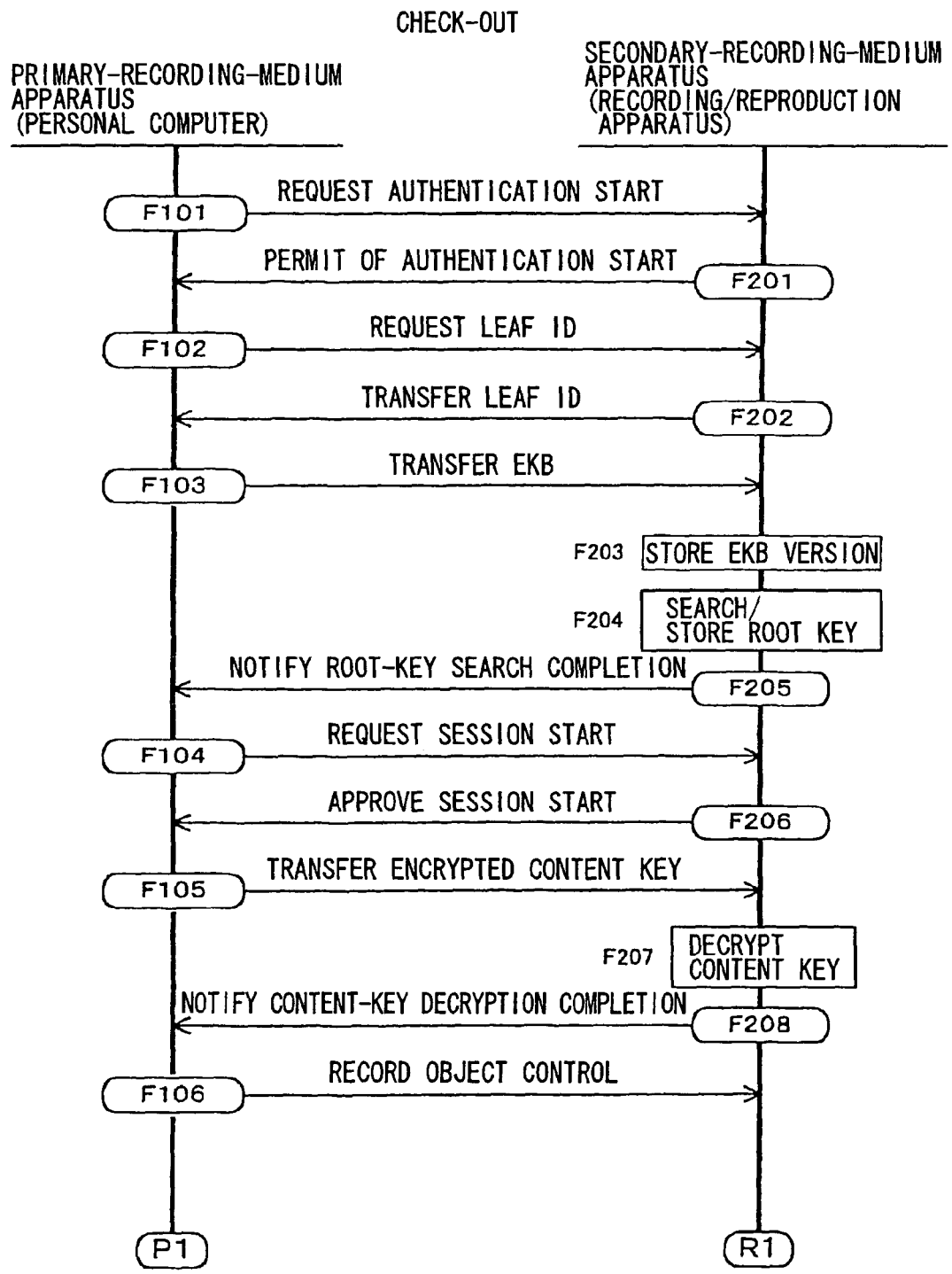
FIG. 17 shows a flowchart representing check-out operations carried out by the embodiment.
Figure 18:
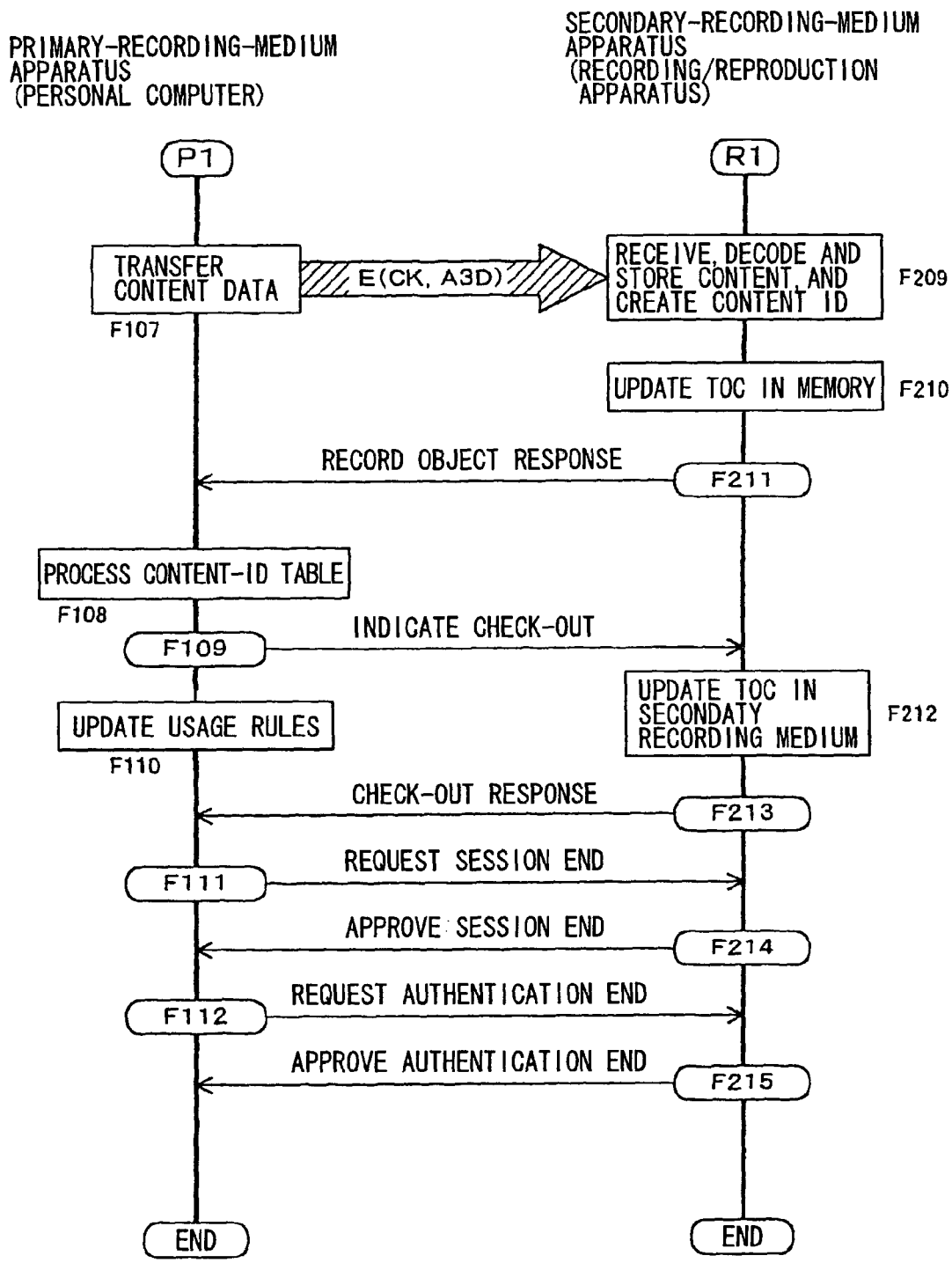
FIG. 18 shows a continuation flowchart representing check-out operations carried out by the embodiment.

FIGS. 17 and 18 are a diagram showing processing of a check-out. In the processing shown in FIGS. 17 and 18, control executed by the CPU 2 employed in the personal computer 1 includes steps F101 to F112. On the other hand, control executed by components such as the system control unit 32 and the decryption processing unit 28, which are employed in the recording/reproduction apparatus 20A, includes steps F201 to F215.

It is to be noted that a communication session is implemented by executing a variety of control commands and issuing responses to the control commands.

The check-out of content data stored in the HDD 5 begins with a step F101 shown in FIG. 17. At the step F101, the CPU 2 issues a request for the start of an authentication process to the recording/reproduction apparatus 20A. That is to say, an authentication-start control command is transmitted to the recording/reproduction apparatus 20A.

In response to the authentication-start control command, the recording/reproduction apparatus 20A informs the personal computer 1 of an approval of the start of the authentication process at a step F201. That is to say, an authentication-start response command is transmitted to the personal computer 1.

Then, at a step F102, the personal computer 1 makes a request for a leaf ID. At this request, the recording/reproduction apparatus 20A transmits a stored leaf ID at a step F202.

It is to be noted that the personal computer 1 examines the leaf ID of the recording/reproduction apparatus 20A connected to the personal computer 1 in this way to determine whether or not the recording/reproduction apparatus 20A is an apparatus having a valid leaf ID.

Then, at a step F103, the personal computer 1 transmits an EKB for content data, which is to be transferred hereafter, to the recording/reproduction apparatus 20A.

When the recording/reproduction apparatus 20A receives the EKB, first of all, at a step F203, the recording/reproduction apparatus 20A stores the version number of the EKB (refer to FIG. 3). Then, at the next step F204, the recording/reproduction apparatus 20A uses the received EKB and the stored DNKs for executing the steps (1) and (2) of the procedure shown in FIG. 16 to obtain a root key KR for the content data, and stores the root key KR.

Subsequently, at the next step F205, the recording/reproduction apparatus 20A informs the personal computer 1 that the root key KR has been obtained.

Informed that the processing to obtain the root key KR has been completed, at a step F104, the personal computer 1 issues a control command making a request for a start of the actual check-out session to the recording/reproduction apparatus 20A. At this request, the recording/reproduction apparatus 20A transmits a response command indicating an approval of the request for a start of the actual check-out session at a step F206.

It is to be noted that this response command is issued in response to the control command by carrying out the authentication processing explained earlier by referring to FIG. 13.

As described earlier, in the processing shown in FIG. 13, the recording/reproduction apparatus 20A not conforming to the SDMI standard is authenticated to determine whether or not the recording/reproduction apparatus 20A is an apparatus allowed to decrypt the encrypted content data and store the content data onto the secondary recording medium in an unencrypted state. If the result of the authentication process is NG, the check-out session is of course aborted, though the abortion of the check-out session is not shown in FIG. 17.

Next, at a step F105, the personal computer 1 transmits an encrypted content key E (KR, CK), which is related to the content data to be transmitted thereafter, to the recording/reproduction apparatus 20A.

Receiving the encrypted content key E (KR, CK), the recording/reproduction apparatus 20A executes the step (3) of the procedure shown in FIG. 16 at a step F207. At the step (3), the stored root key KR is used for decrypting the encrypted content key E (KR, CK) to produce the content key CK. Then, at the next step F208, the personal computer 1 is informed that the decryption process to produce the content key CK has been completed.

At a step F106, the personal computer 1 transmits a record-object control command to the recording/reproduction apparatus 20A to provide information on a content to be checked out hereafter to the recording/reproduction apparatus 20A.

The format of the record-object control command is shown in FIG. 19. The size of the record-object control command is 30 bytes. The record-object control command is a command issued by the personal computer 1 to inform the recording/reproduction apparatus 20A (or 20B) of information on actual content data to be transferred in a communication session of a check-out.

As shown in FIG. 19, the format of the record-object control command includes 'Record object' as an operation code. In addition, the format also includes information bits such as a communication result (result), an identification code of the communication object apparatus (destination list ID), a track number for a check-out content on the secondary recording medium (new object position number), a content-data type (content type), the format of the content data in the primary recording medium (download format track attribute), the attributes of the content in the secondary recording medium (track mode), a content-data length (content size) and a bulk data length of the content data (bulk data size).

The format of the content data in the primary recording medium (download format track attribute) is a compression technique of content data to be transmitted from the HDD 5 and its bit rate as well as content data's compression technique, which is adopted when the content data is output to a transmission line, and its bit rate.

The attributes of a content in the secondary recording medium (track mode) is a specification of a compression technique, which is to be adopted when the content is recorded onto the mini disc 100 and other attributes such as an attribute specifying monophonic or stereo. The specified compression technique is typically either ATRAC, ATRAC3 at 132 kbps or ATRAC3 at 66 kbps.

It is to be noted that, though not shown in FIG. 17, the recording/reproduction apparatus 20A transmits a response command to the personal computer 1 in response to the record-object control command transmitted by the personal computer 1 at the step F106.

From the notice transmitted at the step F208 to indicate completion of the decryption process to obtain the content key CK and from the response command transmitted in response to the record-object control command, the personal computer 1 recognizes that preparations for reception and decryption of content data have been completed at the recording/reproduction apparatus 20A. Thus, the flow of the check-out goes on to P1 representing a step F107 shown in FIG. 18. At this step, the content data is transferred to the recording/reproduction apparatus 20A. To be more specific, content data E (CK, A3D) encrypted by the content key CK is transmitted.

On the other hand, the flow of the check-out in the recording/reproduction apparatus 20A goes on to R1 representing a step F209 shown in FIG. 18. At this step, the content data E (CK, A3D) which has been transferred from the personal computer 1 is received. Then, the step (4) of the procedure shown in FIG. 16 is executed to decrypt the encrypted content data E (CK, A3D) by using the content key CK and to store the content data A3D obtained as a result of the decryption process onto the mini disc 100.

Furthermore, a content ID is generated from the unencrypted content data.

When the processes to transfer a piece of content data (such as a piece of music) from the personal computer 1 and to record the content data onto the mini disc 100 are completed, it is necessary to update the U-TOC on the mini disc 100 right away.

As described earlier, the U-TOC recorded on the inner circumference portion of the mini disc 100 is used for managing the start and end addresses of each track such as each piece of music and other information. In an operation to reproduce a track, the track's addresses on the mini disc 100 are obtained from the U-TOC.

In this embodiment, however, at the point of time the process to record the content data onto the mini disc 100 is completed, only the U-TOC stored in the buffer memory 30 is updated at a step F210. That is to say, the U-TOC on the mini disc 100 is not updated right away.

When the process to update the U-TOC in the buffer memory 30 is completed, a record-object response command is transmitted to the personal computer 1 at the next step F211.

At this point of time, the processing to write the piece of content data is completed and the content ID generated for the content data at the step F209 is reported to the personal computer 1.

The format of the record-object response command is shown in FIG. 20.

As shown in FIG. 20, the format of the record-object response command with a size of 62 bytes includes 'Record object' as an operation code. In addition, the format also includes information bits such as a communication result (result), an identification code of the communication object apparatus (destination list ID), a track number for a check-out content on the secondary recording medium (new object position number), a content-data type (content type), the format of the content data in primary recording medium (download format track attribute), the attributes of the content in the secondary recording medium (track mode), a content-data length (content size) and a bulk data length of the content data (bulk data size).

In the case of the record-object response command, the format also includes a session-data field with a size of 32 bytes. This field is used as an area for reporting the content ID generated by the recording/reproduction apparatus 20A to the personal computer 1.

Thus, such a record-object response command is used by the recording/reproduction apparatus 20A to report the completion of the transfer of the content data and the content ID to the personal computer 1.

At a step F108, the personal computer 1 carries out processing on a content-ID table in accordance with the notice of the content ID. As will be described later, the processing is carried out to associate a content ID generated by the personal computer 1 and appended to the content data stored in the HDD 5 with the content ID generated by the recording/reproduction apparatus 20A at the step F209.

Next, at a step F109, the personal computer 1 transmits a check-out control command to the recording/reproduction apparatus 20A.

At the next step F110, the personal computer 1 updates the usage rule for the content data because of the check-out of the content data. To be more specific, a content right is changed by decrementing the number of allowable check-outs for the content data by 1.

At a step F212, the recording/reproduction apparatus 20A carries out processing of an actual check-out requested by the check-out control command. To be more specific, the U-TOC on the mini disc 100 is updated to put the recorded content data in a reproducible state. In this way, a right to reproduce content data is given to the secondary recording medium.

It is to be noted that, at that time, in the content data's track mode in U-TOC sector 0, the bit d1 has been set at 1 to put the content data in a write-protected state.

When the processing to update the U-TOC for the check-out is completed, at a step F213, a check-out response command is transmitted to the personal computer 1 to inform that the processing to update the U-TOC for the check-out has been completed.

At this point of time, the check-out or the transfer of a content right is completed.

FIG. 21 is an explanatory diagram showing the format of a check-out control command and FIG. 22 is an explanatory diagram showing the format of a check-out response command.

The check-out control command has a size of 25 bytes and the check-out response command has a size of 17 bytes.

As shown in FIG. 21, the check-out control command includes information bits such as 'Check-out' as an operation code, a communication result (result), an identification code of the communication object apparatus (list ID), the track number for a check-out content on the secondary recording medium (object position number) and an encrypted session key (DES CBC (Ks, 0)).

As shown in FIG. 22, on the other hand, the check-out response command includes information bits such as 'Check-out' as an operation code, a communication result (result), an identification code of the communication object apparatus (list ID) and a track number for the check-out content on the secondary recording medium (object position number).

As described above, the check-in control command is transmitted by the personal computer 1 to the recording/reproduction apparatus 20A and, as the check-out response command is transmitted from the recording/reproduction apparatus 20A to the personal computer 1 to indicate completion of the check-out, at a step F111, the personal computer 1 transmits a control command requesting an end of the session to the recording/reproduction apparatus 20A. At a step F214, the recording/reproduction apparatus 20A transmits a response command approving the end of the session to the personal computer 1.

At a step F112, the personal computer 1 transmits a control command to end the authentication state to the recording/reproduction apparatus 20A. In response to this control command, the recording/reproduction apparatus 20A transmits a response command to approve the end of the authentication state to the personal computer 1 at a step F215.

At this point of time, a sequence of communications for implementing the check-out is ended.

It is to be noted that, if a plurality of contents having a common root key are checked out by carrying out the communications described above, it is necessary only to repeat the steps F105 to F108 and the steps F207 to F211 for each of the second and subsequent contents.

If successive contents with different EKB versions must be transferred continuously, an EKB also needs to be transferred along with each of the contents.

Figure 23:
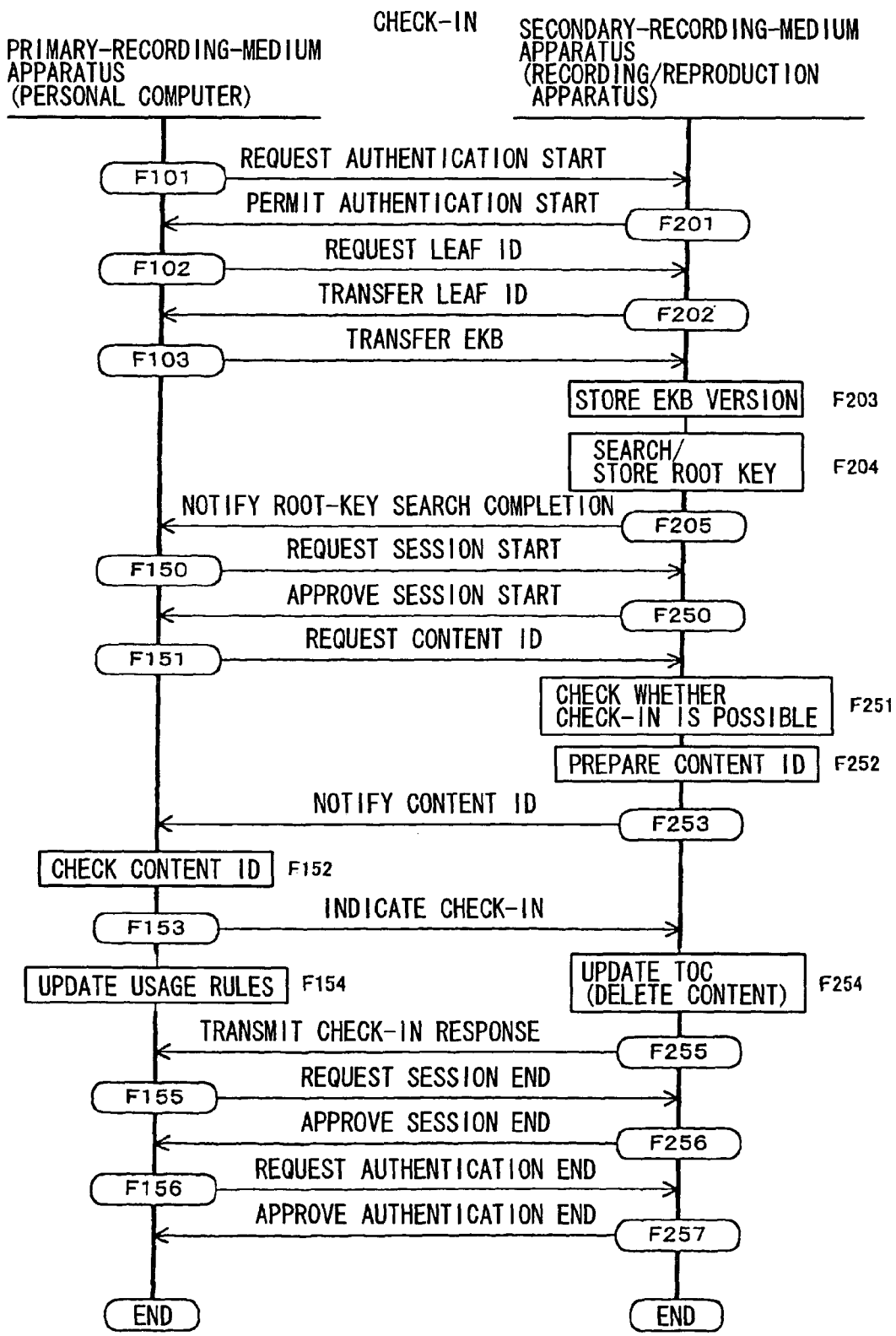
FIG. 23 shows a flowchart representing check-in operations carried out by the embodiment.

Next, the check-in processing is explained by referring to FIG. 23.

In the processing shown in FIG. 23, control executed by the CPU 2 employed in the personal computer 1 includes steps F101 to F156. On the other hand, control executed by components such as the system control unit 32 and the decryption processing unit 28, which are employed in the recording/reproduction apparatus 20A, includes steps F201 to F257.

Also in this case, a communication session is implemented by using a variety of control commands and a variety of response commands generated in response to the control commands.

Also in the case of a check-in, processing including the start of an authentication process, a transfer of an EKB and a search for a root key is carried out in the same way as the check-out described above. To be more specific, pieces of processing carried out at steps F101 to F103 and F201 to F205 are the same as their counterparts shown in FIG. 17, making it unnecessary to repeat their explanation.

At a step F150, the personal computer 1 transmits a control command making a request for the start of a check-in session to the recording/reproduction apparatus 20A.

In response to this control command, the recording/reproduction apparatus 20A transmits a response command at a step F250.

It is to be noted that, also in this case, the authentication processing explained earlier by referring to FIG. 13 is carried out.

If the result of the authentication processing carried out on the recording/reproduction apparatus 20A is OK, the requested check-in session is started. In this case, the personal computer 1 makes a request for the ID of content data to be checked in at a step F151. For example, the personal computer 1 transmits a track number of the content data to be checked in on the mini disc 100 to the recording/reproduction apparatus 20A, making a request for the content ID.

At this request, first of all, at a step F251, the recording/reproduction apparatus 20A forms a judgment as to whether or not the specified content data (or the specified track) is content data that can be checked in. The judgment can be formed by examining the write-control flag (or the d1 bit of the track mode) recorded in the U-TOC for the track.

Content data is determined to be content data that can be checked in if the content data has been recorded on the mini disc 100 as a result of a check-out and has not been edited on the mini disc 100.

When a check-out shown in FIGS. 17 and 18 is carried out, the d1 bit of the track mode recorded in U-TOC sector 0 of the mini disc 100 for the content recorded on the mini disc 100 as a result of the check-out is set at 1 as described earlier.

The d1 bit is used as a write control flag for the content recorded on the mini disc 100 as a result of the check-out.

To be more specific, the d1 bit is the so-called write protect flag in the mini-disc system. To put it concretely, an editing process such as deletion, division and concatenation is prohibited for a track with the d1 bit set at 1. That is to say, no editing process such as deletion, division and concatenation can be carried out on a track with the d1 bit set at 1 without regard to whether the secondary-recording-medium apparatus is the conventional mini-disc recorder, that has been becoming popular at the present time, or a mini-disc recorder used as the recording/reproduction apparatus 20A.

In actuality, however, the d1 bit for a track recorded on the mini disc 100 mounted on a mini-disc system is not set at 1 automatically.

Thus, the d1 bit is information clearly indicating not only prohibition of an editing process for the track, but also a content checked out from the personal computer 1.

If the d1 bit indicates that the content data to be checked in is content data obtained as a result of a check-out or content data that can be checked in, at a step F252, the ID of the content data is prepared. To put it concretely, a content ID is computed at this point of time, or an already computed and stored content ID is read out. A technique for generating a content ID will be described later.

Then, at the next step F253, the content ID is transmitted to the personal computer 1.

It is to be noted that, if the content data to be checked in is not content data that can be checked in, on the other hand, the personal computer 1 is informed of the fact that the content data to be checked in is not content data that can be checked in, and an error handling process is carried out thereafter.

At a step F152, the personal computer 1 collates the content ID received from the recording/reproduction apparatus 20A. To be more specific, the content ID received from the recording/reproduction apparatus 20A is compared with a saved content ID, which was generated by the recording/reproduction apparatus 20A and transmitted to the personal computer 1 in a check-out. The saved ID was then stored in the personal computer 1 as table data associated with a content ID generated by the personal computer 1. The content IDs are compared with each other to assure that the content data to be checked in is the correct content data. If the result of the collation is OK, at a step F153, an actual check-in is requested.

If the result of the collation is NG, on the other hand, error processing is carried out.

A check-in is requested at the step F153 by issuing a check-in control command shown in FIG. 24.

FIG. 24 is an explanatory diagram showing the format of a check-in control command and FIG. 26 is an explanatory diagram showing the format of a check-in response command.

The check-in control command is 17 bytes in length and the check-in response command is 25 bytes in length.

The check-in control command shown in FIG. 24 has information bits including 'Check-in' as an operation code, a communication result (result), a sub-function, an identification code of the communication object apparatus (list ID) and a track number for a check-in content on the secondary recording medium (object position number).

Sub-functions are defined as shown in FIG. 25. The definitions describe processing requested by the check-in control command.

A sub-function value of 00h indicates that the check-in control command makes a request for a content ID. The check-in control command is thus a command making a request for an actual check-in to return a reproduction right granted to the secondary recording medium.

A sub-function value of 01h is reserved. However, this value can be used in a command during an actual check-in process.

A check-in control command having another sub-function value makes a request for peculiar information such as pre-paid information recorded on the secondary recording medium. Thus, a check-in control command having another sub-function value merely requests that pre-paid information and the like be read out and does not make a request for a check-in (or the return of the reproduction right).

On the other hand, the check-in response command shown in FIG. 26 has information bits including 'Check-in' as an operation code, a communication result (result), a sub-function, an identification code of the communication object apparatus (list ID) and a track number for the check-in content on the secondary recording medium (object position number).

In addition, the check-in response command also includes an 8-byte field (hash MAC) for reporting the content ID generated by carrying out HASH function processing to the personal computer 1.

In the check-in control command transmitted at the step F153 of the check-in shown in FIG. 23, the value of the sub-function is set at 00h to indicate an actual check-in. The list ID is set at a value specifying the recording/reproduction apparatus 20A. The object position number is set at a value specifying the track number of the check-in content on the mini disc 100.

At the next step F154, a usage rule for the content data is updated in accordance with the check-in control command. To be more specific, the number of permitted transfers is incremented by 1.

At a step F254, the recording/reproduction apparatus 20A updates the U-TOC data. To put it in detail, the contents of U-TOC sector 0 are updated to delete the track used as a check-in object from the mini disc 100. That is to say, the track is put in an irreproducible state or a state of losing a reproduction right.

Then, at the next step F255, the check-in response command shown in FIG. 26 is transmitted.

At this point of time, the check-in or the operation to return the content right is completed.

Upon completion of the check-in, at a step F155, the personal computer 1 transmits a control command making a request for an end of the session to the recording/reproduction apparatus 20A. In response to this control command, the recording/reproduction apparatus 20A transmits a response command approving the end of the session to the personal computer 1 at a step F256.

At a step F156, the personal computer 1 transmits a control command making a request for an end of the authentication state to the recording/reproduction apparatus 20A. In response to this control command, the recording/reproduction apparatus 20A transmits a response command approving the end of the authentication state to the personal computer 1 at a step F257.

At this point of time, the sequence of communications for the check-in is ended.

It is to be noted that, if a plurality of contents must be checked in by carrying out the communications described above, the operation to verify the content ID and the operation to request the check-in, that is, the steps F151 to F154 and F251 to F255, need to be repeated for each of the contents.

10. Generation and Management Technique of Content IDs

Usage rules followed in check-ins and check-outs are managed by using content IDs for each content.

As described before, in a secondary recording medium conforming to the SDMI standard, a format allowing content IDs to be recorded is adopted. Thus, in a check-out or a check-in, both the personal computer 1 and the recording/reproduction apparatus 20B conforming to the SDMI format are capable of identifying content data used as an object of the check-out or the check-in by using a content ID generated by the personal computer 1.

However, the recording/reproduction apparatus 20A for a secondary recording medium such as the mini disc 100, which has been becoming popular for the past years, is not capable of identifying content data by using a content ID generated by the personal computer 1. This is because, as a result of a check-out, content data is recorded on the mini disc 100 including no area for storing a content ID. Even if such an area is newly prescribed in the U-TOC or the like and a content ID is recorded on the mini disc 100, the content ID will be inadvertently erased in an operation carried out by a mini-disc recorder of the old type to update the U-TOC. Thus, content IDs cannot be managed in the mini disc 100.

If content IDs cannot be managed in the secondary recording medium, a check-in is impossible because content data cannot be collated in the check-in process even though a check-out is possible.

To solve this problem, the recording/reproduction apparatus 20A is provided with a function for generating a content ID from the content data itself.

In addition, table data is provided in the personal computer 1 so that a first content ID generated by the personal computer 1 can be compared with a second content ID generated by the recording/reproduction apparatus 20A.

First of all, a technique adopted by the recording/reproduction apparatus 20A to generate a content ID is explained.

For generation of a content ID of content data, there is provided means for carrying out a CBC_MAC process by sampling particular data in a content-data stream in addition to track information and a content length (content size) of the content data.

Figures 27, 28:
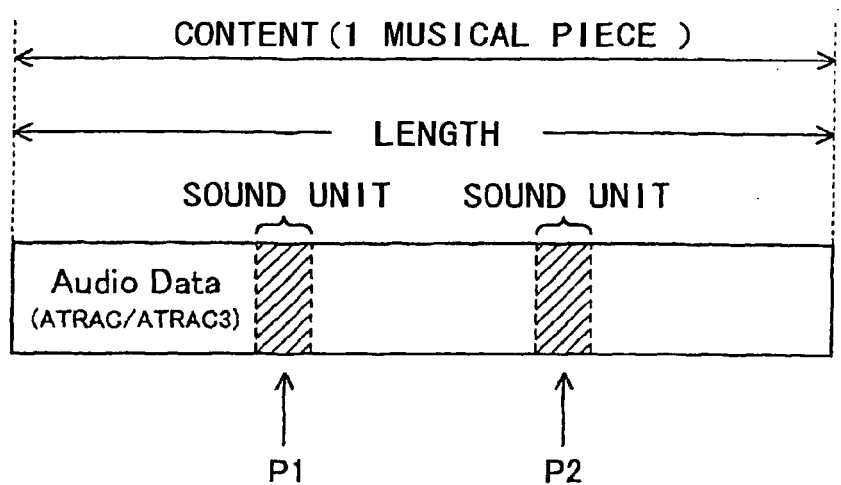
FIG. 27 is an explanatory diagram showing generation of a content ID in the embodiment.
FIG. 28 shows a table associating content IDs in the embodiment.

FIG. 27 is an explanatory diagram showing a model representing the entire content data such as music. This content data is a data stream in a state of being compressed by adoption of the ATRAC or ATRAC3 technique. The content data has been transmitted by the personal computer 1 in a check-out in an encrypted state, and decrypted to produce the data stream.

Assume for example that points P1 and P2 are set as sampling points for the content data, and data of sound units (each represented a hatched rectangle) is extracted. Data of a sound unit has a typical length of 424 bytes. The data of a sound unit thus corresponds to the sound unit explained earlier by referring to FIG. 8. However, the data of a sound unit does not have to correspond to the sound unit explained earlier.

A content ID is then generated by using part of the sampled actual content data.

The start and the end of a content should be avoided as a location at which a sampling point is set since it is quite within the bounds of probability that the start and the end of a content are each a silent data. In addition, by setting sampling points at two locations as is the case with the sampling points P1 and P2 described above, the probability of extracting unique data can be increased. From unique data, it is possible to generate a content ID having a sufficiently effective function as a content descriptor. It is needless to say that sampling points can be set at three or more locations. Moreover, one sampling point at a location other than the start and the end of a content is sufficient.

Furthermore, if the sampling points P1 and P2 are set at locations determined in accordance with the data length (or data size), instead of being set at locations selected at random, for particular content data, the same content ID is obtained without regard to the number of times the calculation of a content ID is repeated. Although the content ID is not saved on the secondary recording medium, if the content data itself is recorded on the secondary recording medium, the same content ID can be calculated at the different point of time. This phenomenon makes it unnecessary to record such a content ID on the mini disc 100 used as a secondary recording medium.

To put it concretely, the sampling points P1 and P2 are set at locations at distances of ⅓ and ⅔ of the data size (or the data length) from the end of the content. Of course, the locations are not limited to the locations at distances of ⅓ and ⅔ of the data length from the end of the content. For example, the locations can be locations at distances of the data length's any fractions such as ½, ¼, ¾, ⅕, ⅖, ⅗, ⅘, ⅙, ⅚ and so on of the data length from the end of the content.

A technique to find a content ID from content data by using a hash function is expressed by using Eq. (1) as follows:

$$\text{Content ID} = CBC\_MAC(\text{Key hash, IV, Stream }(P1) // \text{Stream }(P2)) \quad (1)$$

In the above equation, Key hash is intrinsic key data having a size of 8 bytes.

Stream (P1) is data of a sound group at the sampling point P1, Stream (P2) is data of a sound group at the sampling point P2, notation // denotes an operator of concatenation.

Thus, notation Stream (P1)//Stream (P2) represents a concatenation of the data of the sound group at the sampling point P1 and the data of the sound group at the sampling point P2. The concatenated data has a length of 424×2 bytes.

Notation IV is an initial value of a CBC mode having a length of 8 bytes. The initial value IV is expressed by Eq. (2) in terms of a content length (length) with a size of 4 bytes and 1-byte track information TrackModeByte as follows:

$$IV = \{\text{length} // \text{TrackModeByte} // 32 \text{ bits padding with zero}\} \quad (2)$$

In this case, the 4-byte content size and the 1-byte track mode included in the record-object control command shown in FIG. 19 can be used as the content length (Length) with a size of 4 bytes and 1-byte track information (TrackModeByte) in Eq. (2).

Such a content ID is generated by a HASH engine mounted typically on the decryption processing unit 28 of the recording/reproduction apparatus 20A. The initial value IV computed by using Eq. (2) is substituted into Eq. (1) for the term IV. The recording/reproduction apparatus 20A is capable of computing the initial value IV from information included in the record-object control command (received at the step F106 of the check-out session shown in FIG. 17).

In addition, prior to a transfer of content data, the length of the content data can be identified from the content size included in the record-object control command. Thus, the distances of ⅓ and ⅔ of the content length for locations of the sampling points P1 and P2 can also be determined prior to a transfer of the content data.

Therefore, after pieces of data of the sound groups at the sampling points P1 and P2 are extracted following the start of the actual transfer of the content data, a content ID can be computed by using Eq. (1).

For content data recorded on the mini disc 100, the size of the content data can of course be found from the data of U-TOC sector 0. Thus, the locations of the sampling points P1 and P2 can be determined.

In addition, a track mode included in the record-object control command transmitted in a check-out is recorded as a track mode in U-TOC sector 0 so that the initial value IV can be found from data of U-TOC sector 0 by using Eq. (2).

Thus, for content data recorded on the mini disc 100, a content ID can be found at any point of time.

For example, the recording/reproduction apparatus 20A is capable of generating a content ID of its own for content data used as an object of a check-out as described above.

Unless the content ID generated by the recording/reproduction apparatus 20A is associated with a content ID generated by the personal computer 1 and stored in the HDD 5, however, the content ID generated by the recording/reproduction apparatus 20A cannot be utilized properly.

The content ID stored in the HDD 5 as described above is generated for content data by an application running on the personal computer 1. The content ID found in advance by this application includes information unique to the apparatus (personal computer 1) having a primary recording medium such as the HDD 5, time information stored in the HDD 5 and a random number. An example of the information unique to the personal computer 1 is an ID unique to the application installed in the personal computer 1.

A (second) content ID generated by the recording/reproduction apparatus 20A is associated by the personal computer 1 with a (first) content ID generated by the personal computer 1 as described above as table data shown in FIG. 28.

It is to be noted that the table data represents associations unique to the apparatus using a primary recording medium such as the HDD 5.

At the step F211 of a check-out session shown in FIG. 18, a record-object response command is used by the recording/reproduction apparatus 20A to inform the personal computer 1 of the second content ID generated by the recording/reproduction apparatus 20A. Then, the personal computer 1 carries out processing on the table data at the step F108. In this processing, an element of the table data (shown in FIG. 28) is created for the content data transferred in the check-out. The element associates the first content ID generated by the personal computer 1 for the content data with the second content ID generated by the recording/reproduction apparatus 20A for the same content data.

The typical table data shown in FIG. 28 consists of three elements, namely, first, second and third elements, each associating a first content ID with a second content ID.

In management of the table data (for example, record/update in the HDD 5) by the personal computer 1, content data checked out to the mini disc 100 can be managed by using its content ID. Thus, check-outs and check-ins can be managed.

As described above, the mini disc 100 does not include an area for storing content IDs. However, the recording/reproduction apparatus 20A is capable of finding a content ID for content data stored in the mini disc 100.

Thus, when it is desired to check in content data back to the personal computer 1, the personal computer 1 requests that the recording/reproduction apparatus 20A transmit the (second) content ID of the content data. The personal computer 1 then confirms that the (second) content ID received from the recording/reproduction apparatus 20A matches the (second) content ID stored as an element of the table data shown in FIG. 28 (The second content ID stored as an element of the table data was received from the recording/reproduction apparatus 20A in the check-out of the content data). If the second content ID received from the recording/reproduction apparatus 20A matches the second content ID stored as an element of the table data, the personal computer 1 carries out a check-in process for the content data managed by the (first) content ID.

The above description explains the meanings of the pieces of processing carried out at the steps F151, F152, F252 and F253 shown in FIG. 23.

By adoption of such a content-ID management technique, even for a secondary recording medium not conforming to the SDMI standard (mini disc 100 and the like), it is possible to properly execute management of check-outs and check-ins, that is, management of content rights, in the data transfer system.

11. Acquisition of Medium Information

So far, a check-out and a check-in from and to a mini disc 100 used as a secondary recording medium have been explained.

When a check-out from a mini disc 100 used as a secondary recording medium is carried out, it is necessary for the personal computer 1 to acquire information on the mini disc 100 mounted on the recording/reproduction apparatus 20A connected to the personal computer 1 in advance.

In this embodiment, at a point of time prior to execution of an actual check-out/check-in, for example, at a point of time the recording/reproduction apparatus 20A is connected to the personal computer 1 by typically a USB transmission line, the personal computer 1 carries out communication processing to acquire information on the mini disc 100 mounted on the recording/reproduction apparatus 20A. This processing to acquire information on the mini disc 100 is referred to as medium-information acquisition processing.

Figure 29:
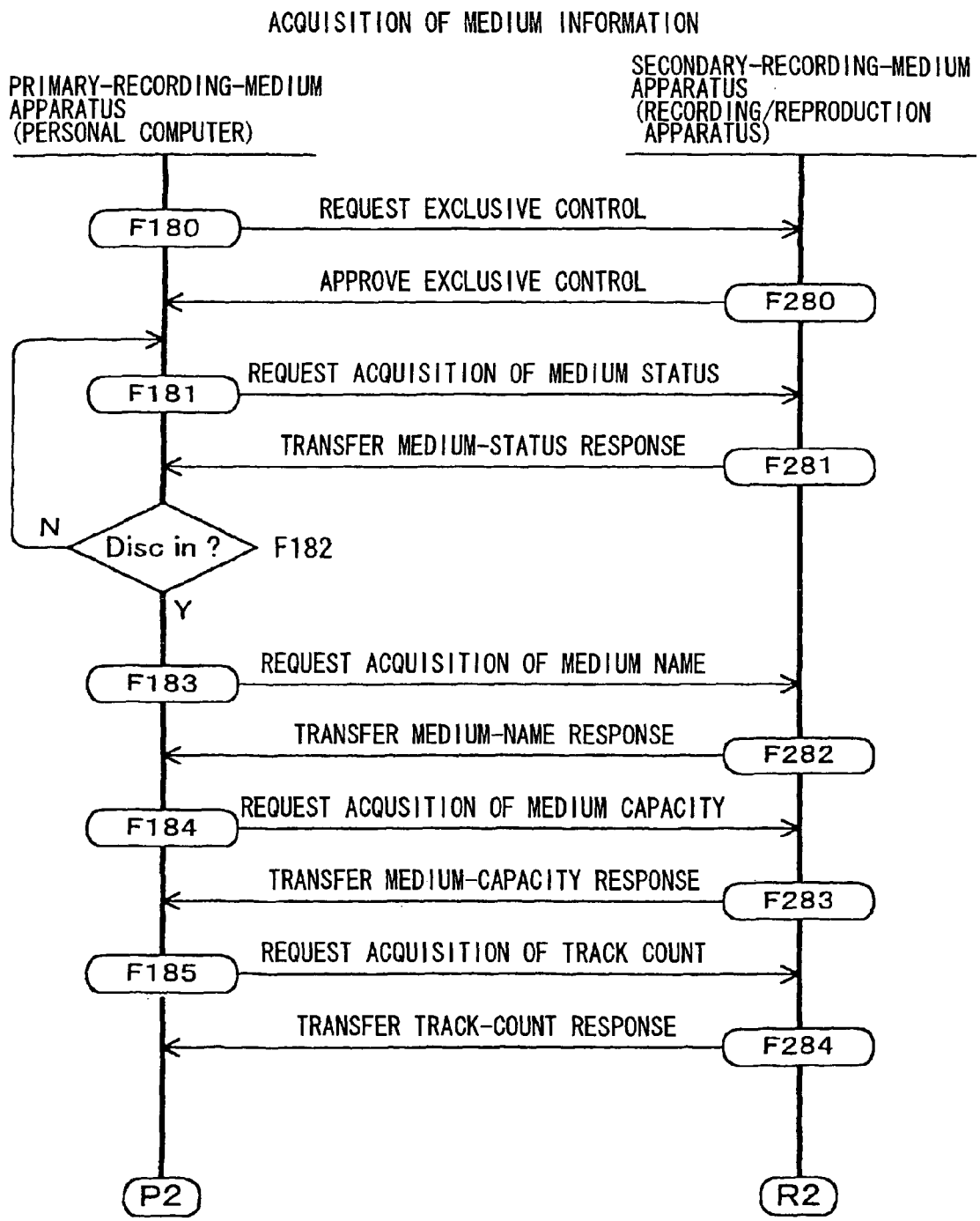
FIG. 29 shows a flowchart representing operations carried out by the embodiment to acquire medium information.
Figure 30:
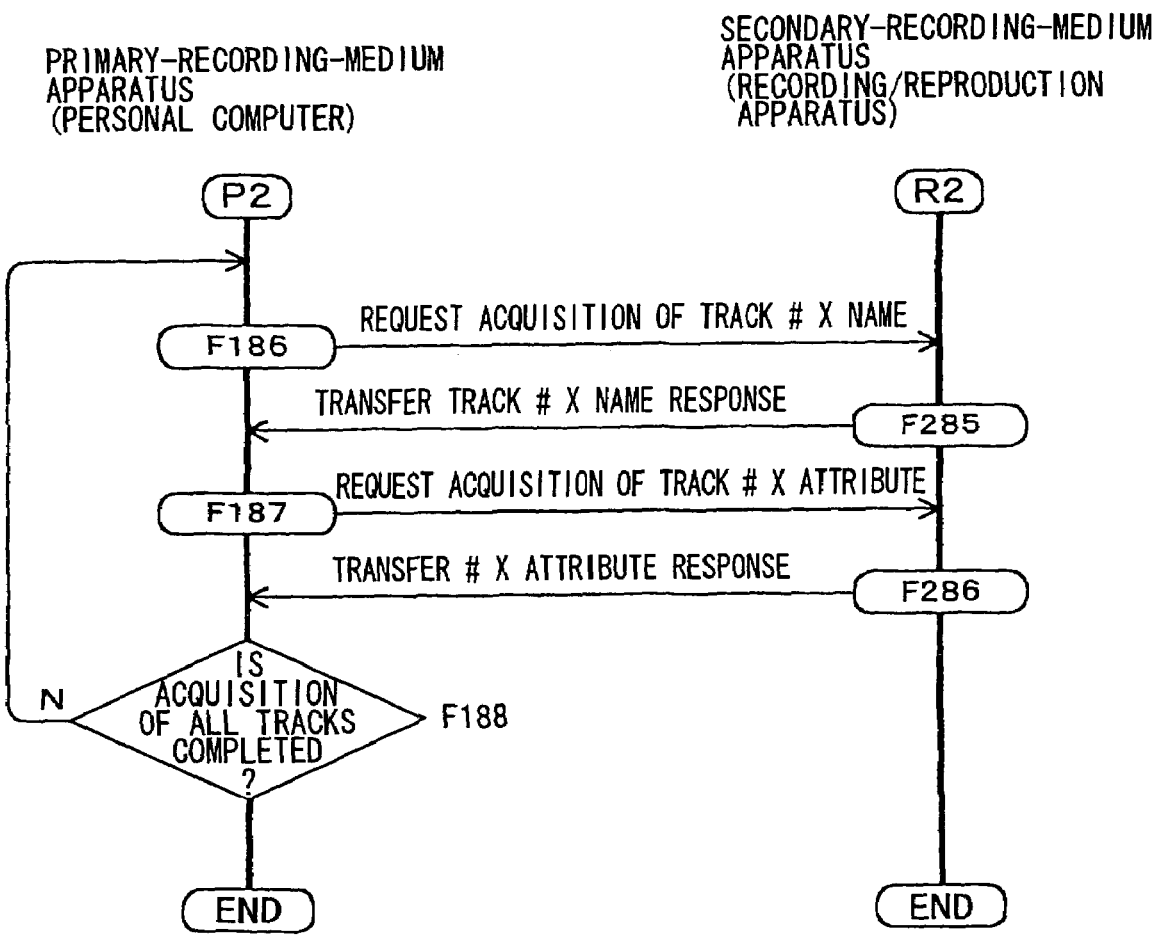
FIG. 30 shows a continuation flowchart representing operations carried out by the embodiment to acquire medium information.

The medium-information acquisition processing is explained by referring to FIGS. 29 and 30. In FIGS. 29 and 30, pieces of processing of steps F180 to F188 are carried out by the personal computer 1 by execution of application software driving the personal computer 1 to function as a data transfer apparatus. On the other hand, pieces of processing of steps F280 to F286 are carried out by the system control unit 32 employed in the recording/reproduction apparatus 20A.

When the medium-information acquisition processing is carried out at a point of time the recording/reproduction apparatus 20A is connected to the personal computer 1, for example, at the step F180, the personal computer 1 transmits a request for exclusive control to the recording/reproduction apparatus 20A. In this case, an exclusive log-in control command shown in FIG. 31 is transmitted to the recording/reproduction apparatus 20A.

The exclusive log-in control command includes a sub-unit type and a sub-unit ID, which indicate a control-object apparatus, as well as a priority field for indicating the control level. The exclusive log-in control command prevents or restricts the recording/reproduction apparatus 20A from carrying out operations such as processing to delete data from the mini disc 100 used as a secondary recording medium, edit data on the mini disc 100, dismount the mini disc 100 and control the power supply.

That is to say, the exclusive log-in control command puts the recording/reproduction apparatus 20A in a state wherein the operations described above are carried out by the recording/reproduction apparatus 20A only at a request made by the personal computer 1.

The priority included in the exclusive log-in control command indicates various states of prohibition and restriction of the operations.

For example, the operations of the recording/reproduction apparatus 20A are controlled at the following levels:

Control level 4: The operations are prohibited completely unless there is a command from the personal computer 1 to make a request for any of the operations.

Control level 3: Operations to control the power supply, eject the secondary recording medium, divide a track, link tracks and delete a track are prohibited completely unless there is a command from the personal computer 1 to make a request for any of the operations.

Control level 2: Operations to divide a track, link tracks and delete a track are prohibited completely unless there is a command from the personal computer 1 to make a request for any of the operations.

Control level 1: Operations to edit or delete a track other than a check-out content are permitted.

Control level 0: No restrictions are imposed on the operations.

It is needless to say that the above control levels are typical. In actuality, a larger number of various control levels is conceivable.

The recording/reproduction apparatus 20A sets a control mode in accordance with the exclusive log-in control command and, at the step F280, transmits a response indicating an approval of the request for the excusive control.

It is to be noted that the state of the exclusive control is continued till the personal computer 1 transmits an exclusive log-out control command shown in FIG. 32.

This exclusive log-out control command is a command given to the recording/reproduction apparatus 20A to terminate the state of the exclusive control. The format of the exclusive log-out control command is the same as the format of the exclusive log-in control command except that the priority is set at 00h indicating a control level of a free state.

After the personal computer 1 puts the recording/reproduction apparatus 20A in the state of exclusive control and a control right is thus transferred to an application running on the personal computer 1, descriptors are opened and, at the step F181, the personal computer 1 acquires status of the mini disc 100 mounted on the recording/reproduction apparatus 20A. To put it concretely, the personal computer 1 transmits a get-disc-status control command shown in FIG. 33 to the recording/reproduction apparatus 20A.

In response to the get-disc-status control command, the recording/reproduction apparatus 20A transmits a get-disc-status response command shown in FIG. 34 to the personal computer 1 at the step F281. The personal computer 1 then closes the descriptors in accordance with the get-disc-status response command.

As shown in FIG. 34, the get-disc-status response command transmitted by the system control unit 32 employed in the recording/reproduction apparatus 20A to the personal computer 1 includes a 'disc in drive' field at offset byte offset 1Ah. If the mini disc 100 has been mounted on the recording/reproduction apparatus 20A, the transmitted get-disc-status response command includes an asserted 'disc in drive' field.

Thus, the personal computer 1 is capable of determining whether or not the mini disc 100 has been mounted on the recording/reproduction apparatus 20A by examining the 'disc in drive' field included in the get-disc-status command.

If the mini disc 100 has not been mounted on the recording/reproduction apparatus 20A, the processing of the personal computer 1 goes back from the step F182 to the step F181 to again transmit a get-disc-status control command for acquiring status of the mini disc 100.

Assume for example that the mini disc 100 has not been mounted on the recording/reproduction apparatus 20A. In this case, the personal computer 1 transmits a get-disc-status control command for acquiring status of the mini disc 100 to the recording/reproduction apparatus 20A at predetermined time intervals of typically 1 second.

As the state of the mini disc 100 being mounted on the recording/reproduction apparatus 20A is confirmed, the personal computer 1 opens descriptors and transmits a get-disc-name control command shown in FIG. 35 at the step F183 in order to acquire the name of the mini disc 100.

Receiving the get-disc-name control command, the system control unit 32 employed in the recording/reproduction apparatus 20A obtains a disc name recorded in U-TOC sector 1 of the mini disc 100. Then, at the step F282, the system control unit 32 creates a get-disc-name response command shown in FIG. 36 and transmits the get-disc-name response command to the personal computer 1 in response to the get-disc-name control command. Receiving the response, the personal computer 1 closes the descriptors.

As shown in FIG. 36, the transmitted get-disc-name response command includes an 'N-Bytes Disc Title Text' field at offset bytes 19h to (19+N)h. The 'N-Bytes Disc Title Text' field is used for storing an N-byte text describing the disc name fetched from U-TOC sector 1. Symbol N representing the number of bytes composing the disc name is described in a 'primary field length' field at offset bytes 17h and 18h.

By examining the 'N-Bytes Disc Title Text' field of the get-disc-name response command, the personal computer 1 is capable of knowing the name of the mini disc 100 mounted on the recording/reproduction apparatus 20A.

At a step F184, the personal computer 1 opens descriptors and transmits a get-disc-capacity-information control command shown in FIG. 37 to the recording/reproduction apparatus 20A in order to acquire the media capacity.

Receiving the get-disc-capacity-information control command, the system control unit 32 employed in the recording/reproduction apparatus 20A obtains information recorded in U-TOC sector 0 of the mini disc 100. Then, at the step F283, the system control unit 32 creates a get-disc-capacity-information response command shown in FIGS. 38 and 39, transmitting the get-disc-capacity-information response command to the personal computer 1 in response to the get-disc-capacity-information control command. Receiving the response, the personal computer 1 closes the descriptors.

As shown in FIGS. 38 and 39, the transmitted get-disc-capacity-information response command includes fields named 'Hours', 'Minutes', 'Seconds' and 'Frames' at offset bytes 1Bh to 1Fh. These fields show a total performance time expressed in terms of hours, minutes, seconds and frames. The number of bytes composing the fields named 'Hours', 'Minutes', 'Seconds' and 'Frames' is stored in a 'total playback capacity length' field at offset bytes 19h and 1Ah. The number of bytes is the data size of the fields named Hours, Minutes, Seconds and Frames. It is to be noted that the total performance time is the length of time it takes to reproduce the entire content data from the mini disc 100.

In addition, fields also named Hours, Minutes, Seconds and Frames are provided at offset bytes 22h to 26h. These fields show a maximum recording time expressed in terms of 'Hours', 'Minutes', 'Seconds' and 'Frames'. The number of bytes composing these fields named Hours, Minutes, Seconds and Frames is stored in a 'maximum recording capacity length' field at offset bytes 20h and 21h. The number of bytes is the data size of the fields named Hours, Minutes, Seconds and Frames. It is to be noted that the maximum recording time is the length of time it takes to reproduce data accommodated in the total capacity of the mini disc 100.

Furthermore, fields also named Hours, Minutes, Seconds and Frames are provided at offset bytes 29h to 2Dh. These fields show a remaining time expressed in terms of 'Hours', 'Minutes', 'Seconds' and 'Frames'. The number of bytes composing these fields named Hours, Minutes, Seconds and Frames is stored in a 'remaining recording capacity length' field at offset-bytes 27h and 28h. The number of bytes is the data size of the fields named Hours, Minutes, Seconds and Frames. It is to be noted that the remaining time is a remaining recording time during which data can be recorded onto the mini disc 100. That is to say, the remaining time is a difference obtained as a result of a subtraction of the total performance time from the maximum recording time.

By examining the fields of the get-disc-capacity-information response command, the personal computer 1 is capable of knowing the total performance, the maximum recording time and the remaining time as information on the storage capacity of the mini disc 100 mounted on the recording/reproduction apparatus 20A.

Then, at a step F185, the personal computer 1 opens descriptors and transmits a get-number-of-audio-tracks control command shown in FIG. 40 in order to acquire a track number.

Receiving the get-number-of-audio-tracks control command, the system control unit 32 employed in the recording/reproduction apparatus 20A obtains information recorded in U-TOC sector 0 of the mini disc 100. Then, at the step F284, the system control unit 32 creates a get-number-of-audio-tracks response command shown in FIG. 41, transmitting the get-number-of-audio-tracks response command to the personal computer 1 in response to the get-number-of-audio-tracks control command. Receiving the response, the personal computer 1 closes the descriptors.

As shown in FIG. 41, the transmitted get-number-of-audio-tracks response command includes a 'number of items' field positioned at offset bytes 17h and 18h. This field shows the number of tracks or contents recorded on the mini disc 100.

By examining the 'number of items' field of the transmitted get-number-of-audio-tracks response command, the personal computer 1 is capable of knowing the number of tracks or contents recorded on the mini disc 100, which is mounted on the recording/reproduction apparatus 20A.

Then, the processing of the personal computer 1 goes on to the step F186 shown in FIG. 30 to acquire information on tracks.

First of all, at the step F186, the personal computer 1 opens descriptors and transmits a get-audio-track-name control command shown in FIG. 42 to the recording/reproduction apparatus 20A in order to acquire the name of track #x. The transmitted get-audio-track-name control command includes an 'object position' field at offset bytes 07h and 08h. The 'object position' field specifies the number (#x) of a track on the mini disc 100.

Receiving the get-audio-track-name control command, the system control unit 32 employed in the recording/reproduction apparatus 20A obtains the name of track #x from U-TOC sector 1 and, at the step F285, transmits a get-audio-track-name response command shown in FIG. 43 to the personal computer 1 in response to the get-audio-track-name control command.

As shown in FIG. 43, the get-audio-track-name response command includes an 'object position' field at offset bytes 07h and 08h. The 'object position' field shows the number of the track on the mini disc 100. The get-audio-track-name response command also includes an 'M-Bytes Audio Track Title Text' field at offset bytes 19h to (19+M)h. The 'M-Bytes Disc Title Text' field is used for storing an M-byte text describing the track name fetched from U-TOC sector 1. Symbol M representing the number of bytes composing the track name is described in a 'primary field length' field at offset bytes 17h and 18h.

By examining the 'M-Bytes Disc Title Text' field of the get-disc-name response command, the personal computer 1 is capable of knowing the name of track #x recorded on the mini disc 100 mounted on the recording/reproduction apparatus 20A.

Then, without closing the descriptors, the personal computer 1 carries out processing to acquire attributes of a track specified in the 'object position' field. To put it in detail, at the step F187, the personal computer 1 transmits a get-audio-track-info control command to the recording/reproduction apparatus 20A in order to acquire attributes of track #x.

The get-audio-track-info control command includes a read-info-block-for-track-attributes control command shown in FIG. 44, a read-info-block-for-track-mode control command shown in FIG. 46 and a read-info-block-for-track-size control command shown in FIG. 48.

In response to the read-info-block-for-track-attributes control command, the read-info-block-for-track-mode control command and the read-info-block-for-track-size control command, the system control unit 32 employed in the recording/reproduction apparatus 20A transmits respectively a read-info-block-for-track-attributes response command shown in FIG. 45, a read-info-block-for-track-mode response command shown in FIG. 47 and a read-info-block-for-track-size response command shown in FIG. 49 to the personal computer 1.

The read-info-block-for-track-attributes control command shown in FIG. 44 is a request for write protect information for the track specified in an 'object position' field.

In response to this read-info-block-for-track-attributes control command, the system control unit 32 obtains the track's mode from U-TOC sector 0 and issues a read-info-block-for-track-attributes response command shown in FIG. 45. The write protect information for the track specified in an 'object position' field is extracted from the track mode and included in a 'disc sub-unit object attributes' field at an offset byte 0Fh.

The personal computer 1 recognizes that track #x is in a locked state (write-protect state) as evidenced by this field set at 01h or that track #x is in an unlocked state as evidenced by this field set at 00h.

The read-info-block-for-track-mode control command shown in FIG. 46 is a request for information including a sampling rate of the track specified in an 'object position' field.

In response to this read-info-block-for-track-mode control command, the system control unit 32 issues a read-info-block-for-track-mode response command shown in FIG. 47.

In the field read-info-block-for-track-mode response command, the sampling frequency of the track specified in the 'object position' field is shown in an 'audio recording sample rate' field provided at an offset byte 19h.

A quantization bit count is shown in an 'audio recording sample size' field provided at an offset byte 1Ah. A compression mode is set in an 'audio recording compression mode' field provided at an offset byte 1Bh. The compression mode can be the ATRAC or ATRAC3 mode.

Channel information indicating either stereo or monothonic is shown in an 'audio recording channel mode' field provided at an offset byte 1Ch.

Thus, the personal computer 1 is capable of knowing information for track #x from the fields described above. The information includes the sampling frequency, the quantization bit count, the compression mode and the channel mode.

The read-info-block-for-track-size control command shown in FIG. 48 is a request for a data size of the track specified in an 'object position' field.

In response to this read-info-block-for-track-size control command, the system control unit 32 issues a read-info-block-for-track-size response command shown in FIG. 49.

The read-info-block-for-track-size response command includes fields named 'Hours', 'Minutes', 'Seconds' and 'Frames' at offset bytes 1Ah to 1Eh. These fields show a data size expressed in terms of hours, minutes, seconds and frames. The personal computer 1 is capable of knowing the data size for track #x from these fields.

By exchanging the control commands and the response commands at the steps F186, F187, F285 and F286, the personal computer 1 is capable of obtaining one track's name and attributes. The operations of exchanging the control commands and the response commands are repeated for each track recorded on the mini disc 100. At the step F188, the personal computer 1 forms a judgment as to whether or not names and attributes have been acquired for all tracks recorded on the mini disc 100. If names and attributes have not been acquired for all tracks, the processing goes back to the step F186 to repeat the operations. At the step F186, the track number specified in the 'object position' field is changed to another number indicating another track for which a name and attributes are to be acquired next.

As names and attributes have been acquired for all tracks, the descriptors are closed to end the sequential processing. The number of tracks for which names and attributes are acquired was requested at the step F185 and obtained at the step F284.

It is to be noted that, in the operations of exchanging the control commands and the response commands, descriptors are not opened and closed for each track specified in the 'object position' field. Thus, the length of time it takes to acquire track names and track attributes can be shortened.

As described above, in this embodiment, when the recording/reproduction apparatus 20A is connected to the personal computer 1, the personal computer 1 is capable of obtaining information on a mini disc 100 mounted on the recording/reproduction apparatus 20A. The information includes a media name, the media capacity, the number of tracks (or a content-data count), the name of each track, write-protect data, the mode data of each track and the size of each track. The capacity includes a total performance time, a maximum recording time and a remaining time. The mode data includes a sampling frequency, a quantization bit count, a compression mode and a channel mode.

As described above, by acquiring the information on the mini disc 100 used as a secondary recording medium to serve as a check-out/check-in target from now on, an application running on the personal computer 1 is capable of carrying out various kinds of processing described below.

In the first place, the information on the mini disc 100 used as a secondary recording medium can be displayed as an application screen appearing on a monitor of the personal computer 1. Thus, it is possible to display the title of the mini disc 100, a total performance time, a maximum recording time, a remaining time and the number of tracks. On the display screen, tracks are displayed as their track names along with the size of each track and other information for each track. As a result, proper information can be displayed to the user.

In the second place, when content data stored in the HDD 5 is checked out, the size of the content data is compared with the remaining time of the mini disc 100 to form a judgment as to whether or not the free area of the mini disc 100 can be used for accommodating the check-out. If the result of the judgment indicates that the free area of the mini disc 100 can be used for accommodating the check-out, the check-out processing shown in FIGS. 17 and 18 is carried out.

In the third place, if a plurality of contents is specified as check-out objects and the free area of the mini disc 100 cannot be used for accommodating the check-out objects, check-out processing for only some of the requested contents can be carried out.

It is needless to say that the information displayed on the monitor also serves as a guide when the user specifies a check-in. In addition, a check-in increases the size of a free area in the mini disc 100. It is then nice to allocate the free area with an increased size to content data specified as a check-out object.

That is to say, by obtaining information on the secondary recording medium, proper operations can be carried out in the data transfer system.

A preferred embodiment has been described so far. However, the scope of the present invention is not limited to the embodiment.

That is to say, it is possible to provide a variety of versions within a range of essentials of the present invention by changing the data transfer system's operations including the encryption, the data paths, the check-out/check-in techniques, the authentication technique, the content-ID generation technique, the content-ID management technique and the technique to acquire information on a secondary recording medium.

In addition, the present invention does not limit the object of the data transfer processing from a primary recording medium to a secondary recording medium as described above to an SDMI content. Instead, the data transfer processing can be applied widely to various kinds of content data. Furthermore, the primary recording medium can be a medium other than the HDD.

It is needles to say that the secondary recording medium is not limited to a mini disc and the recording/reproduction apparatus 20A is not limited to a mini-disc recording apparatus. Instead, the secondary recording medium can be of one of different types. For example, as the mini disc 100, it is possible to employ another medium such as a CD-R, a CD-RW, a DVD-RAM, a DVD-R, a DVD-RW or one of a variety of memory cards. Thus, as the recording/reproduction apparatus 20A, a recording apparatus for the other medium can be used.

As is obvious from the above description, in accordance with the present invention, the data transfer apparatus (or the primary-recording-medium apparatus) is capable of requesting the data-recording apparatus (or the secondary-recording-medium apparatus) to transmit information on the secondary recording medium serving as a check-out destination and acquiring required information even if, as the secondary recording medium, a medium adopting its own unique management technique as is the case with a mini disc is employed.

In particular, the information on a secondary recording medium includes information indicating whether or not the secondary recording medium has been mounted on the data-recording apparatus, the name of the secondary recording medium, the name of each content data stored in the secondary recording medium, the capacity of the secondary recording medium, the number of contents recorded on the secondary recording medium and attributes of each content data recorded on the secondary recording medium.

From the information on the secondary recording medium, prior to a check-out or a transfer of content data from a primary recording medium to a secondary recording medium, it is thus possible to accurately form judgments as to whether or not the check-out can be implemented, the content data to be checked out is proper and the content data is appropriate for the check-out. As a result, there is exhibited an effect of implementation of a proper transfer operation.

In addition, by acquiring information on a secondary recording medium, an application running on the data transfer apparatus is capable of presenting the information on the secondary recording medium to the user as guidance information.

It is needless to say that, since content data is recorded on the secondary recording medium in an unencrypted state, compatibility with the conventional apparatus can be obtained and, at the same time, a copyright can be protected. This is because an authentication process is carried out and a usage rule is checked for a check-out.

The above effects are beneficial to the user and, in addition, it is possible to provide the user with a data transfer system, which is easy to use.

The invention claimed is:

1. A data transfer system including a data transfer apparatus and a data-recording apparatus wherein:

the data transfer apparatus comprises:
   means for storing content data in an encrypted state, a first content ID unique to the content data, and table data onto the primary recording medium of the data transfer apparatus;
   means for transferring content data to the data-recording apparatus as a result of a check-out operation of the content data;
   means for receiving a second content ID generated by the data-recording apparatus based on the transferred content data of the check-out operation, wherein the second content ID is stored as an element of the table data:
   means for transmitting a command requesting, from the data-recording apparatus, information including a third content ID which corresponds to the content data stored on a secondary recording medium of the data-recording apparatus, as a result of a check-in operation of the content data;
   means for receiving a third content ID generated by the data-recording apparatus;
   means for comparing the third content ID to the second content ID previously received from the data-recording apparatus, for ensuring that the content data checked-in corresponds to the content data checked-out; and
   means for checking-in the content data corresponding to the first content ID if the second content ID and the third content ID match; and the data-recording apparatus comprises:
   means for exchanging content data with the data transfer apparatus;
   means for recording and reproducing data onto and from the secondary recording medium;
   means for decrypting encrypted content data received from the data transfer apparatus;
   means for recording the decrypted content data onto the secondary recording medium;
   means for generating the second content ID and the third content ID based on data extracted from two sampling locations in the content data, wherein the locations are determined in accordance with the data length of the content data; and
   means for transmitting the second content ID or the third content ID to the data transfer apparatus.

2. A data transfer system according to claim 1, wherein information on the secondary recording medium further includes information indicating whether or not the secondary recording medium has been mounted on the data-recording apparatus.

3. A data transfer system according to claim 1, wherein the information on the secondary recording medium further includes a name of the secondary recording medium mounted on the data-recording apparatus or a name of each content data recorded on the secondary recording medium.

4. A data transfer system according to claim 1, wherein the information on the secondary recording medium further includes a capacity of the secondary recording medium mounted on the data-recording apparatus.

5. A data transfer system according to claim 1, wherein the information on the secondary recording medium further includes the number of contents stored on the secondary recording medium mounted on the data-recording apparatus.

6. A data transfer system according to claim 1, wherein the information on the secondary recording medium further includes attributes of each content data recorded on the secondary recording medium mounted on the data-recording apparatus.

7. A data transfer system according to claim 1, wherein the data transfer apparatus forms a judgment as to whether or not data content stored in the primary recording medium should be transmitted to the data-recording apparatus on the basis of the information on the secondary recording medium.

8. A data transfer apparatus comprising:
   means for storing content data in an encrypted state, a first content ID unique to the content data, and table data onto a primary recording medium;
   means for transferring content data as a result of a check-out operation of the content data to an external data-recording apparatus which stores the content data onto a secondary recording medium;
   means for receiving a second content ID generated by the data-recording apparatus based on the transferred content data of the check-out operation, wherein the second content ID is stored as an element of the table data;
   means for transmitting a command requesting, from the data-recording apparatus, information including a third content ID which corresponds to the content data stored on the secondary recording medium of the data-recording apparatus as a result of a check-in operation of the content data;
   means for receiving a third content ID generated by the data-recording apparatus;
   means for comparing, the third content ID to the second content ID previously received from the data-recording apparatus, for ensuring that the content data checked-in corresponds to the content data checked-out; and
   means for checking-in the content data corresponding to the first content ID if the second content ID and the third content ID match;
   wherein the second content ID and the third content ID are generated based on data extracted from two sampling locations in the content data stored in said secondary recording medium, wherein the locations are determined in accordance with the data length of the content data.

9. A data transfer apparatus according to claim 8, wherein the information on the secondary recording medium further includes information indicating whether or not the secondary recording medium has been mounted on the data-recording apparatus.

10. A data transfer apparatus according to claim 8, wherein the information on the secondary recording medium further includes a name of the secondary recording medium mounted on the data-recording apparatus or a name of each content data recorded on the secondary recording medium.

11. A data transfer apparatus according to claim 8, wherein the information on the secondary recording medium further includes a capacity of the secondary recording medium mounted on the data-recording apparatus.

12. A data transfer apparatus according to claim 8, wherein the information on the secondary recording medium further includes the number of contents stored on the secondary recording medium mounted on the data-recording apparatus.

13. A data transfer apparatus according to claim 8, wherein the information on the secondary recording medium further includes attributes of each content data recorded on the secondary recording medium mounted on the data-recording apparatus.

14. A data transfer apparatus according to claim 8, wherein the data transfer apparatus forms a judgment as to whether or not data content stored in the primary recording medium should be transmitted to the data-recording apparatus on the basis of said information on said secondary recording medium.

15. A data-recording apparatus comprising:
 means for exchanging content data with an external data transfer apparatus;
 means for decrypting encrypted content data received from the data transfer apparatus;
 means for recording the decrypted content data onto a secondary recording medium;
 means for generating a first content ID based on data extracted from two sampling locations in the content data, wherein the locations are determined in accordance with the data length of the content data; and
 means for transmitting information including the first content ID to the data transfer apparatus for comparing the first content ID to a second content ID stored on said data transfer apparatus, wherein the content data can be checked-in to the data transfer apparatus when the first content ID and the second content ID match.

16. A data-recording apparatus according to claim 15, wherein the information further indicates whether or not the secondary recording medium has been mounted on the data-recording apparatus.

17. A data-recording apparatus according to claim 15, wherein the information further indicates a name of the secondary recording medium mounted on the data-recording apparatus or a name of each content data recorded on the secondary recording medium.

18. A data-recording apparatus according to claim 15, wherein the information further indicates a capacity of the secondary recording medium mounted on the data-recording apparatus to the data transfer apparatus.

19. A data-recording apparatus according to claim 15, wherein the information further indicates the number of contents stored on the secondary recording medium mounted on the data-recording apparatus to the data transfer apparatus.

20. A data-recording apparatus according to claim 15, wherein the information further indicates attributes of each content data recorded on the secondary recording medium mounted on the data-recording apparatus to the data transfer apparatus.

21. A data transfer method comprising:
 storing encrypted content data, a first content ID unique to said content data, and table data onto a primary recording medium in a data transfer apparatus;
 recording and reproducing the content data onto and from a secondary recording medium in a data recording apparatus in an unencrypted state, the data transfer apparatus being connected to the data-recording apparatus so that the data transfer apparatus and the data-recording apparatus are capable of communicating with each other;
 confirming that the secondary recording medium has been mounted onto the data-recording apparatus;
 acquiring information on the secondary recording medium from the data-recording apparatus, wherein the information includes at least a second content ID generated by the data-recording apparatus, based on data extracted from two sampling locations in the content data, wherein the locations are determined in accordance with the data length of the content data;
 confirming that the data-recording apparatus is a valid destination of a transfer of the content data stored in the primary recording medium, based on the information;
 judging whether or not the content data should be transferred to the data-recording apparatus, based on the information; and upon judging that the content data should be transferred, transferring the content data to the data-recording apparatus, wherein the second content ID generated by the data-recording apparatus is associated with the first content ID, thereby completing a check-out operation for the content data.

22. A data transfer method according to claim 21, wherein acquiring information includes acquiring a name of the secondary recording medium or a name of each content data recorded on the secondary recording medium.

23. A data transfer method according to claim 21, wherein acquiring information includes acquiring a capacity of the secondary recording medium from the data-recording apparatus.

24. A data transfer method according to claim 21, wherein acquiring information includes acquiring the number of contents recorded on the secondary recording medium from the data-recording apparatus.

25. A data transfer method according to claim 21, wherein acquiring information includes acquiring attributes of the content data recorded on the secondary recording medium from the data-recording apparatus.

* * * * *